July 19, 1960

E. P. G. WRIGHT ET AL 2,945,625

INFORMATION HANDLING EQUIPMENT

Filed Aug. 16, 1954

Inventors
E. P. G. WRIGHT·
D. A. WEIR·
J. RICE

By
Robert Harding Jr.
Attorney

July 19, 1960  E. P. G. WRIGHT ET AL  2,945,625
INFORMATION HANDLING EQUIPMENT
Filed Aug. 16, 1954  39 Sheets-Sheet 3
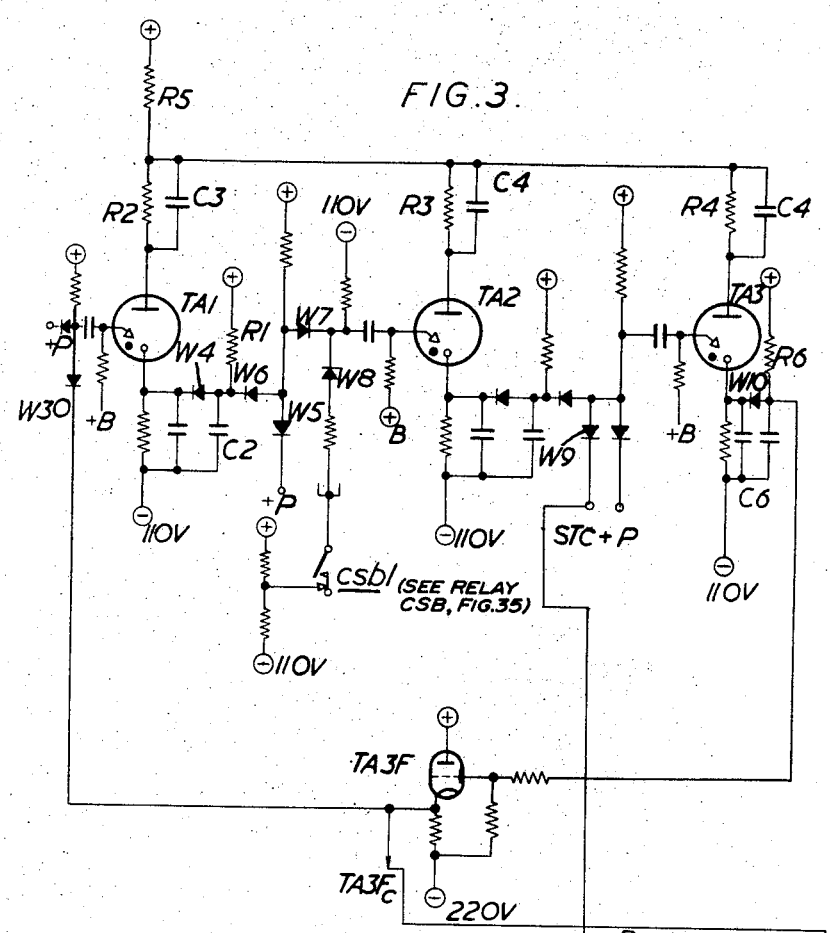
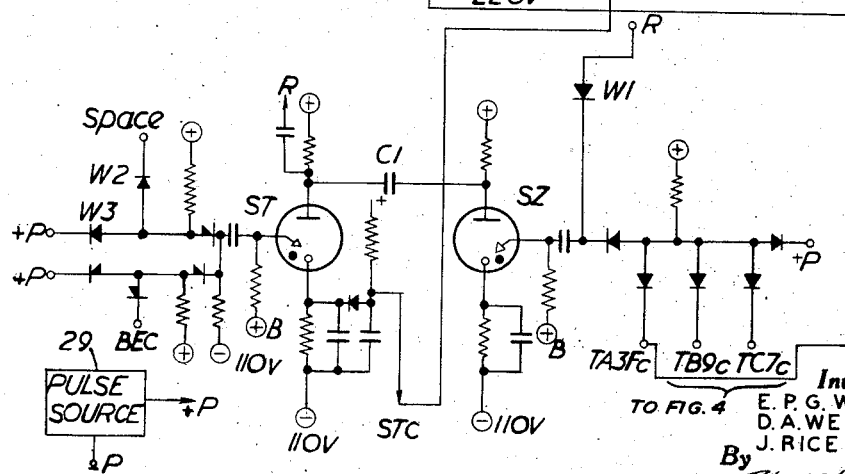
Inventors
E. P. G. WRIGHT·
D. A. WEIR·
J. RICE
By
Attorney

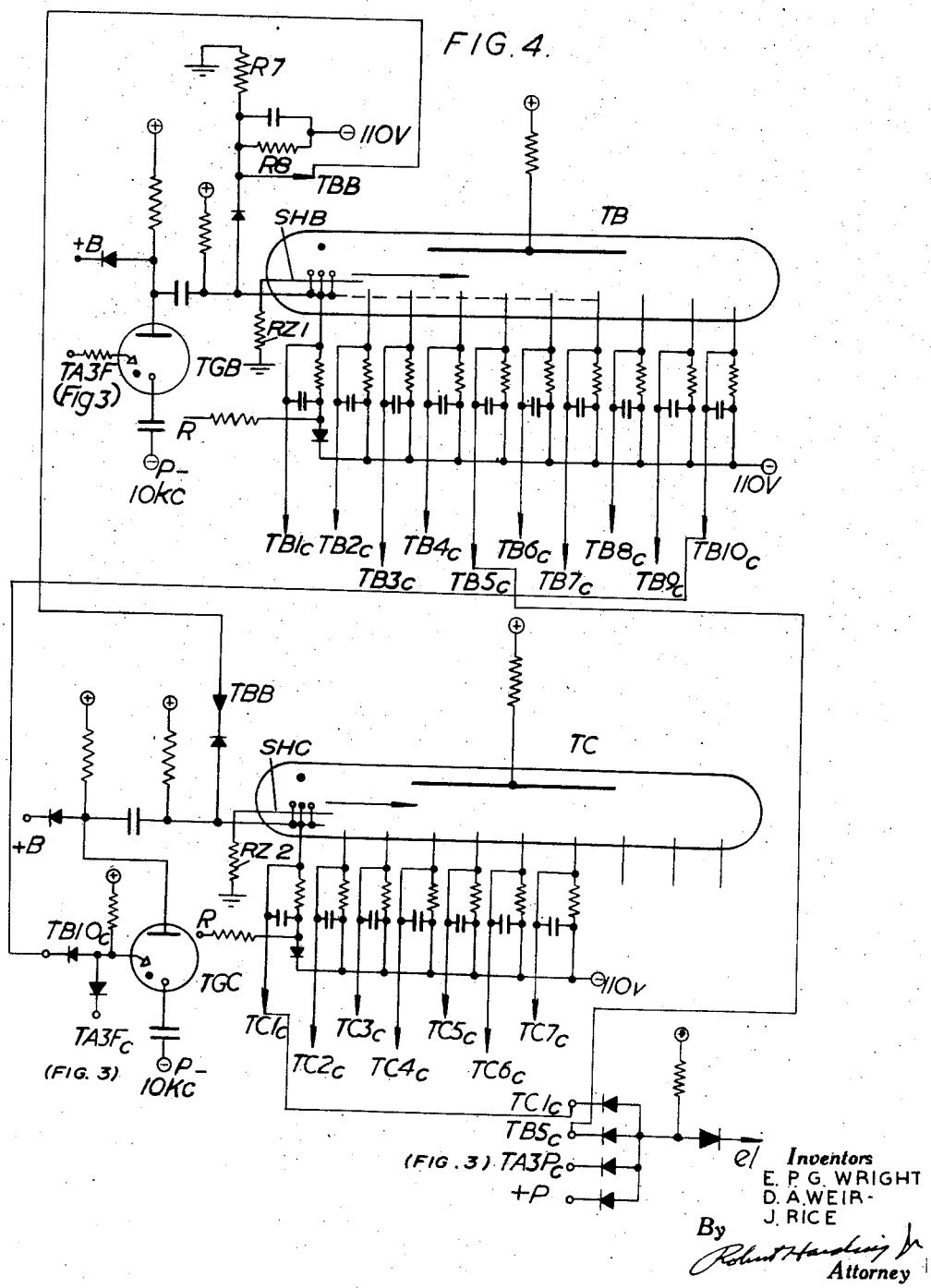

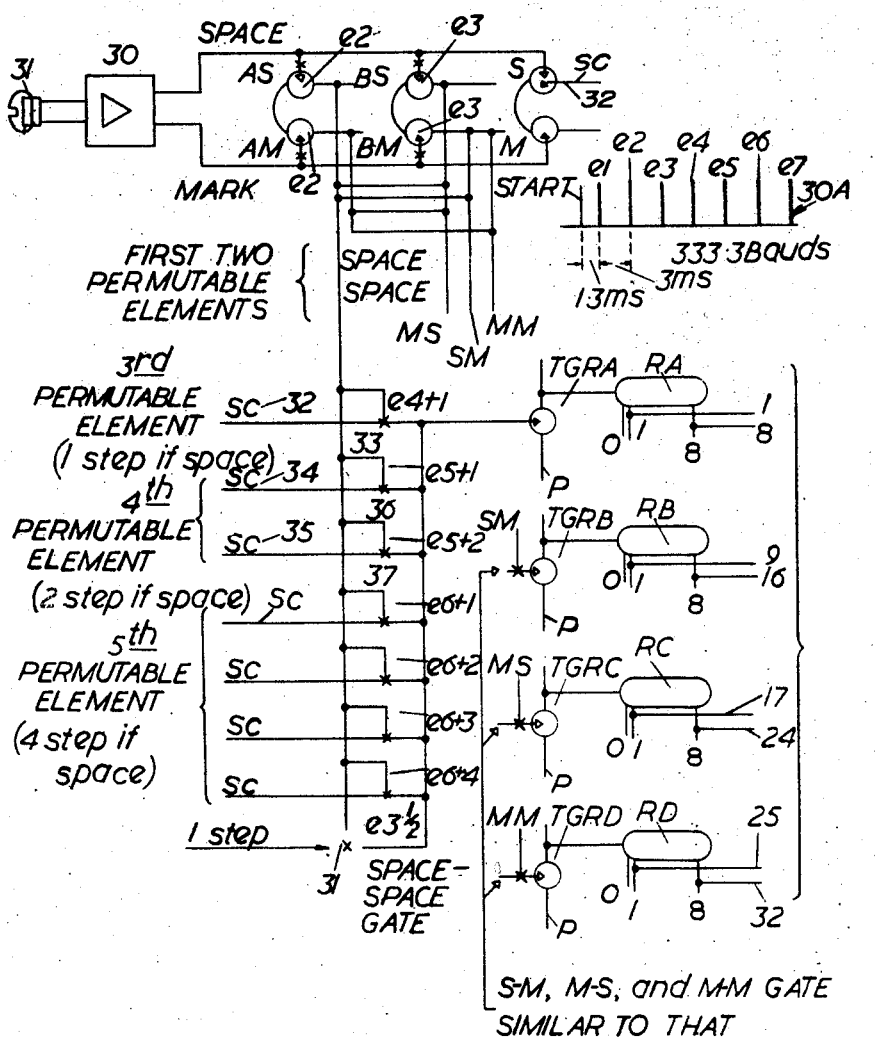

t3 and t3a to fall before t4 rises

Inventors
E. P. G. WRIGHT-
D. A. WEIR-
J. RICE
By
Attorney

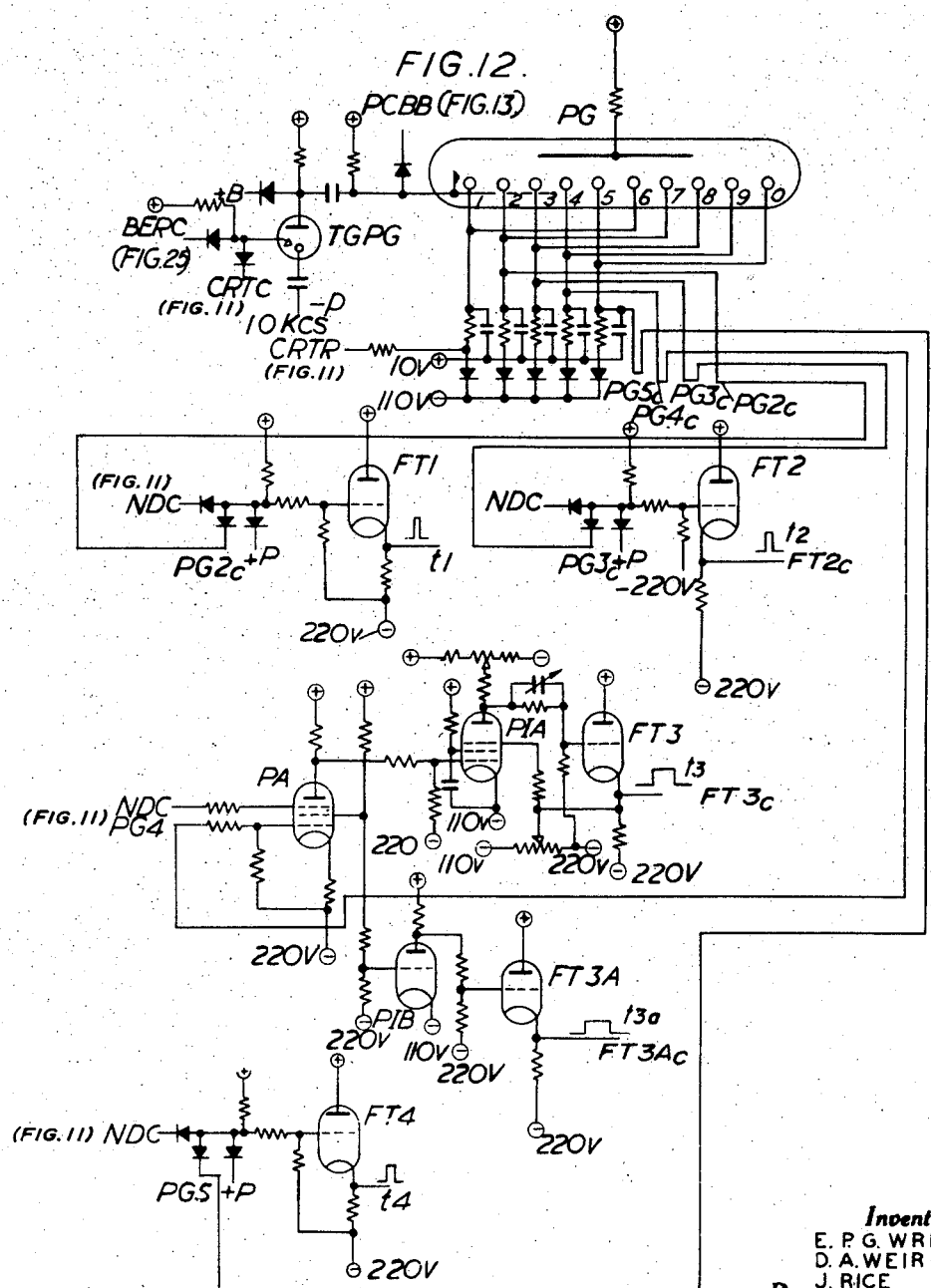

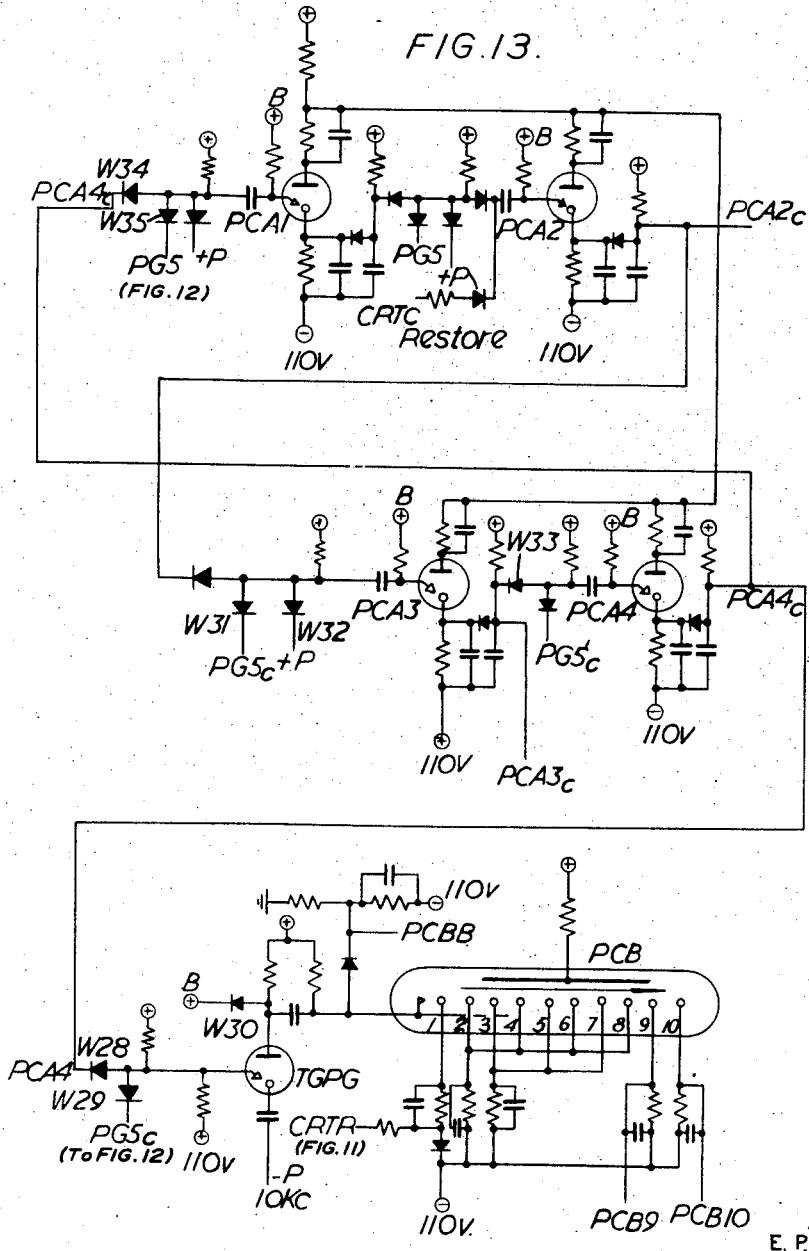

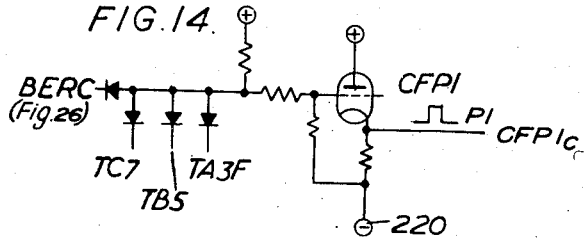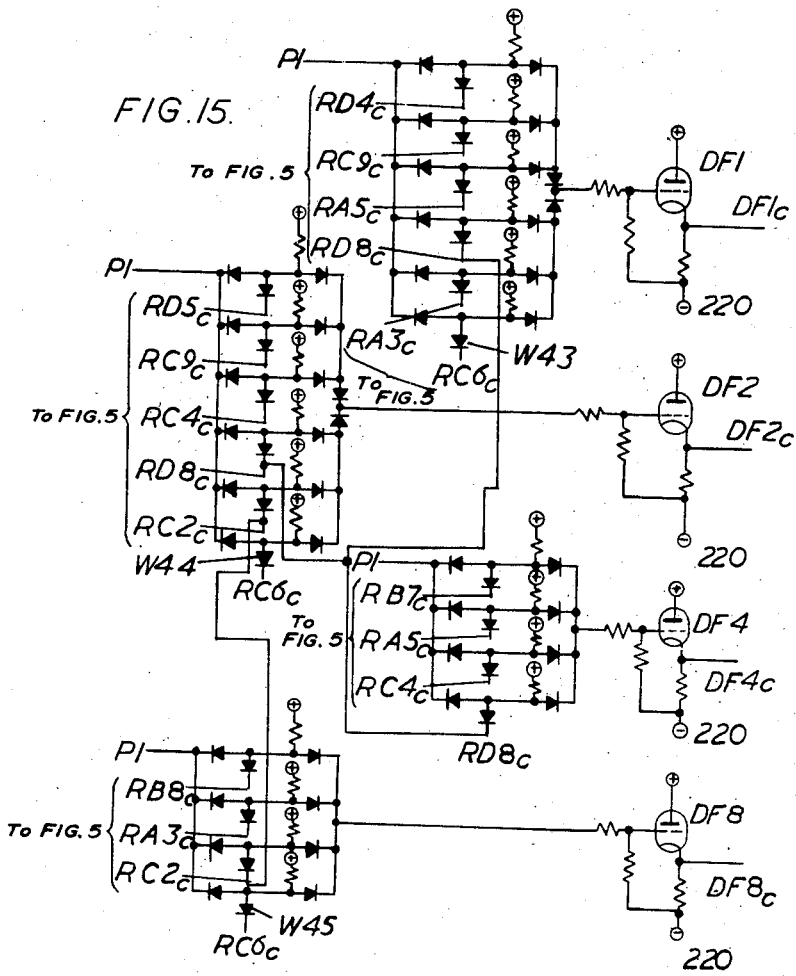

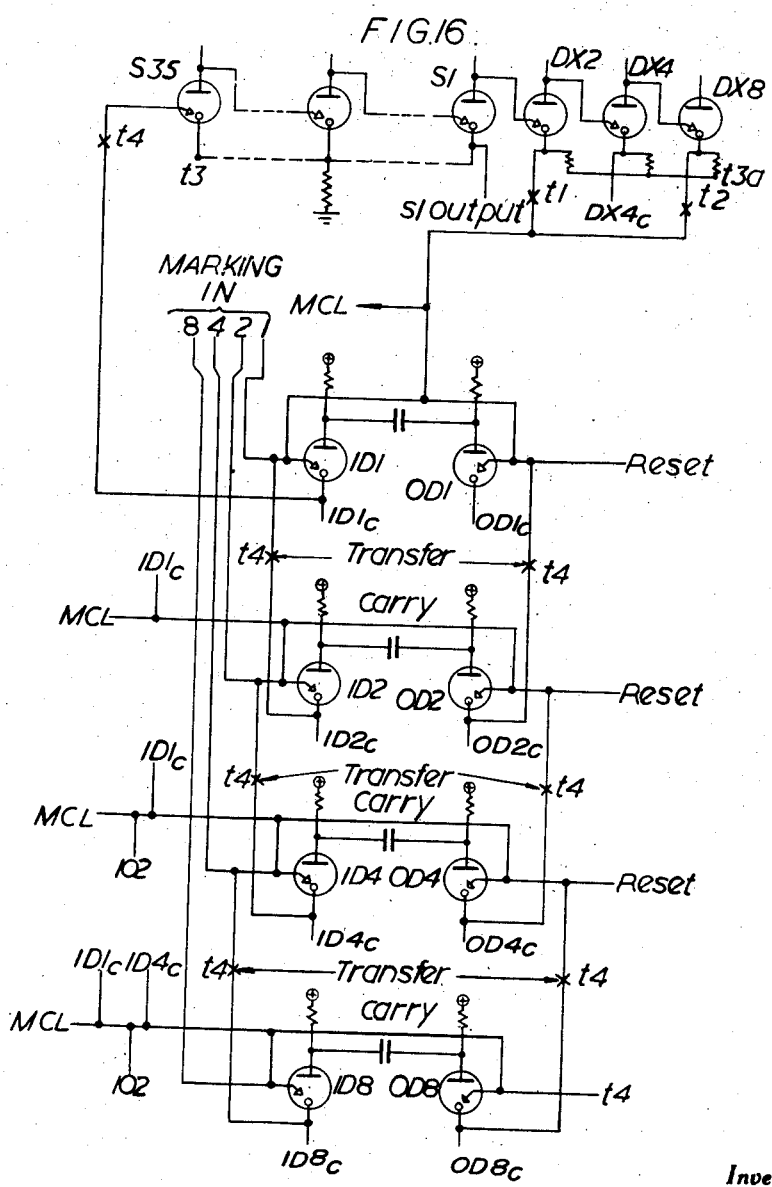

July 19, 1960 E. P. G. WRIGHT ET AL 2,945,625
INFORMATION HANDLING EQUIPMENT
Filed Aug. 16, 1954 39 Sheets-Sheet 17

Inventors
E. P. G. WRIGHT-
D. A. WEIR-
J. RICE
By
Attorney

NOTE DS1 and DS2 are in Fig.23

DF1 to DF4 are in Fig.15

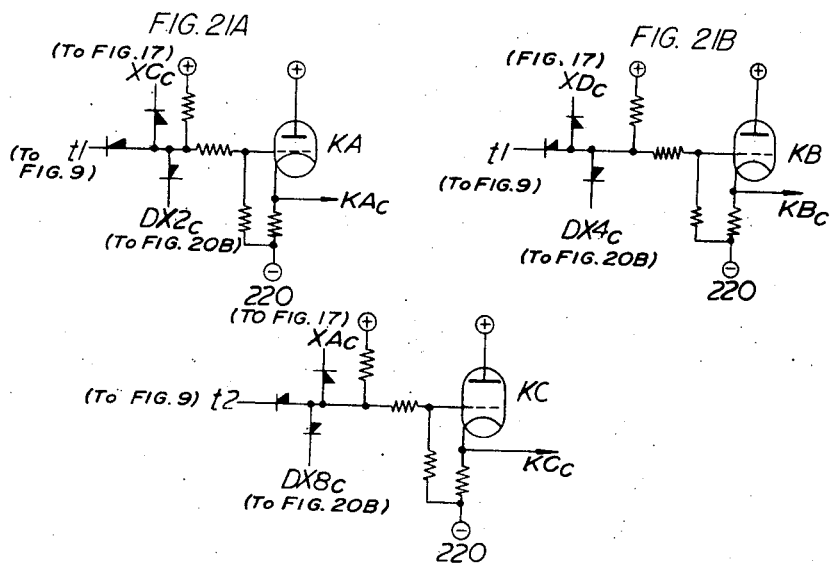

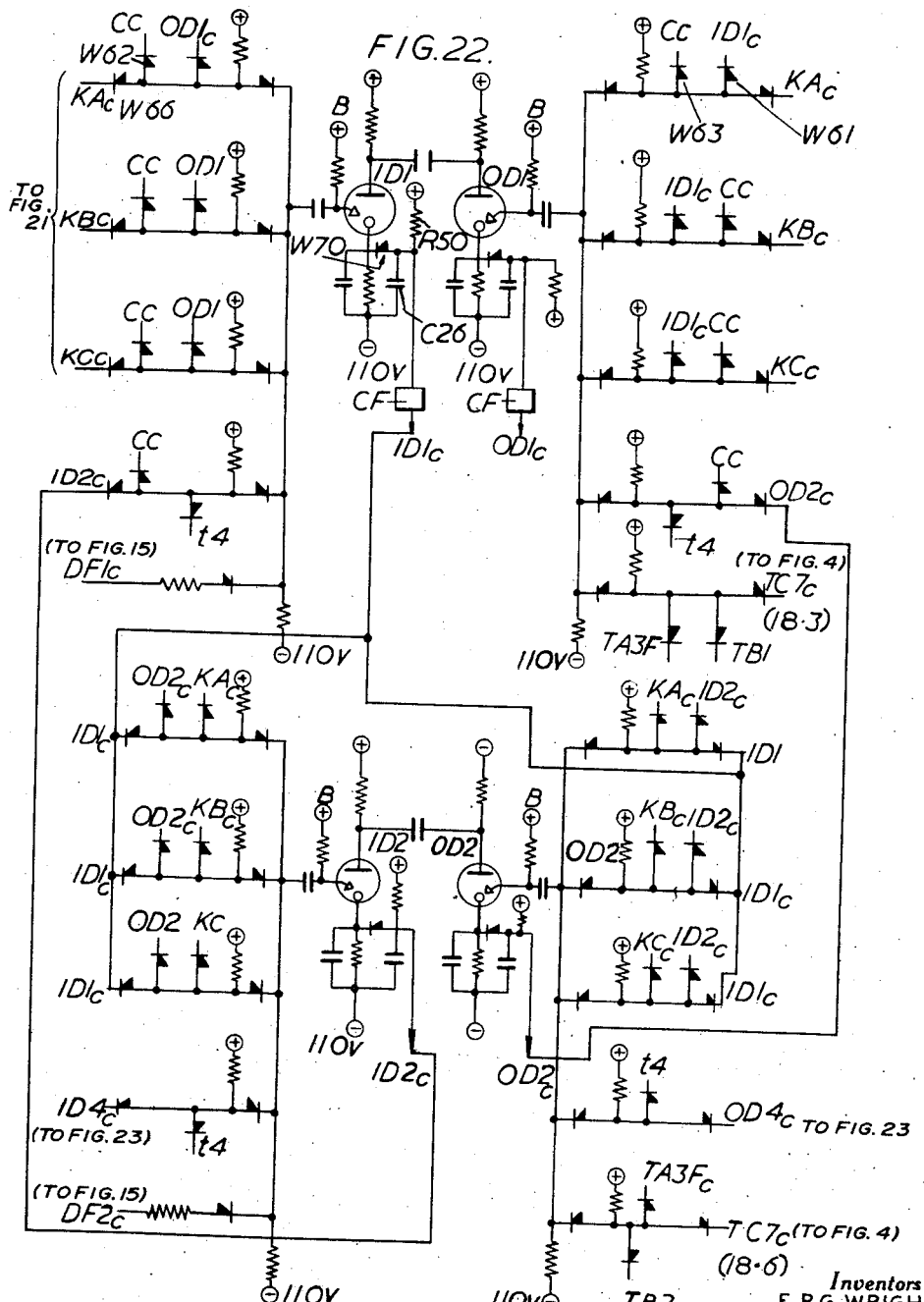

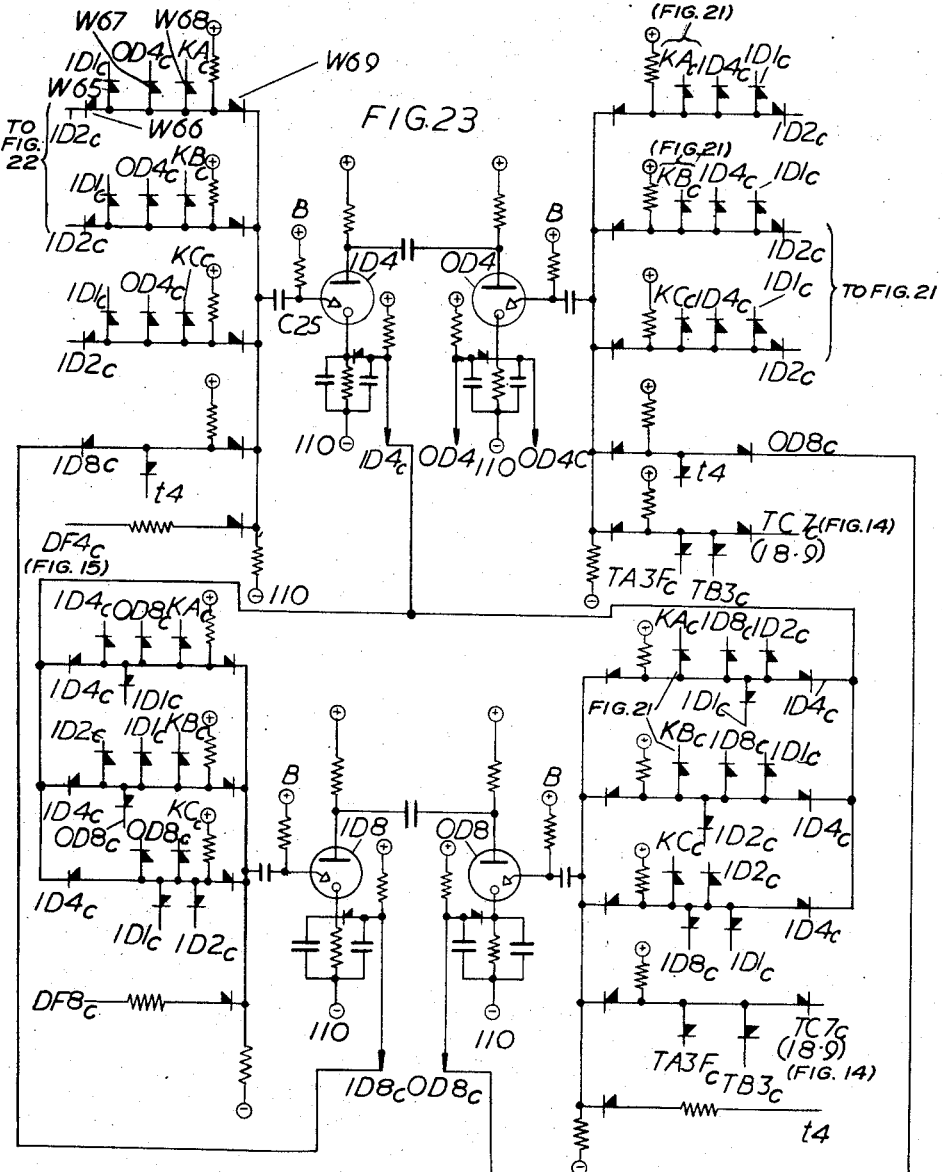

Inventors
E. P. G. WRIGHT
D. A. WEIR
J. RICE
By Robert Harding
Attorney

July 19, 1960 E. P. G. WRIGHT ET AL 2,945,625
INFORMATION HANDLING EQUIPMENT
Filed Aug. 16, 1954 39 Sheets-Sheet 26
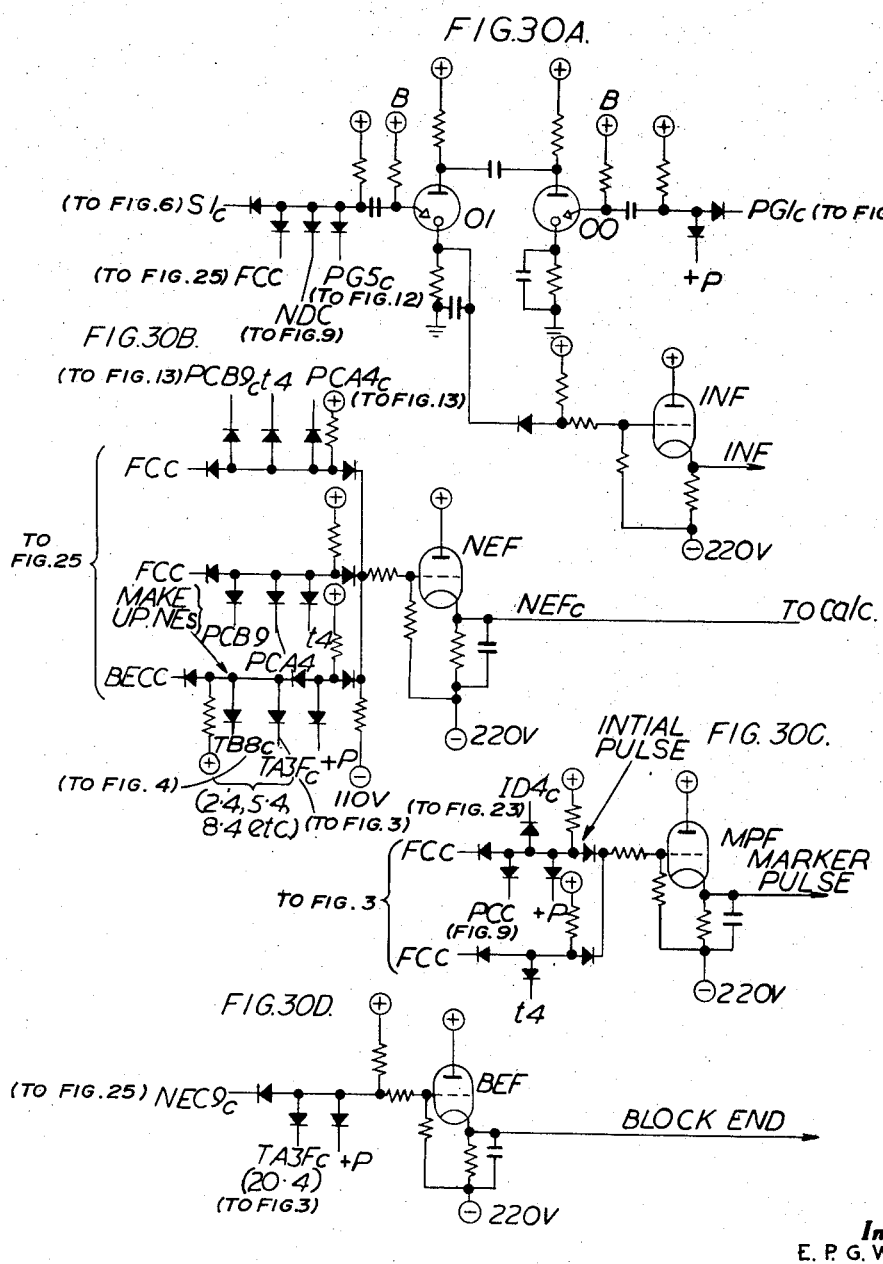
Inventors
E. P. G. WRIGHT
D. A. WEIR
J. RICE
By
Attorney

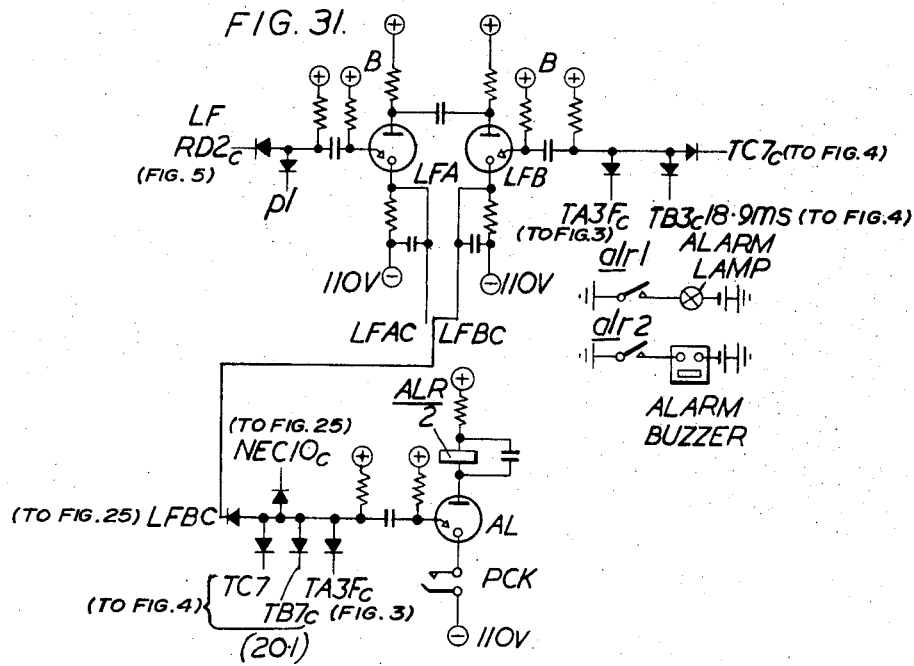
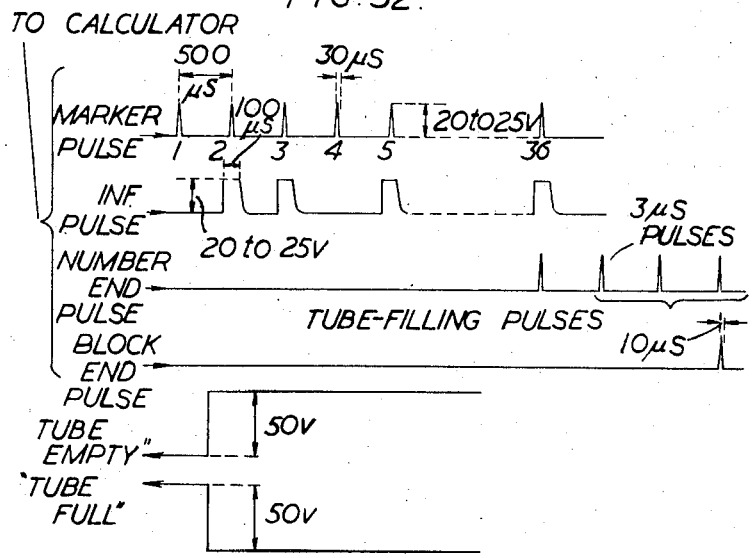

July 19, 1960

E. P. G. WRIGHT ET AL 2,945,625

INFORMATION HANDLING EQUIPMENT

Filed Aug. 16, 1954

*Inventors*
E. P. G. WRIGHT ·
D. A. WEIR ·
J. RICE
By
*Attorney*

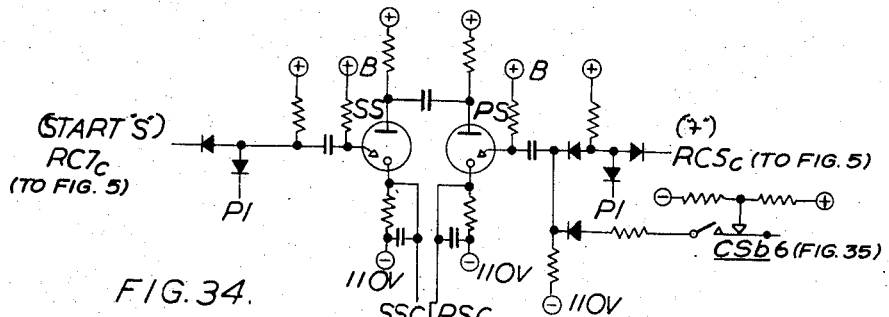
FIG. 34.
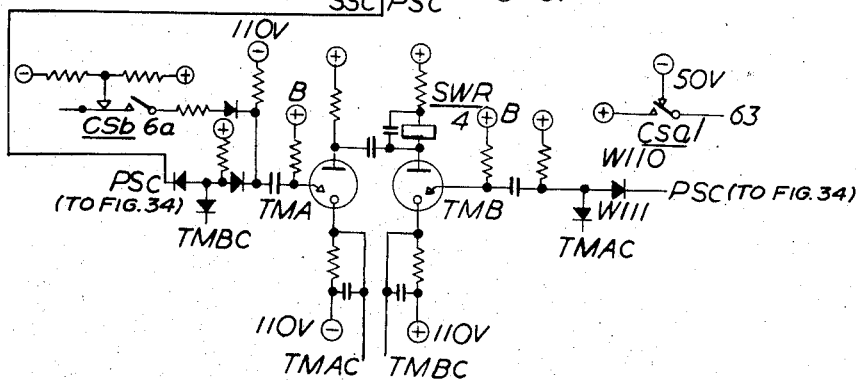
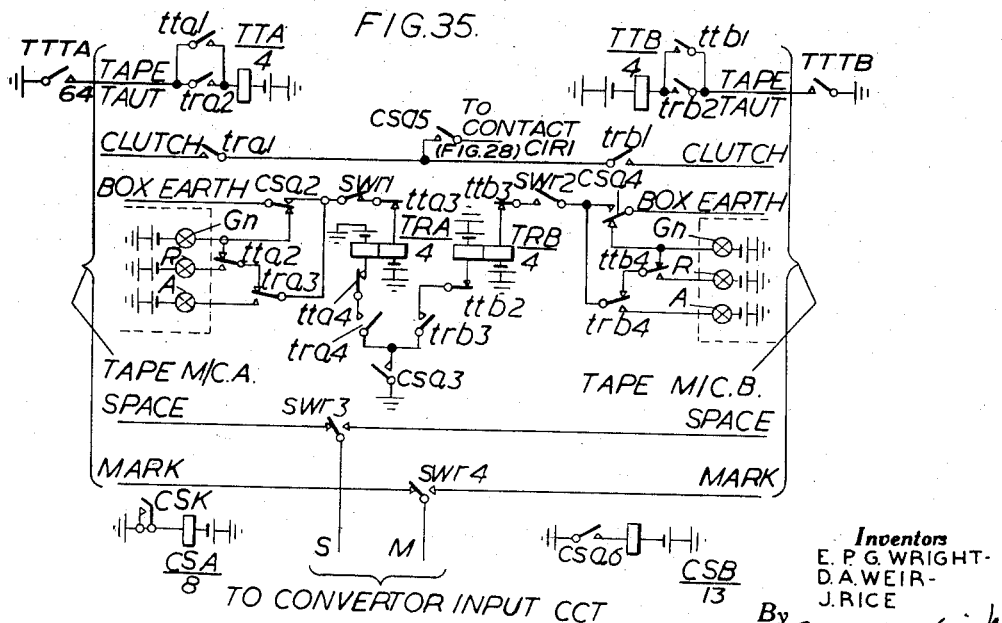
FIG. 35.

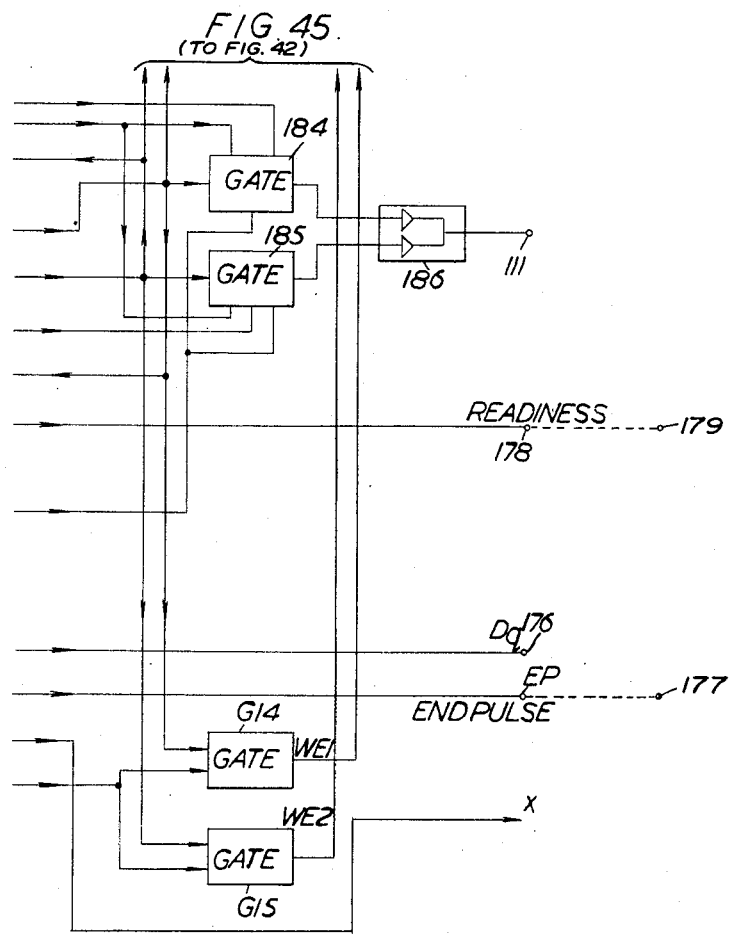

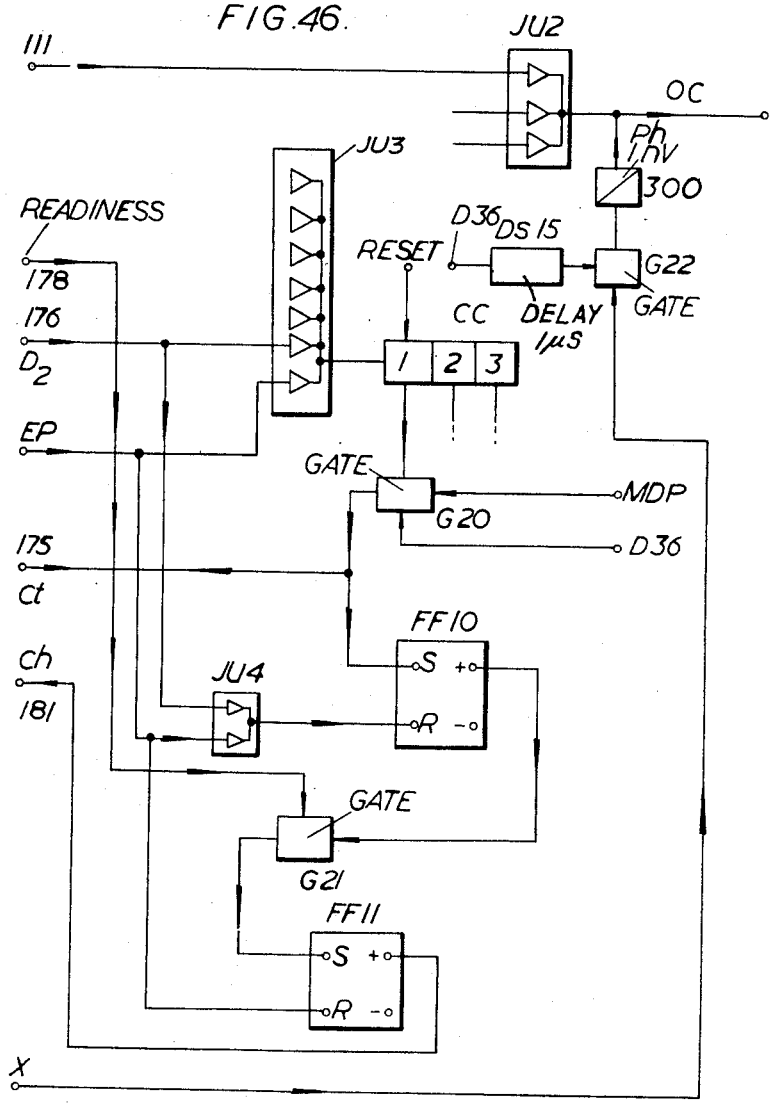

United States Patent Office 2,945,625
Patented July 19, 1960

2,945,625
INFORMATION HANDLING EQUIPMENT

Esmond Philip Goodwin Wright, Donald Adams Weir, and Joseph Rice, London, England, assignors to International Standard Electric Corporation, New York, N.Y.

Filed Aug. 16, 1954, Ser. No. 450,184

Claims priority, application Great Britain Dec. 2, 1949

5 Claims. (Cl. 235—155)

The present invention relates to information handling equipment, and especially to such equipment wherein information received in a first code form is converted into information in a second code form.

This application is a continuation in part of application Ser. No. 198,326, entitled "Electric Signalling Systems," filed November 30, 1950, now abandoned.

It is an object of the present invention to supply information to an output channel at a speed which is in excess of the speed at which that information was received by the equipment.

It is a further object of the invention to enable information from several input circuits to be passed to an output channel.

The present invention attains these objects by the provision of information handling equipment having, input equipment over which information is received, an output circuit over which information may be transmitted, a converter for converting said information from one form of presentation to another, and means whereby received information is fed from said input equipment to said output circuit via a plurality of stages at successively higher speeds with intermediate conversion of the form of presentation of said information by said converter between two of said stages.

The invention will now be described with reference to one embodiment thereof shown in the accompanying drawings, in which:

Figs. 1 and 2, of which Fig. 2 should be placed below Fig. 1, together show a block schematic of information handling equipment according to the present invention.

Figs. 3 and 4 together show a pulse frequency divider arrangement which controls the production of a variety of timed pulses which are used to control the operation of the equipment. Fig. 3 shows a start-stop flip-flop and the first stage of the divider, while Fig. 4 shows the second and third stages of the divider. This divider can conveniently be designated a time scale.

Fig. 5 is a block schematic of apparatus for decoding information received in printing telegraph code, the decoding being to an electrical potential on one of a discrete number of leads, i.e. into what can conveniently be designated one of a discrete number of "point markings."

Fig. 12 is a more complete circuit of the $t$ pulse generator circuit shown schematically in Fig. 9.

Fig. 13 is a complete circuit of the $t$ pulse counter circuit shown schematically in Fig. 9.

Fig. 14 is the P1 pulse generator.

Fig. 15 is the digit marking circuit.

Fig. 16 is a schematic circuit diagram of simultaneous multiplication and addition circuits forming part of a conversion circuit used in the equipment to be described hereafter.

Figure 18A:
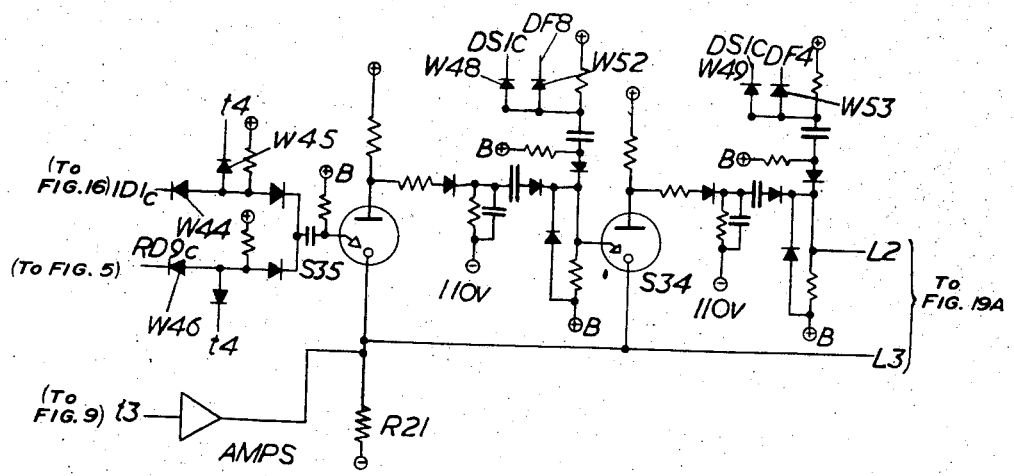
Figure 18B:
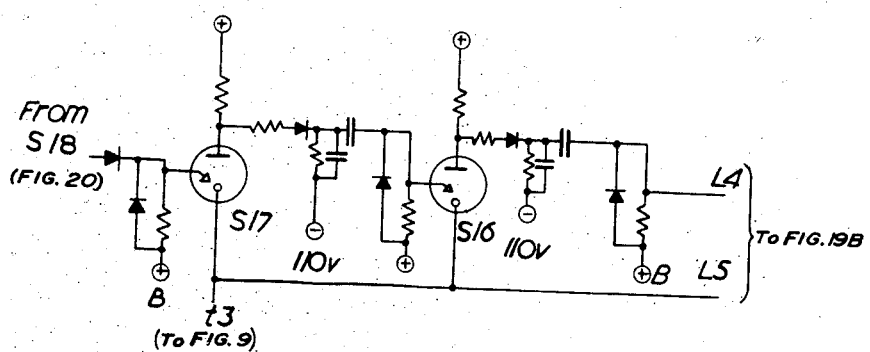
Figure 19A:
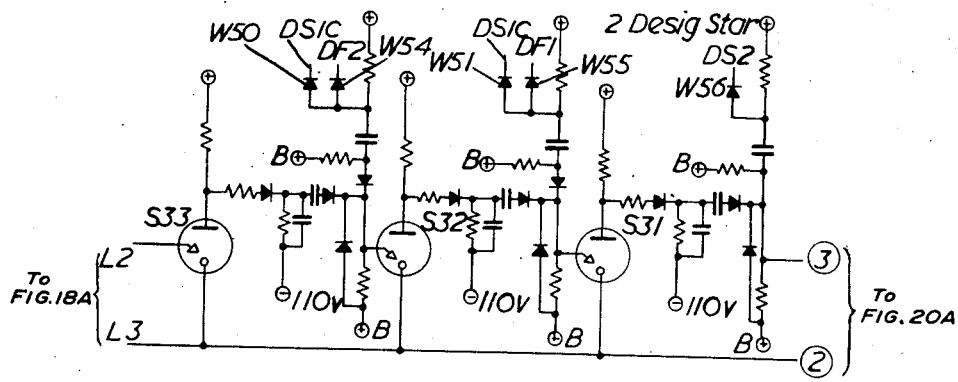
Figure 19B:
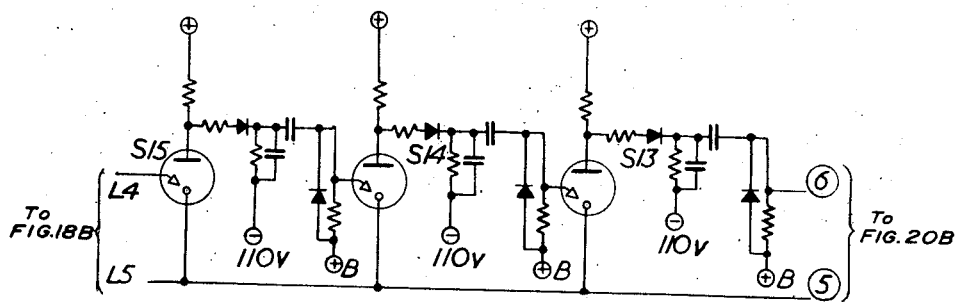
Figure 20A:
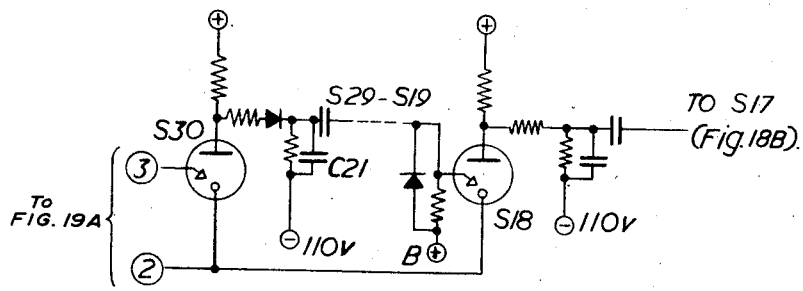
Figure 20B:
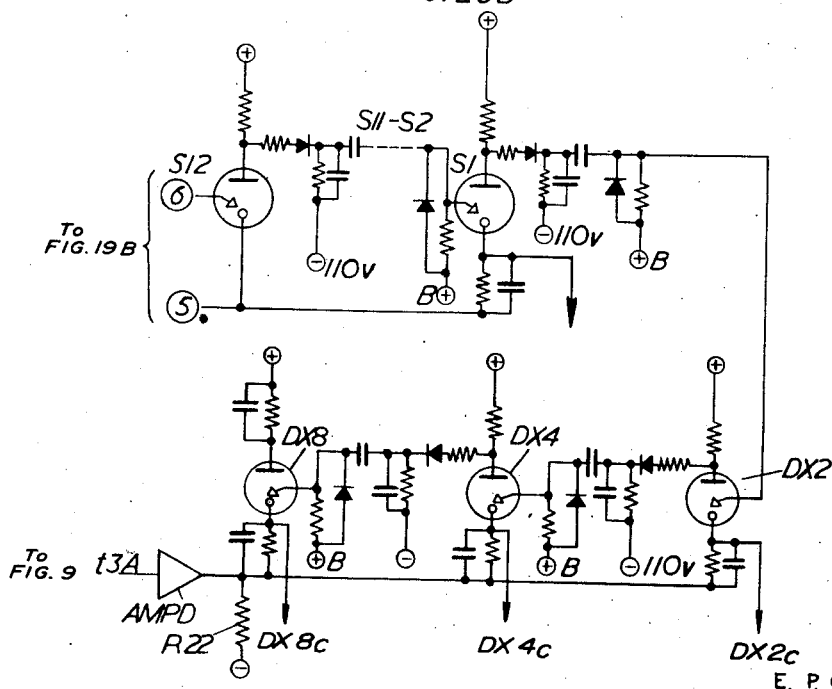

Figs. 18A, 18B, 19A, 19B, 20A and 20B of which Figs. 19A and 19B should be placed to the right of Fig. 18A and Fig. 18B and Figs. 20A and 20B should be placed to the right of Figs. 19A and 19B, together show a more complete circuit diagram of the running total chain and displacement tubes which form part of the circuit of Fig. 16.

Figs. 21A, 21B and 21C show three cathode followers which are known as digit train cathode followers.

Figs. 22 and 23 show complete circuits of the digit train of binary flip-flop pass which are included in the schematic circuit of Fig. 16.

Figure 17:
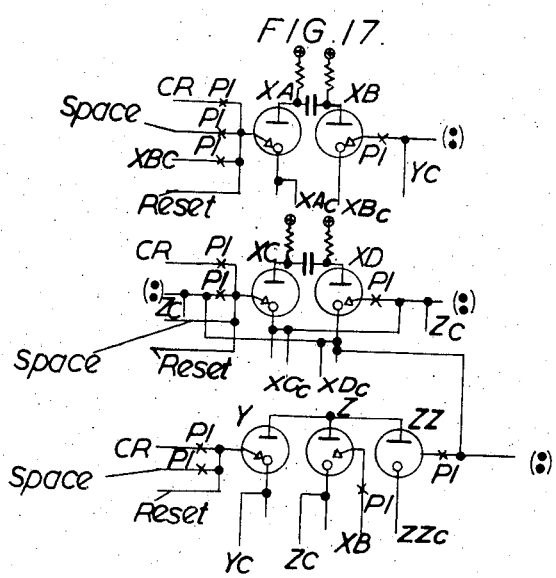
Fig. 17 is a schematic diagram at the multiplication control circuit which is operationally associated with the circut of Fig. 16. This figure also includes an explanatory table.
Figure 24:
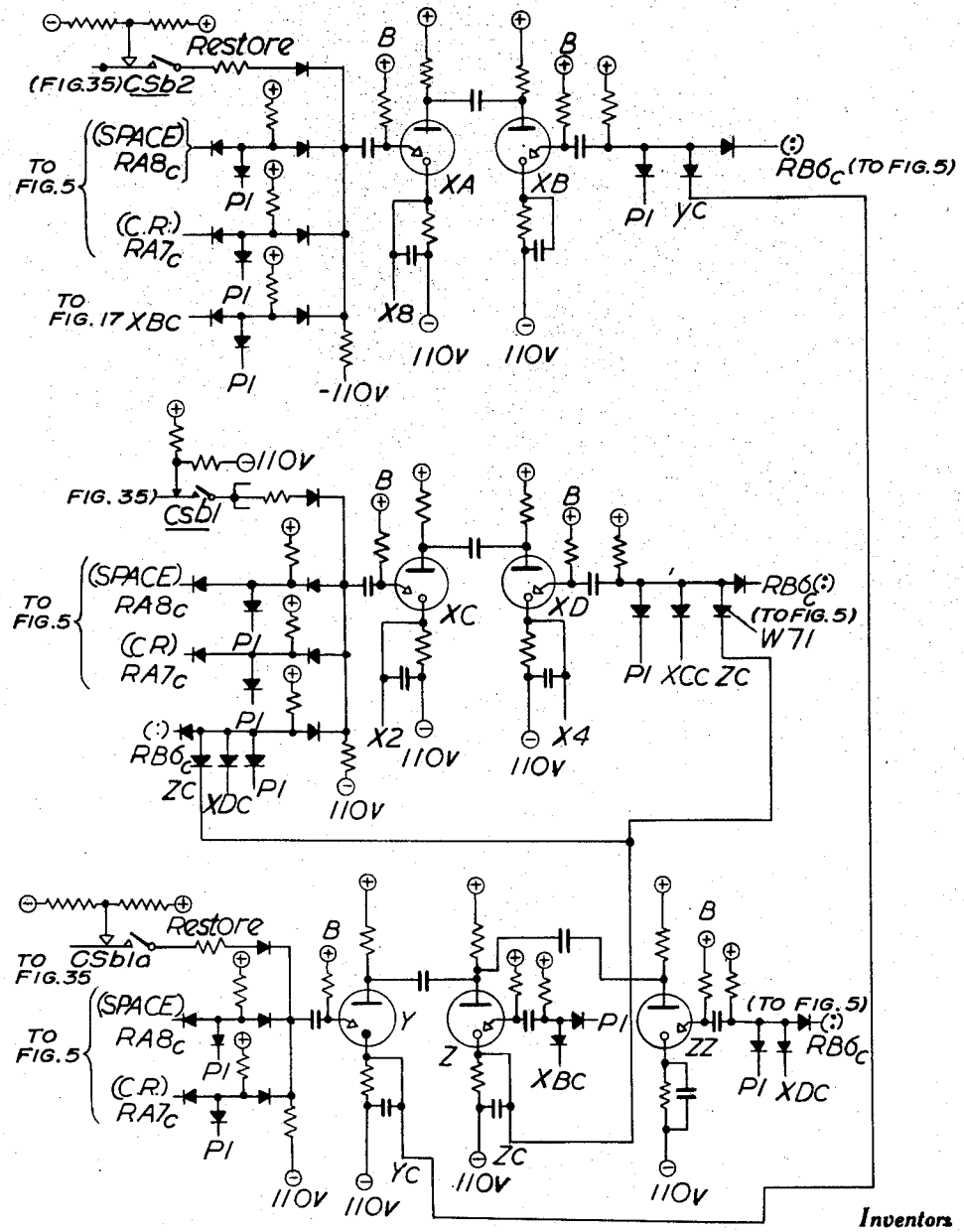

Fig. 24 is a detailed circuit of the multiplication control circuit shown schematically in Fig. 17.

Figure 25:
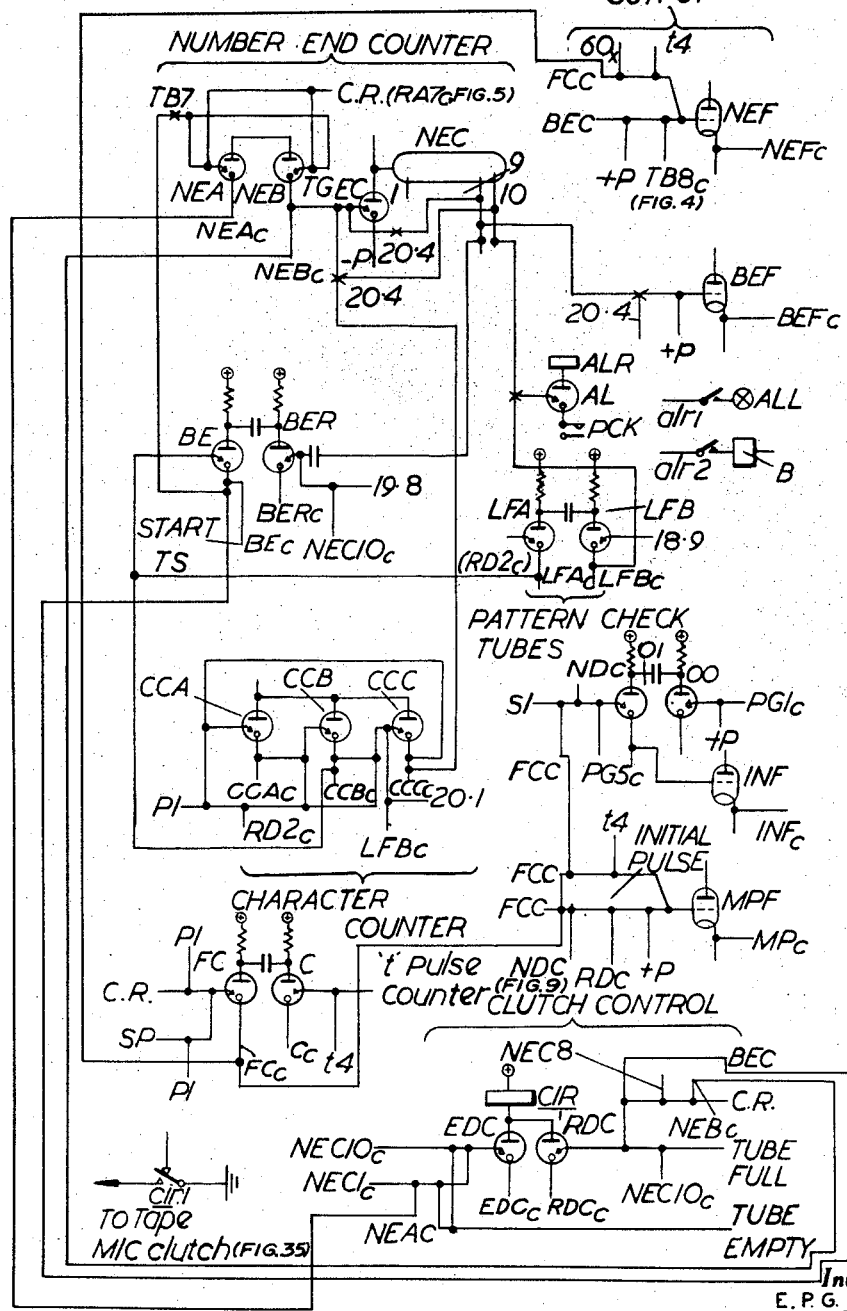

Fig. 25 shows schematically circuit for number-end, block-end, information output, and clutch control.

Figure 26:
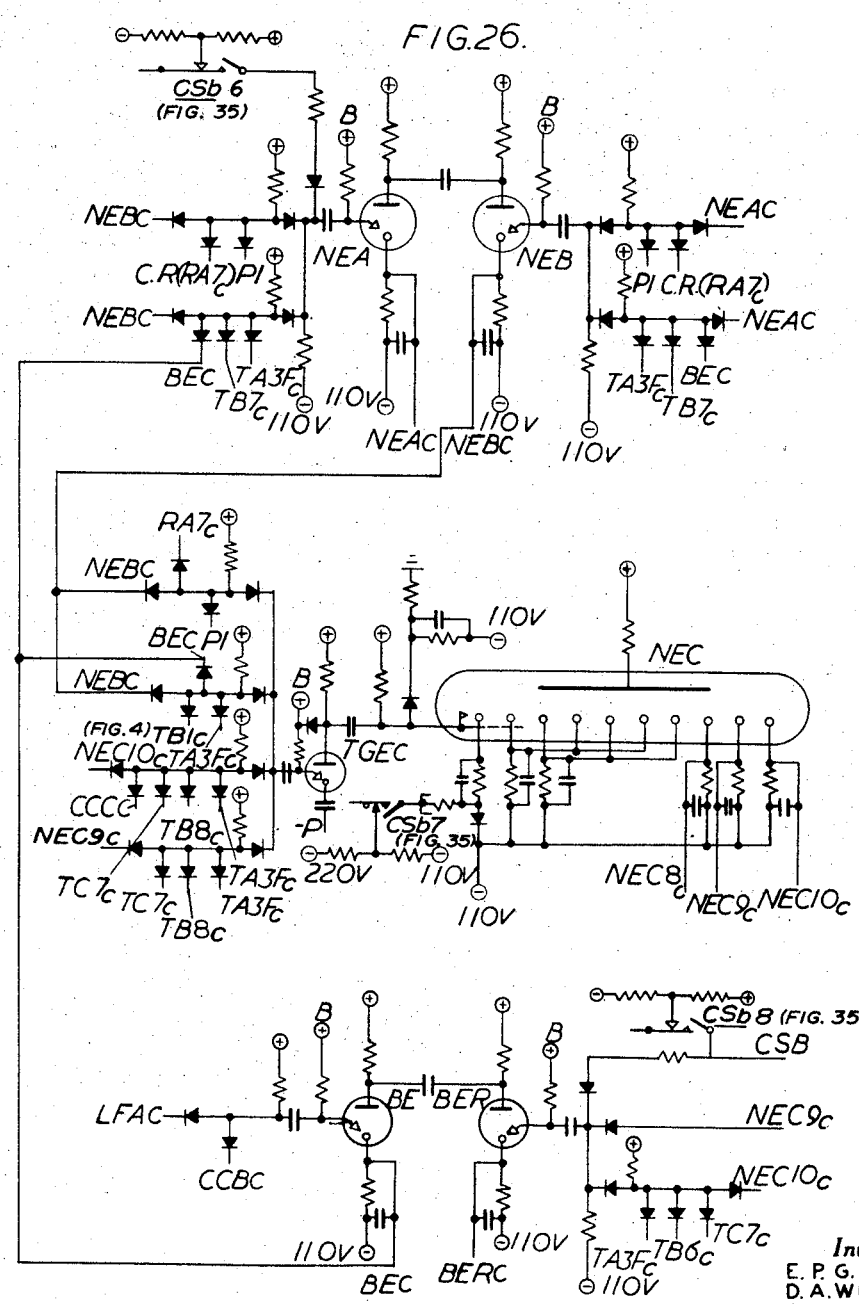

Fig. 26 is a complete circuit of the number-end counter and the block-end flip-flop shown schematically in Fig. 25.

Figure 27:
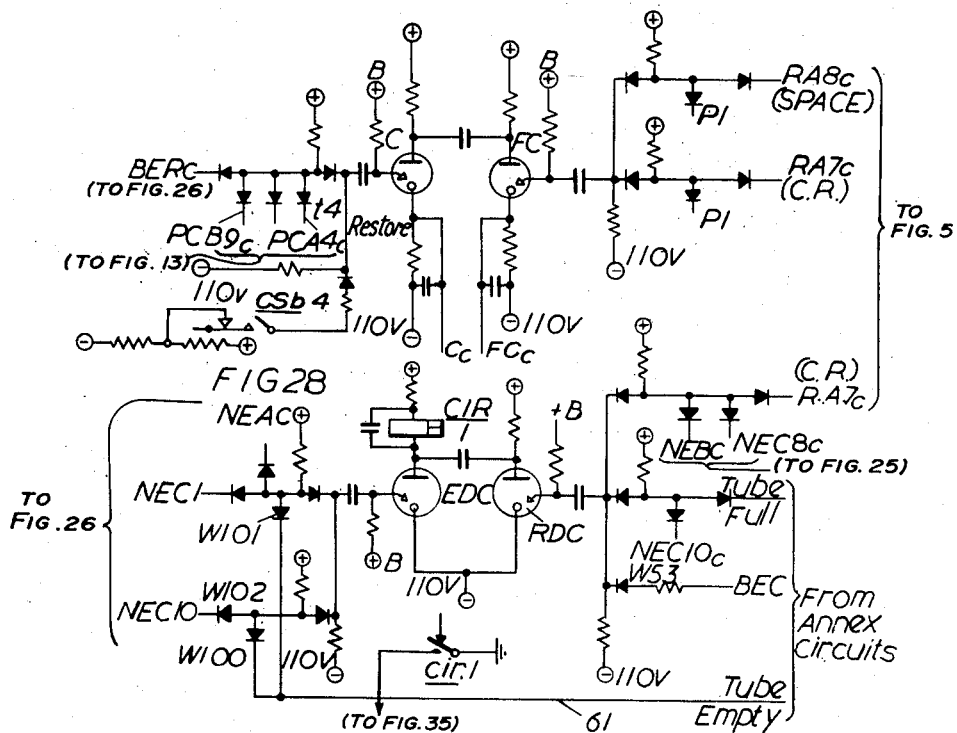

Fig. 27 is a complete circuit of the feed control circuit shown schematically in Fig. 25.

Fig. 28 is the clutch control circuit.

Figure 29:
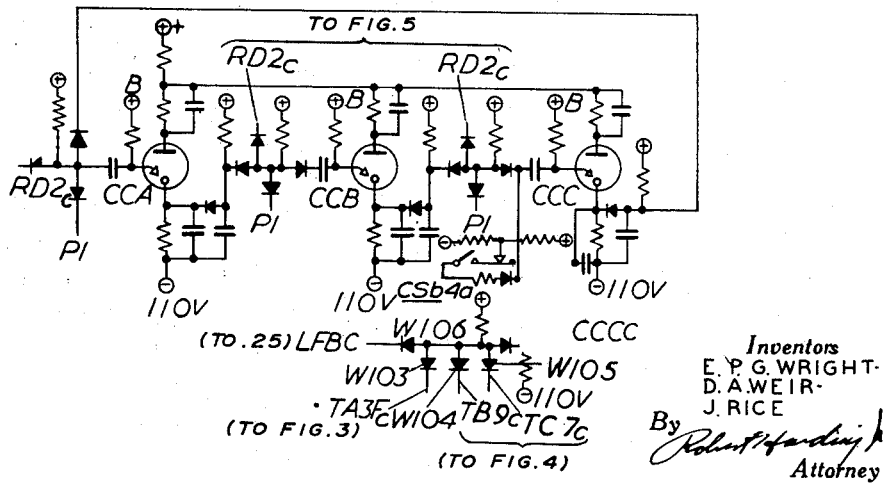

Fig. 29 is character counter circuit.

Figs. 30A, 30B, 30C and 30D are the input control circuit.

Fig. 31 is the pattern check and alarm circuit.

Fig. 32 is a chart of waveforms of signals between converter and annex.

Figure 33:
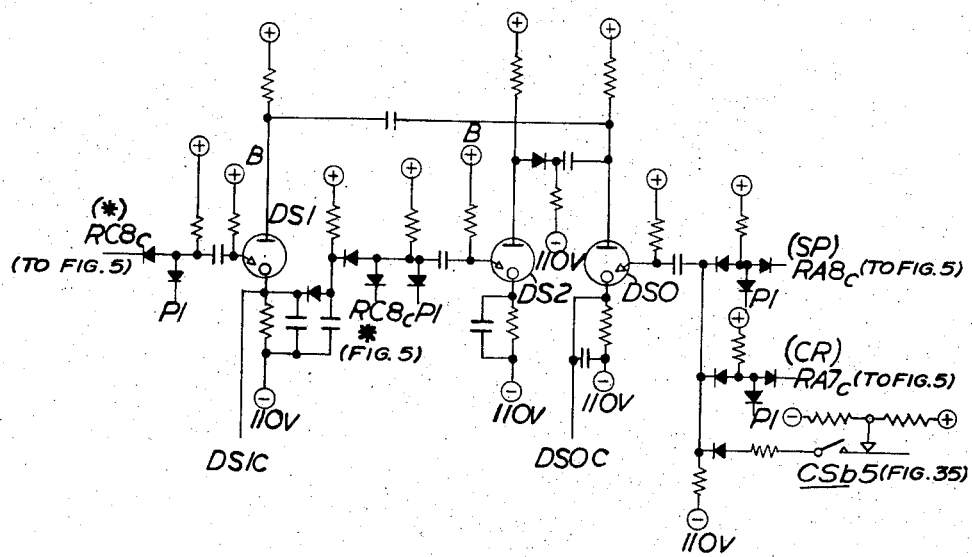

Fig. 33 is the designation star circuit.

Fig. 34 is the start and end detector.

Fig. 35 is the machine switching circuit.

Figure 36:
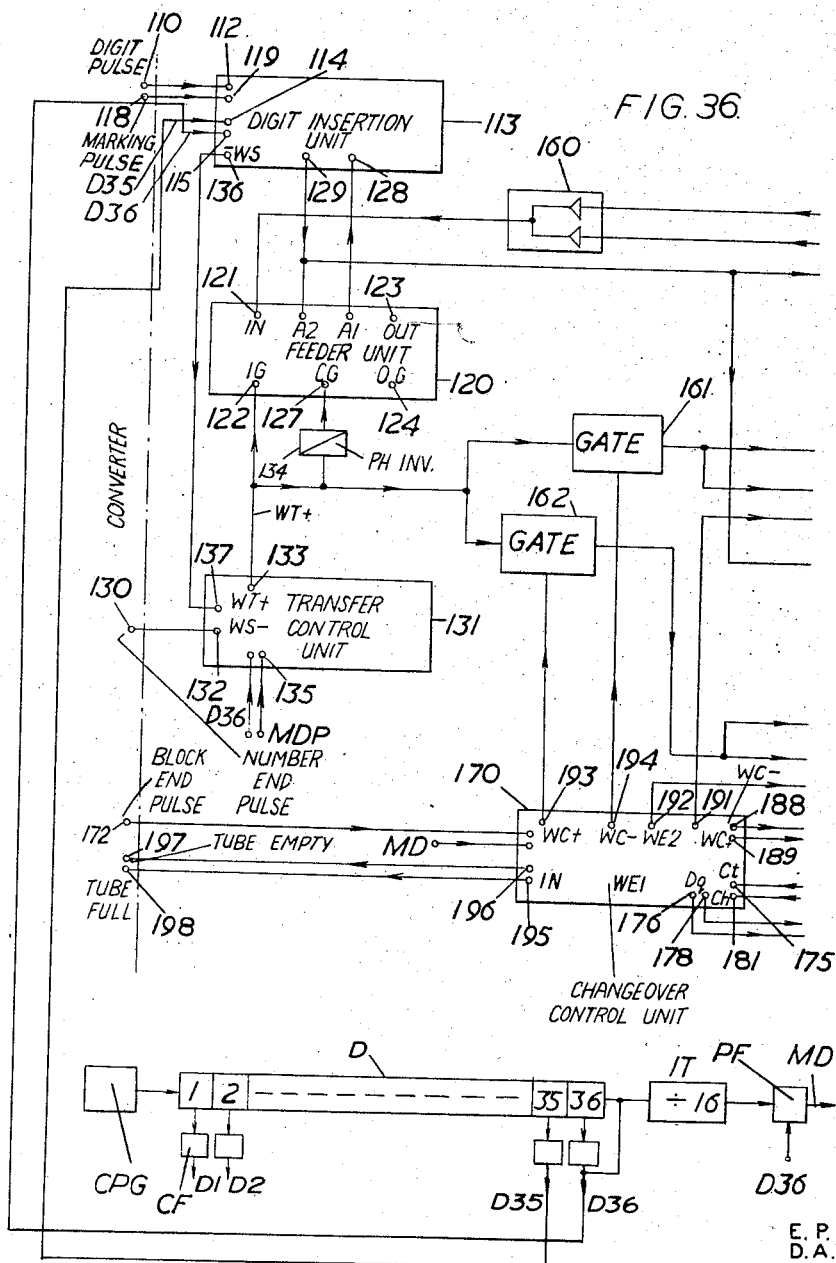
Figure 37:
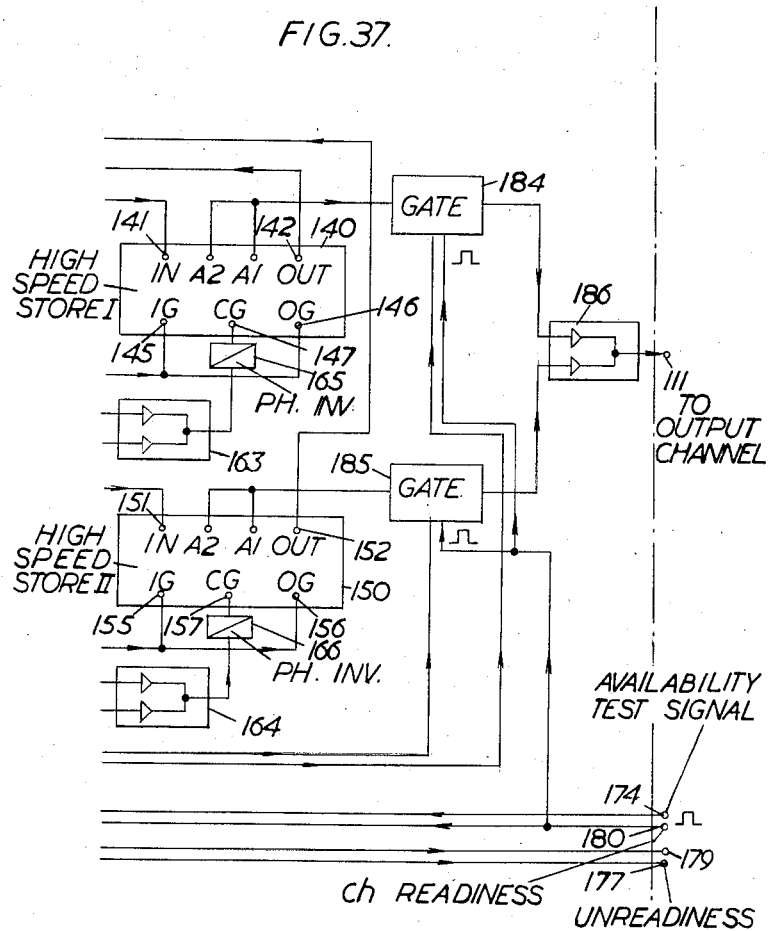

Figs. 36 and 37, of which Fig. 37 should be placed to the right of Fig. 36, show a general block schematic of the annex circuits.

Figure 38:
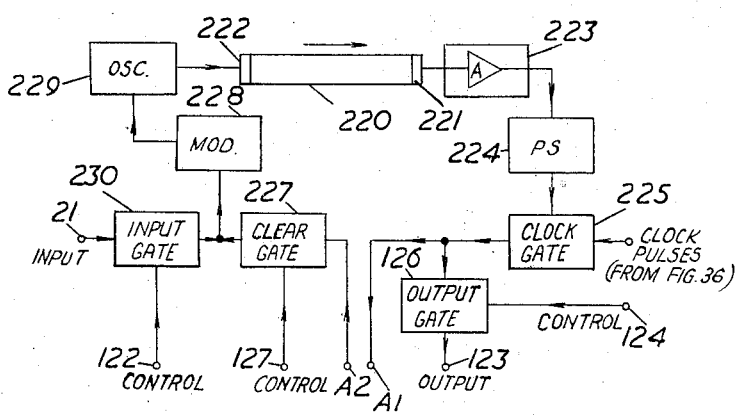

Fig. 38 is a block diagram of a mercury delay line storage unit.

Figure 39:
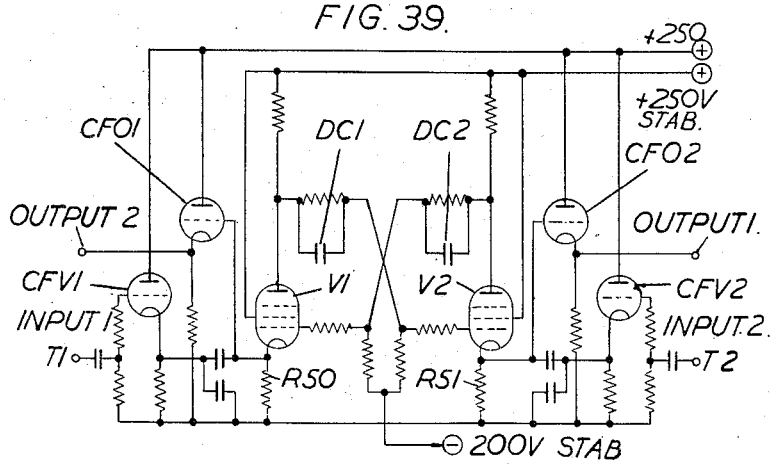

Fig. 39 is a circuit diagram of a flip-flop.

Figure 40:
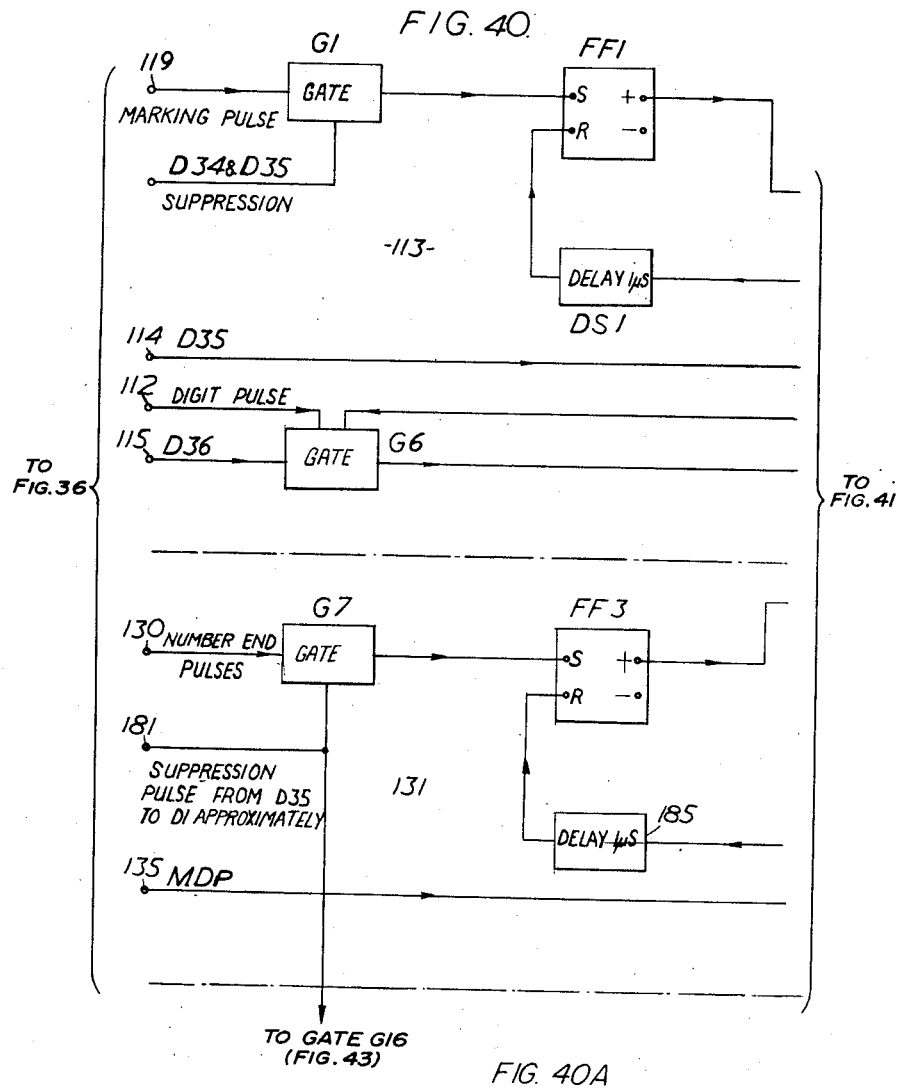
Figure 41:
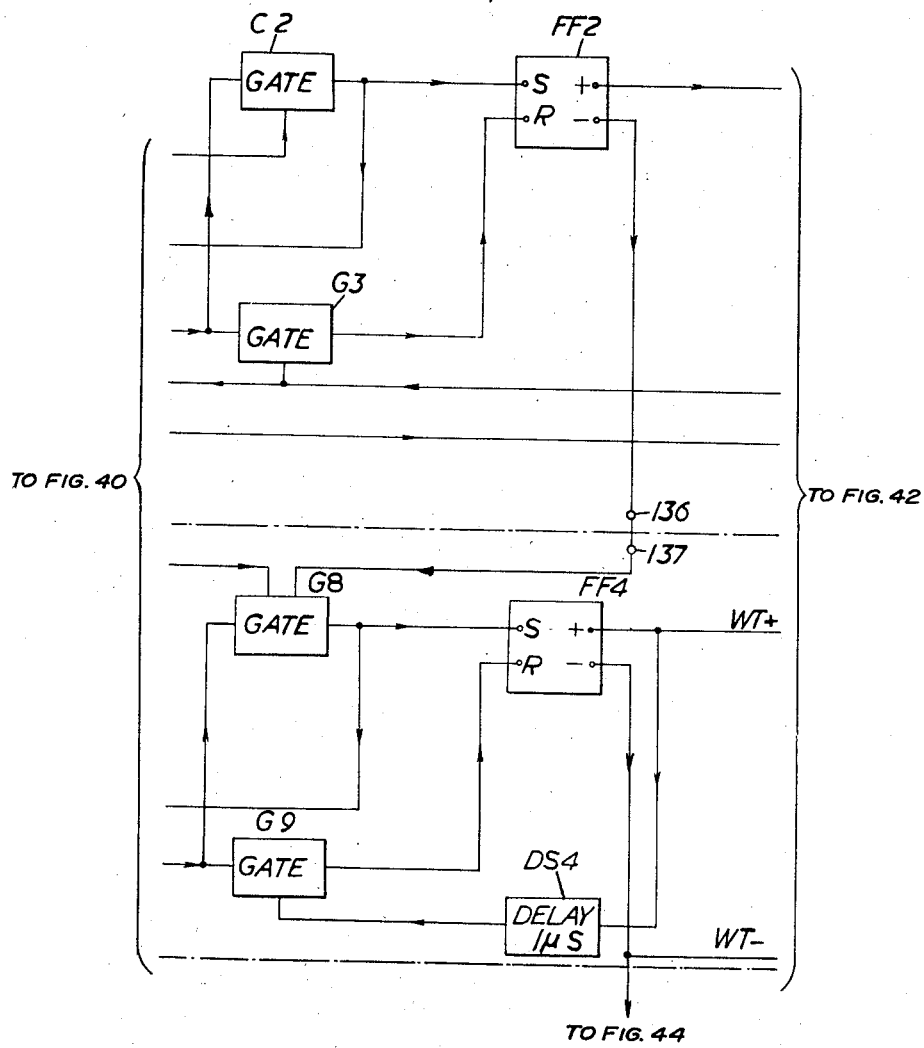
Figure 42:
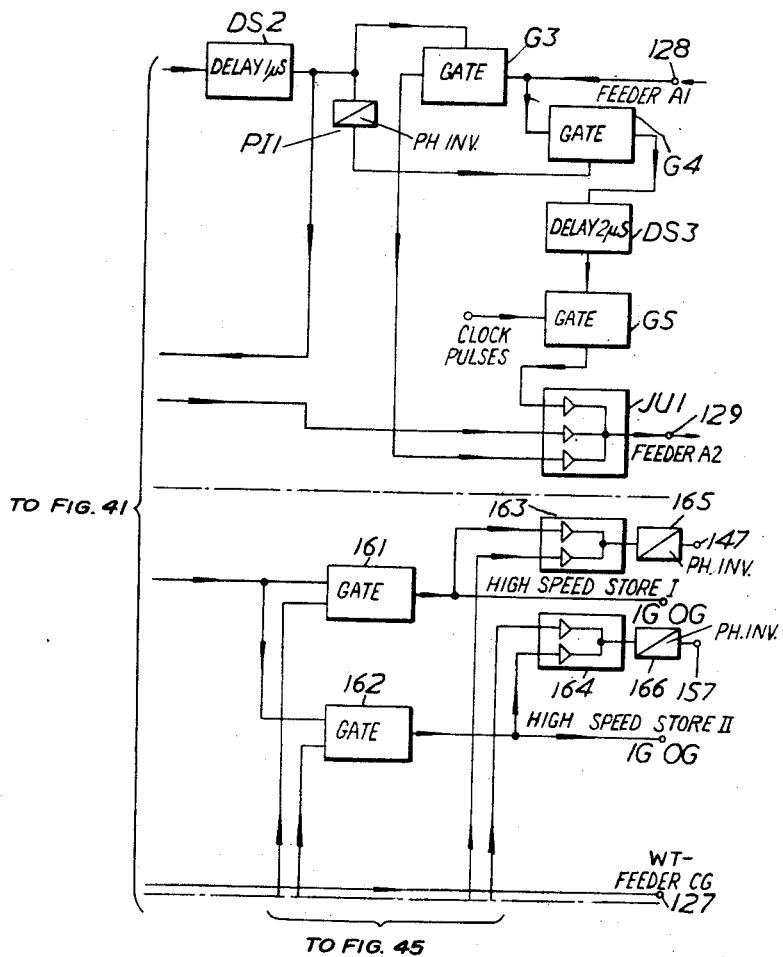
Figure 43:
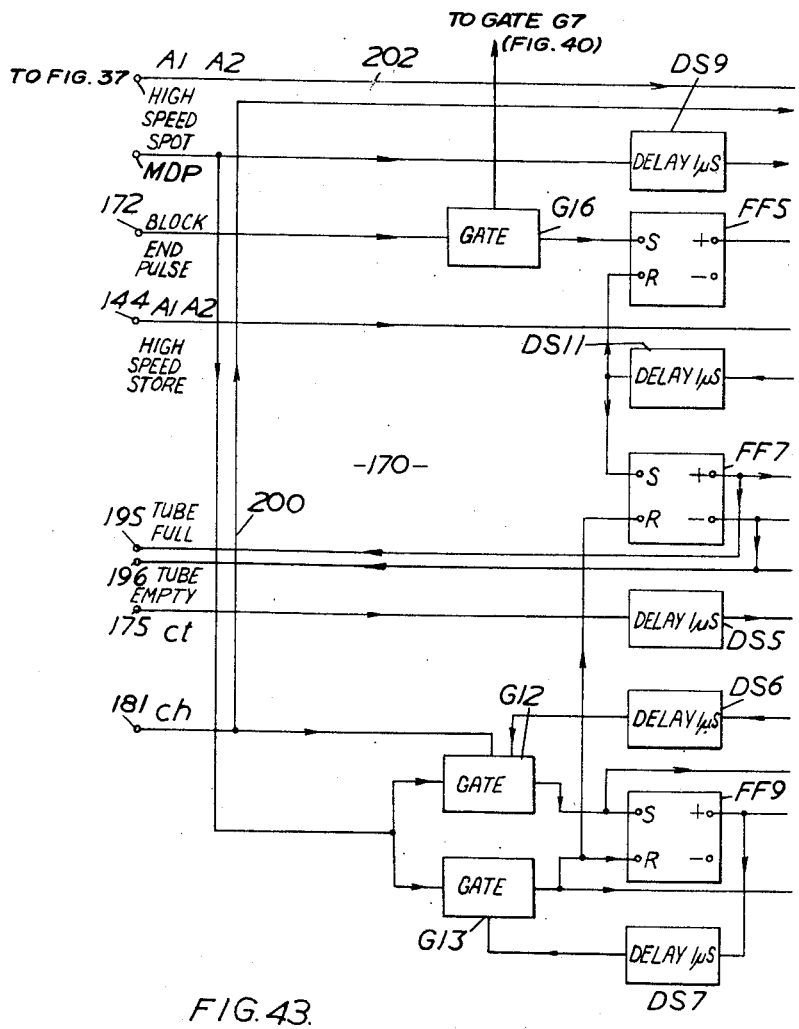
Figure 44:
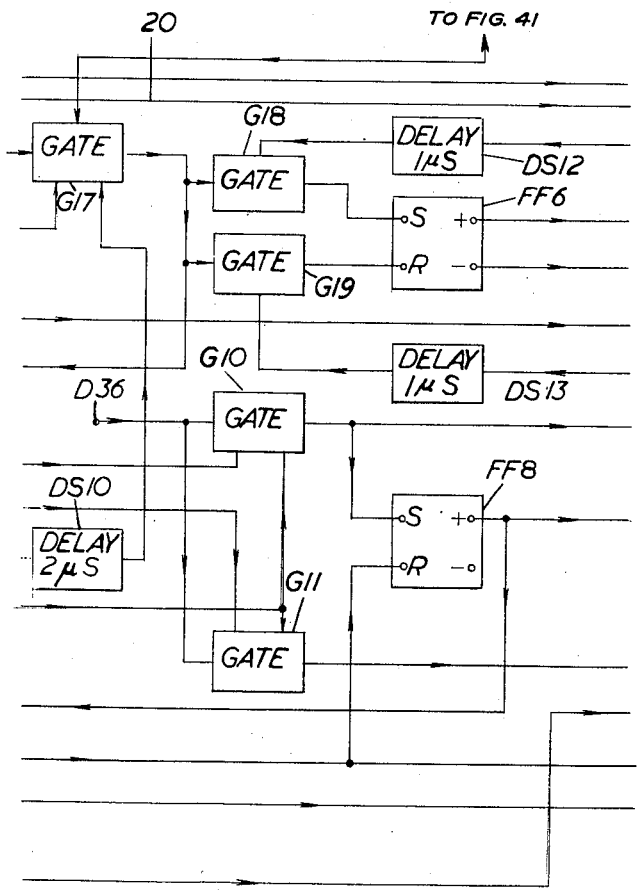

Figs. 40–45 which should be arranged as shown in the inset Fig. 40A, show a more detailed circuit of the annex circuit.

Fig. 46 is the annex output circuit.

Figure 6:
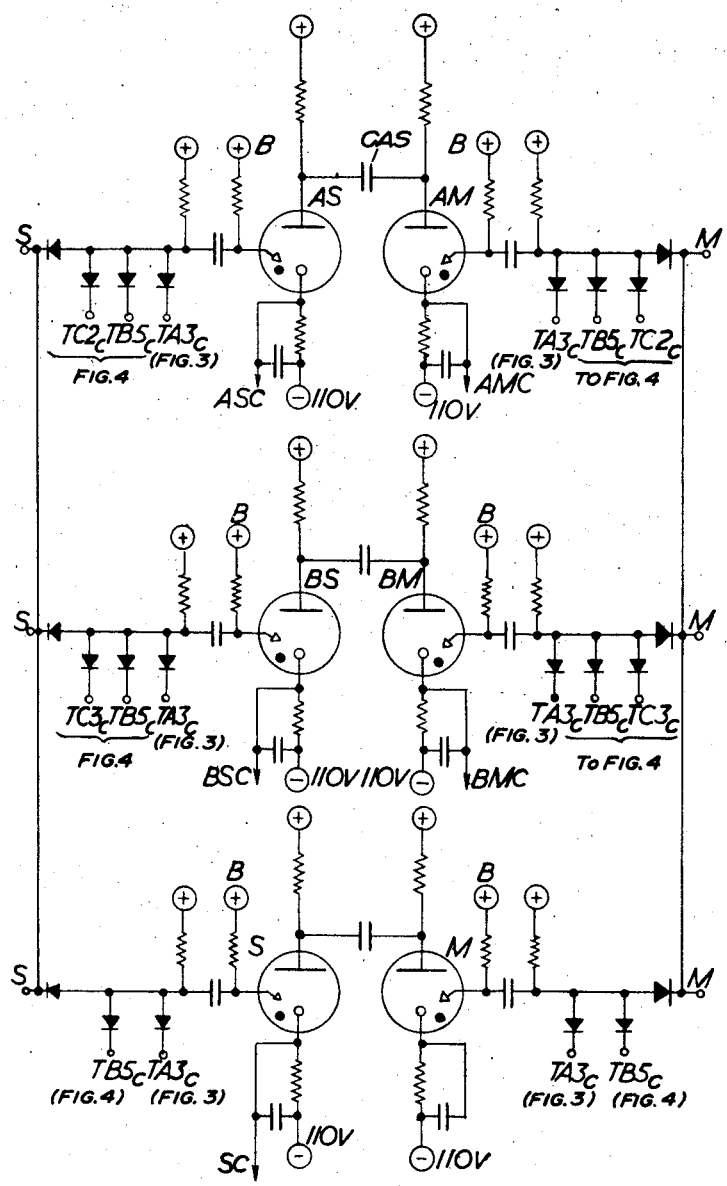
Fig. 6 shows in detail circuits of the three flip-flops included in the decoding equipment of Fig. 5.

In the several figures of the drawing, in order to avoid confusion many leads between elements have been purposely omitted, but the two ends to which each such lead would be connected have been identified by the same reference numeral. Thus, for instance, in Fig. 4, there is assumed to be a connection between the last cathode of tube TB and the trigger electrode of tube TGC. It will be noted that the same reference legend "TB10" is applied to the last cathode of tube TB and the trigger electrode input of tube TGC. In Fig. 6, for instance, there will be seen a number of terminals of rectifiers coupled to the trigger electrodes of tubes AS, AM, BS, BM, S and M. Many of these terminals have similar reference numerals such as "TB5." This implies that all such terminals are connected in parallel to the fifth cathode of tube TB in Fig. 4 and labelled "TB5." Electro-mechanical relays, such for instance, as relay ALR, in Fig. 25, have a numeral indicated under the relay designation, the numeral being indicative of the number of contacts associated with the relay and detached therefrom. Thus, the contacts alr1 and alr2 will be found elsewhere on Fig. 25 than in association with the winding ALR.

In the embodiment of the present invention which has been described herein, the information which reaches the apparatus over one of a number of input channels is received from a record position. At each record position there is a magnetic tape recorder on which the information has been recorded in printing telegraph code. This information may be either in decimal notation or in a currency notation; in the present instance it is in sterling notation.

The information has to be converted into binary notation in the case of sterling, the conversion being to a binary number representing the number of pence, halfpennies, farthings or tenths of pence. In the case of a decimal currency such as dollars and cents, conversion is to a binary number which represents cents or tenths of cents. It is a further characteristic of the output circuit which is fed from the equipment described that information is transmitted thereover at a very high pulse repetition rate. To achieve this, the information is received at a first speed in printing telegraph code and the number which each group of characters referred to is converted digit-by-digit into a binary number. This binary number is assembled during the process of conversions in a storage circuit known as a running total train. When the number has been fully received and converted it is applied via switching equipment to one of a plurality of high speed storage devices, which feed the output channel in turn. Thus the converted number is transmitted as a short "burst" of impulses at a very high repetition rate, so that a large number of inputs can be "served" by one output channel.

In the example which is described herein it is assumed that each high-speed storage device is a mercury delay line, although other forms of high-speed storage devices could equally be used. The manner in which numbers are inserted into these storage devices will be described in due course.

The information reaches the conversion equipment from the tape machines referred to above in start-stop printing telegraph code at 333.3 bauds, at which speed each element occupies 3 milliseconds, and each character 21 milliseconds. It is therefore necessary to provide a start-stop receiver and decoder. Certain additional information accompanies the information, this being conveyed by numbers which are inserted in the digital train produced by the converter at the end of the train. This additional information identifies the informational digital train to which it is appended, and it reaches the equipment as printing telegraph characters following the information to which it relates. Therefore the decoder is arranged to decode all characters which are received, and to produce a different "point marking" for each character, whereby the special characters which convey the additional information may be recognised. As already mentioned, these special characters state what the information to which they refer is, for example, the number could be a stock exchange quotation, or a workman's wages; in certain cases one of the special characters can be used to indicate that the number it refers to is a negative number.

After receipt, decoding and conversion, the binary number so produced is transmitted to a feeder circuit which it reaches via the output, the feeder circuit forming an intermediary between the running total train referred to above and the high-speed storage devices. This output circuit includes facilities for transmitting information pulses, marker or step pulses, number end pulses and block end pulses. The purposes of these will be described later. The number of number-end pulses must also be counted so that block-end pulses can be generated at the appropriate times.

This assumes that a block of information as transmitted by the output circuit consists of a constant number of items. To ensure that the converter does not become "choked" by receiving information for conversion before the running total train has been cleared, it is necessary to control the tape machines feeding a converter in such a way that no information is mutilated or lost.

The longest number which is to be catered for has 34 binary digits, and this, plus a sign digit is the number of digits which the running total train, and also the feeder circuit, can hold. A block of numbers is assumed to consist of 16 numbers, and when 16 number-end signals have been produced, a block end signal is produced. Where a block of information consists of less than 16 numbers, it is convenient in order to reduce the complexity of the system to produce enough extra number-end signals to make the number of number-end signals up to 16, and to follow these with a block-end pulse. This admittedly wastes a certain amount of line time, but this waste is compensated for by the saving in equipment.

The conversion starts when the converter receives a "Start A" from the tape, which indicates the start of relevant recording.

After a number has been received, "Carriage Return" is received, and this the converter "recognises." It then sends the number which has been converted to the high speed storage device, a special "number end" signal is added thereto.

When a number is "issued" to the output its digits are interleaved by step or marker pulses (2 kcs. pulses), of which there will be 36 marker pulses for the 35 binary digits, the 35th being the sign digit. Where a number has less than 34 digits its number end pulse is still produced at the time at which it would occur if the number had the full number of digits. The marker pulse for the "blank" digits are conveniently referred to as "filling pulses."

Carriage Return which follows a number is itself always followed by at least one "Line Feed" character. If the number completes a block of information, carriage return is followed by three line feed characters. "Line Feed" has been chosen as the "all mark" character M–M–M–M–M, so that the tape may be arrested during this character without mutilating a record character and so that the rest condition will be in mark. At this point it should be borne in mind that the start element of a printing telegraph character is always a space.

After each 35 digits or coincident with the last marker pulse the converter "issues" a number end pulse to transfer the information just put into the preliminary storage circuit to the feeder circuit.
indicates the end of a block of information, it generates enough number end signals to completely fill the annex tube and, to switch to the next annex, issues a block end signal. The maximum rate at which number end signals can be sent from the converter is 446 c.p.s. The tape must be arrested on block end to permit the filling number end pulses to be sent to the computer.

If a block of information fills more than one high-speed storage device, the converter issues a "block end" at the end of 16 numbers, and then, if a block end is received later from the tape, it fills the next storage device. In this case the converter does not check that the three line feed signals have been received.

The converter normally deals with decimals. Receipt of the sterling colon ":" used to separate pounds, shillings and pence must arrange the converter so that the result is in binary ten shilling units, binary shilling units or binary pence, depending on the lowest denomination concerned. It may even be required to work to tenths of pence.

Receipt of a minus sign *after* a number indicates that that number is negative, and this causes a "one" digit to be inserted in the 35th digital place.

Since, as mentioned above, it is necessary to identify numbers, these numbers are suffixed by either one or two designation stars ("*") followed by a number. With one star, the numbers 1 to 11 are used, with two stars numbers 0-11 are used, giving 23 possible variants. With one star the number must occupy the digit positions 31-34, the second star if present is indicated by the presence of a one in the digit position 30. This means that when designation stars are used, a number is reduced to 29 binary digits. The designation stars with their accompanying numbers identify the number which they follow. Thus where information relating to an industrial payroll is being dealt with, these designation star numbers would identify the income tax deductions and allowances, National Health Insurance deductions.

Although the speed of input to the converter, and hence its speed of output, is adjusted to the expected utilisation of the output channel it can arise that the output channel is "busy," and is thus not ready to receive further information from the converter. In such a case, the control circuits associated with the output channel return a "busy" condition and the tape must be arrested until an "idle" condition is returned. The unready condition can only occur when a high speed storage device has been filled, so that the tape is always arrested in a line feed condition.

As has been mentioned, an output channel has several "users" feeding it, and each converter will be alternately fed from two tape machines. When the converter is switched to start its operation it withdraws information from the first machine, and then when the "end cross" ("+") has been detected, denoting the end of recorded information on that tape, the converter switches to the second machine. The first machine runs on until the tape tautens, when it should indicate that the box should be replaced by another. When the second tape is finished the feed returns to the first tape machine and so on. A brief description of the tape machines used will be given later.

When the converter commences operations (see Figs. 1 and 2), the machine switching circuit 1 has connected to it two tape machines A and B, each with a tape box mounted. Green lights 2 and 3 will then be lit. When the converter start key (not shown) is operated, tape machine A (or the only tape machine bearing a box if only one has a box attached) commences operation and the tape is driven until the start S character is detected. This operates start/stop circuit 4, which initiates operation of the converter circuit. The amber light 5 on machine A now lights and light 2 extinguishes. This initiates operation of the time scale 6, which controls operation of decoder 7. The latter receives characters in printing telegraph code and converts each received character into a "point marking" which during the telegraph code stop element controls the various circuits of the converter.

Any one of the digits 1-11 from the decoder sets a group of cathode followers 8 known as Digit Followers in accordance with the value of the digit. In the case of pence in a sterling number, 10 or 11 are represented by single printing telegraph characters. These circuits mark that combination of its output leads (marked with the values 8, 4, 2 and 1) which corresponds to the digit in question.

This binary digital marking sets the digit tubes 10 (Fig. 2) in accordance with the value of the digit. If the digit is the first received digit (i.e. highest denominational digit) of the number it is transmitted to a storage circuit 11, known as the "Running Total Train" over lead 12. It will be assumed that decimal conversion is in process. On reception of the next digit, the multiplication control circuit 13 (Fig. 1) and displacement tubes 14 (Fig. 2) are so conditioned that the number standing in the running total train (i.e. the running total) is multiplied by 10 and the next received digit added in in the same manner as the previous digit was added to the then running total, i.e. zero. Multiplication by 10 is effected by multiplying the running total by 8, by multiplying it by 2, and by adding the products. As long as conversion from decimal notation is necessary, operation continues in this manner.

If the number being received is in sterling, conversion from decimal notation occurs as above described for the pounds. When the pounds have been completely converted, the next character received and translated by the decoder 7 will be a colon, the first so-called "sterling colon." This applies a "point marking" to output connection 15 from the decoder 7, which adjusts the multiplication control circuit 13 so that the next digit (tens of shillings) may be dealt with. To do this the running total in pounds is multiplied by two to get "binary ten shillings" and the "tens of shillings" digit added in. If the number of shillings in the sterling quantity is less than 10 the tens digit must be recorded as zero, thus three shillings would be received by the converter as 03 shillings, and the conversion to "binary shillings" effected as described.

The next digit received will be units shillings. Therefore as soon as the total has been converted to "binary ten shillings," the multiplication circuit is altered under control of the time scale 6 via P1 pulse generator 16 to the condition for multiplication by 10. The running total is therefore multiplied by 10 as described and the units shillings digit added, giving "binary shillings."

Receipt of a second "sterling colon" causes over connection 15, the multiplication control circuit 13 to alter to the condition for multiplying by 12. This is done by multiplying the running total by 8 and by 4 and adding the products. The pence digit is added to the running total as before, giving "binary pence." It will be remembered that 10 and 11 are single character numbers when they occur in the pence column.

It may be necessary to work to tenths of pence, or even to hundredths. If this is required, a third sterling colon is used immediately after the pence character. This causes the running total to be multiplied by ten and the new digit added in. Any subsequent digits would, of course, be similarly treated.

From the above description it will be apparent that if a sterling number has no pounds, no shillings or no pence, zeros must appear in these positions. Thus, for example, eleven pence would appear in the information received as 0:00:11, seven-tenths of a penny as 0:00:0:7, seven shillings as 0:07:0, and so on.

At the end of a number a carriage return signal will be received, which causes the number in the running total train to be driven out over connection 17 to the Output Circuit 18.

The running total train, as already mentioned is one of the stages of storage which occur in the equipment.

This output circuit also supplies marker or step pulses which control the insertion of the information in the high speed storage devices via the feeder circuit.

The driving function just mentioned is performed by pulses generated by the "t" pulse generator 19 associated with the output circuit which supplies pulses to drive the number held in the running total train 11 to the output circuit 18. The number will be preceded by a marker pulse, and each binary digit of the number will start in advance of a corresponding marker pulse.

Designation stars, already referred to, cause the Designation Star Circuit 20 to control the circuit in such a manner that if one designation star is received, the suffix (a character from 1-11) is "marked in" to the running total train in positions 31-34, and if a second star is received, circuit 20 causes a binary digit to be "marked in" at position 30.

Where there are two designation stars they are followed by a suffix formed by any one of digits 0–11.

On any numerical digit, including zero, the numerical detector 21 operates to prepare the "t" pulse generator 19 via the Clear Total Circuit 22. The "t" Pulse Counter 23 determines, by counting the "t" pulses (which control the running total trains 17), when the full 35 pulses have been generated. If a number has less than the full quota of digits it is treated as if the higher binary denominations have digital values of zero, in which case tubes of the running total train corresponding thereto will not be discharging.

In addition to its other functions, the time scale 6, over connection 24, controls the Number End Counter 25. This also responds to carriage return signals which indicate that one number has been received. When it counts up to 16 it causes a block end signal to be produced. This is sent to the output circuit. The output circuit 18 of course supplies to the high speed storage device the information pulses, marker pulses, block end pulses and number end pulses. If the block of information would not fill a high speed storage device, extra number end pulses are produced for this purpose. To allow this, a block end is followed on the tape by three line feed signals which over connection 26 (Fig. 2) the decoder 7 are applied to Character Counter 27. When this counts up to three, indicating a block end, it causes enough number end pulses to be generated to fill the high speed storage device, and then produces a block end pulse. This is effected by gate circuits which form part of the output circuit 18.

Upon detection of the "end cross" signal, which indicates that the end of recording on the tape in use has been reached, the start/stop circuit 4 stops the converter and switches to the second tape machine. Meanwhile the used up tape tautens and is stopped, and its red light 28 lights. When machine B starts its amber light 29 lights. If a new box is added to machine A, when the box on B is exhausted the converter switches back to machine A and so on.

This brief operational description indicated the inter-relation of the various units of the converter circuit. However, so far the mercury delay line storage which is fed by the output circuit has not been described. This will be described later after the following description.

The tape machines used are each capable of having a flat box known as a tape box connected thereto. This box contains an endless magnetic recording tape which is stored in the box "edgewise," its width being only slightly less than the distance between the two flat sides of the box. The tape passes out of and back into the box at two positions, and when the box is attached to the machine, the tape is in operative relation with a recording head at one of these positions and with a reading head at the other of these positions. The normal directions of travel of the tape is from the recording to the reading head positions, and hence when information has been recorded, there is a bight of used tape between the two head positions. After a series of characters have been recorded, a gap of unused tape is left before the next lot of information is recorded. Further details of such tape machines may be seen in British patent specification 685,067.

When information is read off the tape at 333.3 bauds, the tape is run through the reading head until a "start S" is detected, whereafter reading continues as required until the recorded information is used up. To ensure that the tape cannot tighten and break when the reading head position drive pulleys try to pull the tape through while the tape under the recording head does not move, a tape taut alarm is provided. This gives an alarm when the bight of tape between the head positions is reduced to a predetermined minimum length, and also stops the readout drive.

TIME SCALE CIRCUIT

(Figs. 3 and 4)

The basic pulse source 16, Fig. 1, which controls all operations is a source of 10 kc./s. short pulses P and will now be described in detail. It will be remembered that characters in printing telegraph code are received at 333.3 bauds i.e. one element per 3 millisecs. Hence pulse division from 10 kc./s. by 3, then by 10 and then by 7 is needed. This is achieved as shown in Fig. 3, by a scale of three divider circuit TA1–TA3 and TA3F, a scale-of-ten divider TB, Fig. 4, and a scale-of-seven divider TC. All of these circuits with the flip-flop ST–SZ are controlled from the time scale 6 of Fig. 1.

The flip-flop ST–SZ in Fig. 3, normally has SZ discharging, this being effected near the end of a preceding time scale cycle, or by a reset input from relay contact csb1, which contact is controlled by relay CSB in Fig. 35 and which input reaches the trigger electrode of tube SZ over lead R via rectifier W. When a printing telegraph character is received, the lead marked "Space" in Fig. 3 receives positive potential from the output of an amplifier associated with the reading head of the tape machine from which information is being received for every space element read. As the start element is a space, it biasses rectifier W2 positively, so that the next positive P pulse, which biasses W3 positively, fires tube ST. This, via the inter-anode coupling capacitor C1 extinguishes SZ because when ST is fired, its anode potential is suddenly reduced. Hence a negative pulse is applied via C1 to the anode of SZ, which therefore extinguishes.

Turning now to the scale of three circuit which forms the first stage of frequency division, it will be seen that the closure of contact csb1 when switching on occurred, caused TA2 to fire.

The interconnection between tubes TA1 and TA2 include a capacitor charging circuit R1–C2 connected to the cathode of TA1 via rectifier W4. In the absence of discharge in TA1, the potential of the cathode of TA1 is —110 volts, so the junction of R1 and C2 is substantially at that potential. When TA1 discharges, its cathode potential goes positive, which applies a positive bias to rectifier W4, so capacitor C2 charges through resistance R1 from the positive supply until it reaches a potential approximately equal to that of the cathode of TA1. Thus the effective output of TA1, which controls TA2, rises slowly to its full value, so that it is not possible for one P+ pulse to cause two tubes to fire. The normal counter action then follows i.e. the coincidence of a P+ pulse on W5, with W6 biassed positively from the charged capacitor C2 causes TA2 to fire via the decoupling rectifier W7. The input via the other decoupling rectifier W8 is the reset input already mentioned.

The circuit between the cathode of TA2 and the trigger of TA3 is similar to that between the cathode of TA1 and trigger of TA2 except for the connection via gating rectifier W9 to the cathode of the start tube ST. Therefore unless ST is discharging, the divider circuit rests with TA2 discharging.

It will be seen that each tube TA1, TA2, TA3 has a separate anode resistance R2, R3, R4 in addition to the common anode resistance R5. This means that the anode potential of unfired tubes is slightly higher than what it would be if there were no such separate anode resistance. This follows because the voltage drop at the anode of a discharging tube is shared between two resistances, e.g. R5 and R2 if TA1 is discharging. Since no current flows in R3 or R4, the anode potential of TA2 and TA3 equals the potential at the R5–R2 junction. Capacitors C3, C4, C5 connected across R2, R3 and R4 respectively act, in effect, as pulse by-passes when a tube is fired, and allow the negative-going pulse produced thereby to extinguish the previously fired tube.

In the first P+ pulse which occurs during a received character's start element (always a space), tube ST fires as described above to restore the tubes TB, TC (Fig. 4), and RA, RB, RC and RD (Fig. 5), via lead R. These tubes will be described later. Tube ST firing also biasses rectifier W9 positively and allows the next P+ pulse to fire TA3.

The cathode of tube TA3 is connected via rectifier W10 (with time constant circuit R6, C6) to the input of a cathode follower TA3F. When the potential across C6 has risen to the full potential on the cathode of tube TA3, the potential output of TA3F is adequate to allow tube TA1 to fire on the next P+ pulse. The output of TA3F is also applied to the divide-by-ten circuit (Fig. 4). The output of TA3F is a slow-rising but comparatively quick falling pulse, since TA3F is a cathode follower fed by an input of this type. Coincidence of the full maximum value of this pulse and the next P+ pulse fires TA1 and supplies a pulse to the divide by ten circuit (Fig. 4).

DIVIDE-BY-TEN CIRCUIT
(Fig. 4)

The divide by ten circuit uses a multi-cathode tube TB of the type described in U.S. Patent No. 2,553,585. This tube normally stands with the discharge on its first cathode, and steps once to the next cathode each time its associated trigger tube TGB fires. This happens at the coincidence of the maximum voltage on TA3F cathode applied to its trigger and the P— pulse applied to its cathode. The tube therefore fires and the drop of anode potential caused thereby applies a negative potential to the transfer cathodes of tube TB. By ionisation coupling this causes the next gap along the tube to discharge. As the gaps in this tube are arranged in a circle, the next gap after the tenth is the first. At cathodes TB1 to TB10, ten timed outputs are available.

CHARACTER DISTRIBUTOR
(Fig. 4)

This comprises a multi-cathode tube TC, of which only seven gaps (one for each element of a start-stop printing telegraph character) are used so that it functions as a divide-by-seven circuit. The other three cathodes (if a ten-point tube similar to TB is used) are not connected. The associated trigger tube TGC fires at the coincidence of cathode TB10 discharging in tube TB and tube TA3F in Fig. 3 fully conducting with the P— pulse applied to its cathode, and steps tube TC in the same manner as the discharge in TGB steps TB.

Both tubes TB and TC are reset or switched on at TB1, TC1 over the connections marked "R" derived from the anode of ST (Fig. 3). The bleeder circuit R7–R8 provides a source of biasing potential to bias the cathodes of both tubes TB and TC. The shield electrodes SHB and SHC are earthed via resistances RZ1, RZ2, respectively. The lead TBB indicates that this bleeder supplies a similar bias for other tubes.

GENERAL DESCRIPTION OF THE DECODER
(Fig. 5)

The decoder 7 in Fig. 1, will now be described in detail with reference to the schematic circuit 9, Fig. 5, which only shows tubes and gates. Gates are shown by crosses on the leads each marked with the time at which it opens.

The time chart 30A shows a series of time pulses obtained from the outputs at the time scale tubes, and each occurring at the mid-point of an element. Thus $e1$ occurs at the mid-point of the start element, which occurs at 1.5 ms. after the start. This is given by the coincidence of TC1, TB5 and TA3P, whereupon the rectifier gate used in Fig. 4 gives an output. This output could be via a cathode follower if necessary. Similar cathode followers can be used as necessary.

At this speed of reception, i.e. 333 bauds, the duration of each individual element is 3 milliseconds. To decode the received character each element is examined at its centre point. Therefore the start element (if it was necessary to examine it) would be examined at $e1$ which is 1.5 ms. from the start, the first permutable element at $e2$, which is 4.5 ms. from the start, and so on.

The incoming signals which are read off the tape, are converted by reading amplifiers 30 of well known type which are fed from the reading head 31, and are arranged to apply a positive potential to the Space lead when the received element is a space and to the Mark lead when the received element is a mark. Thus the signal is converted initially into positive potentials on the appropriate leads in the appropriate time positions.

The first stage in the decoding process is to examine the first two permutable elements of the character. Obviously these can be any one of four possibles, Mark-Mark, Space-Space, Space-Mark and Mark-Space. This examination is effected by two pairs of gas tubes AS, AM and BS, BM connected as flip-flop pairs and known as "Element Storage and Detection Circuits." Each tube of pair AS, AM is connected to one lead, AS being connected to the Space lead and AM to the Mark lead, via gating circuits (indicated in Fig. 5 by a cross) which causes the connection of the tubes to their respective leads to be effective at time position $e2$, which is the examining position for the first permutable element. If this element is a Space, AS fires (extinguishing AM if it is discharging) or remains firing if already discharging. Similarly AM fires (or stays discharging if already discharging) if the signal element is a mark. Whichever of tubes AS or AM is discharging after time $e2$ has a positive potential on its cathode. Flip-flop pairs BS, BM is similarly controlled from the Space and Mark leads respectively at the time position $e3$, the centre-point of the second permutable element. The cathode leads of tubes AS, AM, BS and BM are interconnected as shown in Fig. 5 to give four leads, each representing one possible condition for the first two permutable elements.

Each of these four leads controls a multi-cathode tube RA, RB, RC, RD, each known as a "resolving tube," via trigger tubes TGRA, TGRB, TGRC, TGRD via a gating circuit such as that diagrammatically illustrated for the space-space lead.

It will be assumed that the first two permutable elements were space-space, so the circuit operation will be described for this condition. The operation is, of course, similar for the other three possible conditions. Immediately after the first two permutable elements, the space-space gate 31 is closed at times $e3\frac{1}{2}$, i.e. midway between second and third permutable elements, to fire trigger tube TGRA thereby causing tube RA to step from its rest position to its first position. This occurs because the opening of gate 31 applies a positive potential to the trigger of TGRA, which fires on the P— pulse as will be described in more detail below.

As will be seen from Fig. 5, all incoming signals are applied to a third flip-flop pair S, M, which is so connected to the space and mark leads that all incoming spaces fire S and all incoming marks fire M. The first two permutable elements will therefore fire either or both of these tubes, but this firing will be ineffective. As a result of the third permutable element, also, one of these tubes will be fired. If tube S fires when the third permutable element is a space signal the positive potential produced at its cathode is applied to the Sc lead 32. At $e4+1$ (.6 ms. after S fires if the element is a space) gate 33 closes to permit a positive potential on lead 32 to fire TGRA, which steps tube RA to its second position. If the third permutable element is a mark, tubes TGRA and RA are unfired, so the discharge in RA remains at its first gap position. The timed opening of the gate 33, like others to be described, occurs under control of a combination of time scale outputs.

If the fourth permutable element is a space the positive produced on the cathode of tube S is applied to two Sc leads 34 and 35. Lead 5 is connected to TGRA via gate 36 which closes at e5+1 (.6 ms. after e5) when tube TGRA fires if there is a positive on lead 34 to step RA once. At e5+2 (.6 ms. after e5+1), lead 35 is connected via gate 37 to TGRA, and TGRA fires if there is a positive on lead 35. Thus if the element is a space element, leads 34 and 35 will bear positive potentials and the tube RA steps twice.

It will be seen that for the fifth (and last) permutable element, if the element is a space element, tube RA is caused to step 4 times, e6+1, e6+2, e6+3 and e6+4, respectively.

Thus if the third permutable element is a space, RA steps once, if the fourth permutable element is a space RA steps twice and if the fifth permutable element is a space RA steps four times. This will be illustrated by a few examples. If the signal is S–S–M–M–M, tube RA does not step for the last three permutable elements, so it remains on its position 1. If the signal is S–S–M–M–S, tube RA does not step on the third and fourth elements but does step four times on the fifth element, and therefore ends the signal on its fifth position. If the signal is S–S–M–S–M, tube RA does not step on third and fifth elements, but does step twice on the fourth element, so it stands on its third position at the end of the signal. If the signal is S–S–S–M–S, tube RA steps once on the third element *and* four times on the fifth element, but not at all on the fourth element, so its final position is on its sixth position. Thus for each of eight possible combinations of the last three permutable elements there is one unique position in which RA will stand.

Tube RB is similarly controlled if the first two permutable elements are space-mark, RC if they are mark-space and RD if they are mark-mark. Thus the final condition in response to a character is with one tube of RA to RD standing in that one position of 32 possibles which characterises the received character.

The operation of the decoder has been described with reference to the schematic of Fig. 5; the various parts of this circuit will now be described in more detail.

ELEMENT STORAGE AND DETECTION CIRCUITS (Fig. 6)

The condition of the first permutable code element is investigated by a flip-flop pair of cold-cathode gaseous discharge tubes AS—AM. The trigger electrode of AS is connected to the space lead and the trigger electrode of AM is connected to the mark lead, each over gate circuits which open to render these connections effective at the mid-point at the first permutable element. As will be seen, each of these gates is controlled by time positions TC2, TB5 and TA3, although the output of a cathode follower controlled therefrom could also be used. It should be understood that TB5 indicates that connection is made to the fifth cathode of tube TB in Fig. 4 and, similarly, TC2, TC3 are connected to the second and third cathodes of tube TC, respectively, etc. At this point it will be remarked that although the circuits described herein are directly controlled from the outputs of the time scale, these outputs could be used to feed cathode-followers. The outputs of these cathode-followers would then form the timed controls. The provision of such cathode followers might well be desirable where a number of controls have to be "driven" at the same time.

During the first permutable element, a positive potential appears on one or other of the space or mark leads depending on whether the element being received is a space or a mark. If the tube AS or AM to which a positive potential pulse is applied is already discharging, no change is made in the conditions thereof. If, however, the positive potential pulse is applied to the quiescent tube, that tube fires and via the anode coupling capacitor CAS extinguishes the other tube in well known manner. Whichever tube is discharging has a positive potential on its cathode.

The circuit for examining the second permutable element comprises a flip-flop pair BS, BM, identical to AS, AM except that the gates connect the triggers to space and mark leads respectively at TC3, TB5, TA3, the halfway point of the second permutable element.

Figure 1:
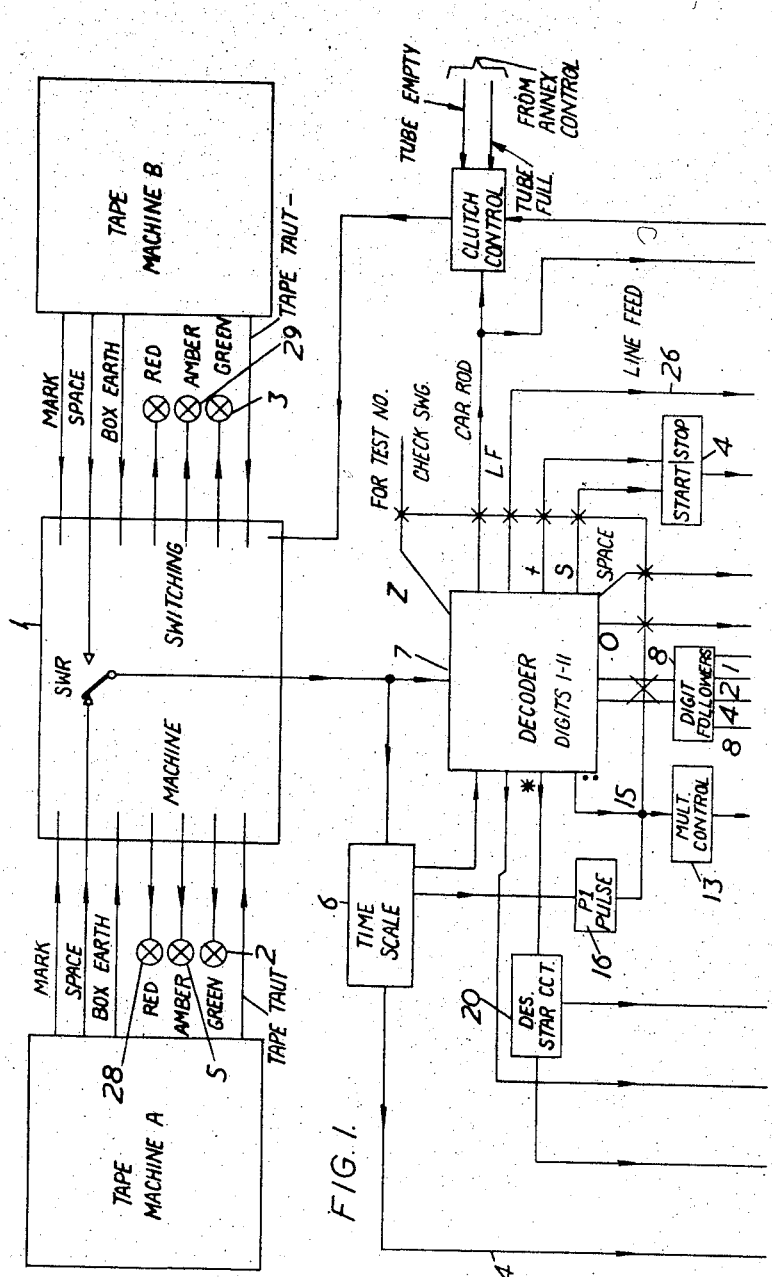
Figure 7:
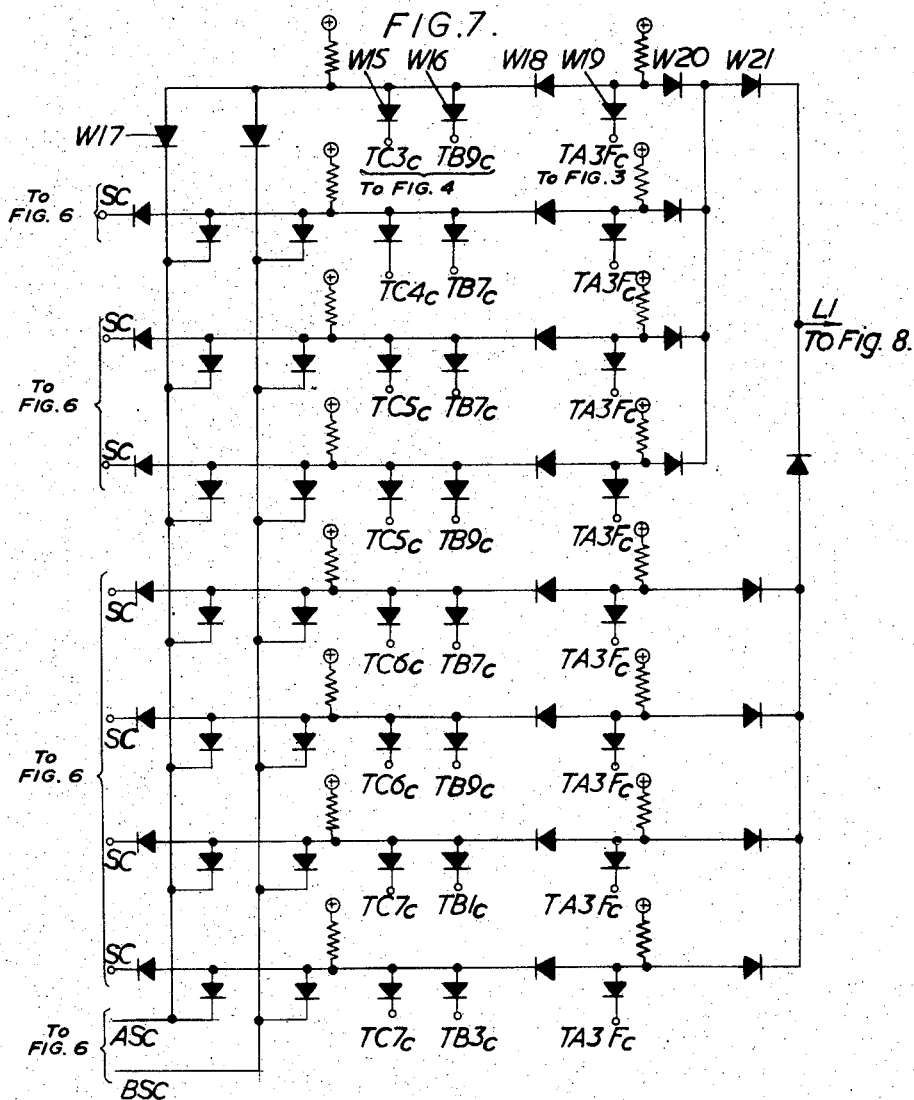
Fig. 7 shows in detail one of four gating networks used in the equipment of Fig. 5.
Figure 8:
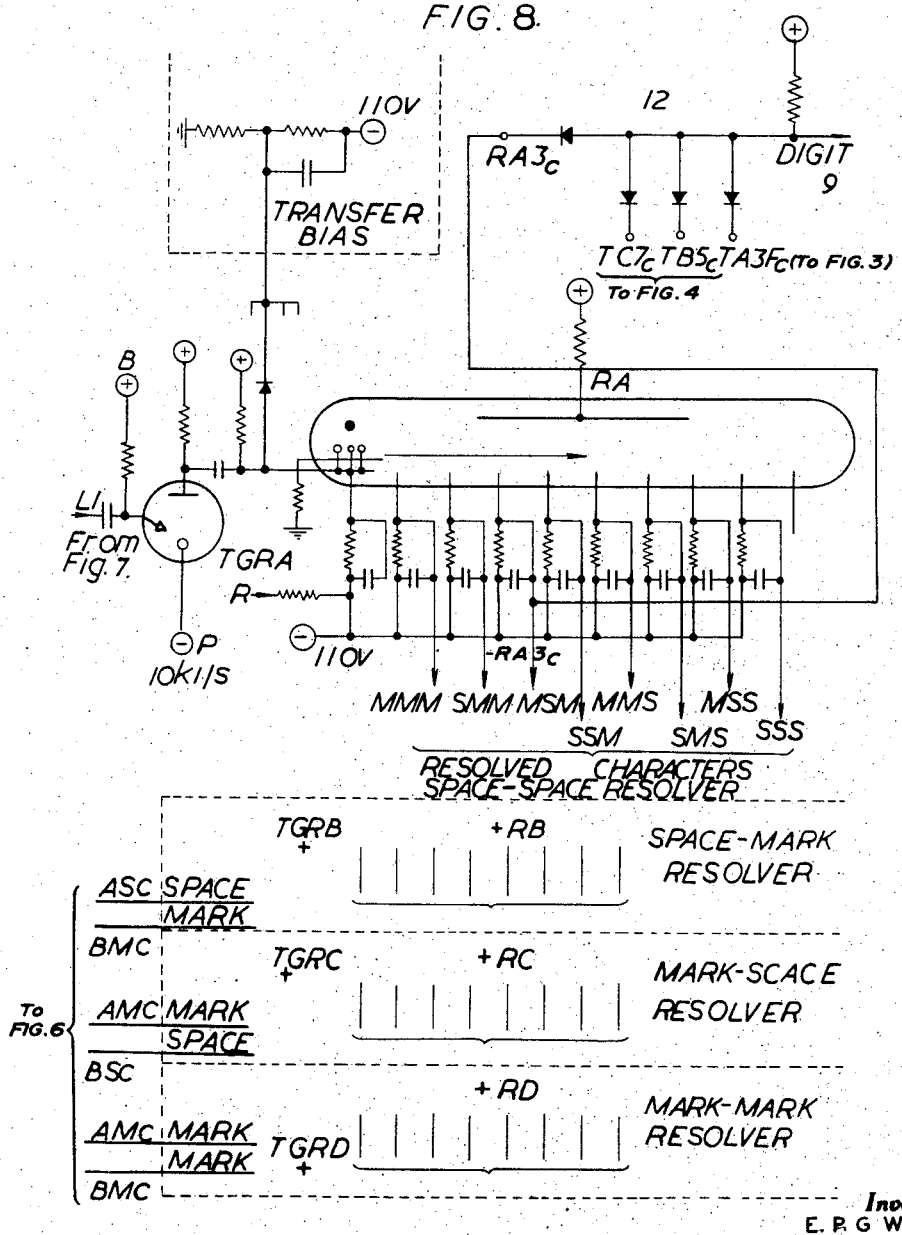
Fig. 8 shows in detail one of the resolving multicathode tubes in the equipment of Fig. 5, one of the output gates controlled by a reading tube, and also shows the other three resolving tubes schematically.

The cathode leads of AS, AM and BS, BM are interconnected as shown diagrammatically in Fig. 1 to control selection of one of the multi-gap "resolvers" (see Figs. 7 and 8).

The third flip-flop pair S, M is identical to the other two except that its gates connect the triggers to the space and mark leads respectively at TB5, TA3, i.e. at the halfway point of every element of a character. Thus either S or M fires for every element of a received character. The only output taken from this flip-flop in the present embodiment is that taken from the cathode of S and marked Sc. The Sc output could conveniently be taken via a cathode follower.

RESOLVING CIRCUIT (Figs. 7 and 8)

Figs. 7 and 8 show the resolving circuits associated with the space-space condition. As indicated diagrammatically, the circuits for space-mark (trigger tube TGRB and tube RB), mark-space (TGRC and RC) and mark-mark (TGRD and RD) are identical to those for space-space except that they are selected by different combinations of the first two elements.

With both tubes AS and BS in Fig. 6 discharging, indicating that the first two permutable elements were spaces, a positive potential is applied over leads ASc and BSc to the gate circuits in Fig. 7. At TC3, TB9, TA3F (8.7 ms. after the cycle started i.e. at e3½) with AS and BS discharging, rectifiers W15 and W16 are biassed positively from TC3 and TB9, and W17 from the space lead. Then a positive potential is applied to rectifier W18, and since W19 is also biassed positively from TA3F, positive is applied over W20 and W21 and L1 to the trigger of tube TGRA (Fig. 8), which fires in response to the P-pulse applied to its cathode and steps RA from its rest (or zero) position to its first position.

If the next three elements are all marks, none of the other gates shown in Fig. 7 permit TGRA to fire since S is quiescent, and all the Sc leads therefore go to a highly negative potential (see Fig. 6). Therefore if the signal is S–S–M–M–M, the final position will be with tube RA in its position 1.

If the third permutable element is a space, S is firing and applies positive to the Sc leads. At TA3F, TB7, TC5 (10.5 ms. after the beginning of the cycle at e4+1), the tube TGRA fires and steps tube RA once. If the last two permutable elements are marks, the final position is with RA in its position 2, indicating that the signal is S–S–S–M–M.

If the fourth permutable element is a space, tube S applies positive potential to the Sc leads. However this time tube TGRA is fired twice (and tube TA stepped twice) if the element is a space. For this purpose Sc controls TGRA over two gating circuits, one closing to fire TGRA at TA3F, TB7, TC5 (14.1 ms. after the beginning of the cycle for e5+1) and the other closing to fire TGRA again at TA3F, TB9, TC5 (14.7 ms. after the beginning of the cycle for e5+2). Since TGRA is pulse fed it is extinguished between pulses. Therefore a space for the fourth permutable element steps RA twice and a mark not at all.

If the signal is S–S–M–S–M, the final position is with RA in its third position (the initial step plus the double step for the space as the fourth element). If the signal is S–S–S–S–M the final position is with RA in its fourth position (the initial step plus the single step for the space as the third element plus the double step for the space as the fourth element).

If the fifth permutable element is a space, S applies positive potential to the Sc leads. However, this time TGRA is fired four times to step RA four times if the element is a space. For this purpose Sc controls TGRA over four gating circuits which fire TGRA at TA3F, TC6, TB7 (17.1 ms. for $e6+1$), at TA3F, TC6, TB9 (17.7 ms. for $e6+2$) at TA3F, TC7, TB1 (18.3 ms. for $e6+3$) and at TA3F, TC7, TB3 (18.9 ms. for $e6+4$). It will be noted that the last two of these occur during the step element, but this is permissible since no other operation is carried out during this element until well after the time represented by TA3F, TB7, TC7. Thus if the fifth permutable element is a space, tube RA steps four times and if it is a mark, RA does not step at all.

If the signal received is S–S–M–M–S, the fired position is with RA in its fifth position (initial step plus the quadruple step for the space fifth element). If the signal received is S–S–S–M–S the final position is with RA in its sixth position (initial step plus single step for space third element plus quadruple step for space fifth element). If the signal is S–S–M–S–S the final position is with RA in its seventh position (initial step plus double step for space fourth element plus quadruple step for space fifth element). If the signal received is S–S–S–S–S the final position is with RA in its eighth position (initial step plus single step plus double step plus quadruple step).

As has been stated, the gating control circuits and operation of the other three resolvers are similar to the space-space circuit, so no description of them is required.

Thus the circuit gives a separate output for every element of the code in use. Cathodes for non-used characters can be connected to a common resistance. For each character used an output gate is provided, a typical example being that shown at 12, Fig. 8, for S–S–M–S–M. The gate circuit 12 has its left-hand terminal RA3, connected to the third cathode of the tube RA, representing digit H on the lower case in normal teleprinter practice. It will be understood that similar gates are connected to each of the other cathodes of tube RA which are assigned to characters and which are not connected to a common resistance as previously stated above in this paragraph. It should be further understood that similar gates will be coupled to the "working" cathodes of tubes RB, RC and RD. The output gates are opened at TC7, TB5, TA3F (19.5 ms.), after all the stepping has been effected. The output from the circuit 12 goes to any desired utilisation circuit.

Although the decoder has been described for a system in which the multi-cathode resolving tubes are stepped on space signals, it is clear that stepping on mark signals is equally feasible. If the circuit is meant to respond to one particular character in a particular resolver tube, e.g. S–S–M–S–M, it could be arranged that the tube steps to its eighth position on the particular character only. Thus the single step occurs if the third element is a mark, the double step if the fourth element is a space and the quadruple element if the fifth element is a mark. Such an arrangement would minimise the risk of premature operation of the circuit in response to the desired character.

The divide-by-ten circuit, the character distributor and the resolvers have been described as using multi-cathode tubes, but it would be equally possible to use chains of normal single cold cathode tubes.

The following Table A lists the code used in the present embodiment of the invention with the equivalent in printing telegraph code and translator outputs.

Table A

| T.P. Code | Decoder Output | Character | T.P. Code | Decoder Output | Character |
|---|---|---|---|---|---|
| SSSSS | RA9 | Spare | MSSSS | RC9 | 3 |
| SSSSM | RA5 | 5 | MSSSM | RC5 | End Cross |
| SSSMS | RA7 | Car. Ret. | MSSMS | RC7 | S |
| SSSMM | RA3 | 9 | MSSMM | RC3 | ? |
| SSMSS | RA8 | Space | MSMSS | RC8 |  |
| SSMSM | RA4 | Z | MSMSM | RC4 | 6 |
| SSMMS | RA6 | Comma | MSMMS | RC6 | 11 |
| SSMMM | RA2 | Full Stop | MSMMM | RC2 | 10 |
| SMSSS | RB9 | Letters | MMSSS | RD9 |  |
| SMSSM | RB5 | Spare | MMSSM | RD5 | 2 |
| SMSMS | RB7 | 4 | MMSMS | RD7 | AL |
| SMSMM | RB3 | P.O. | MMSMM | RD3 | Figs |
| SMMSS | RB8 | 8 | MMMSS | RD8 | 7 |
| SMMSM | RB4 | 0 | MMMSM | RD4 | 1 |
| SMMMS | RB6 | Colon | MMMMS | RD6 | Brackets |
| SMMMM | RB2 | Quotes | MMMMM | RD2 | L.F. |

In the above table Car. Ret. is Carriage Return, P.O. is "Print Out," AL is Alarm and L.F. is Line Feed.

The decoder circuits are fully described in and claimed in our U.S. Patent No. 2,648,725.

Figure 2:
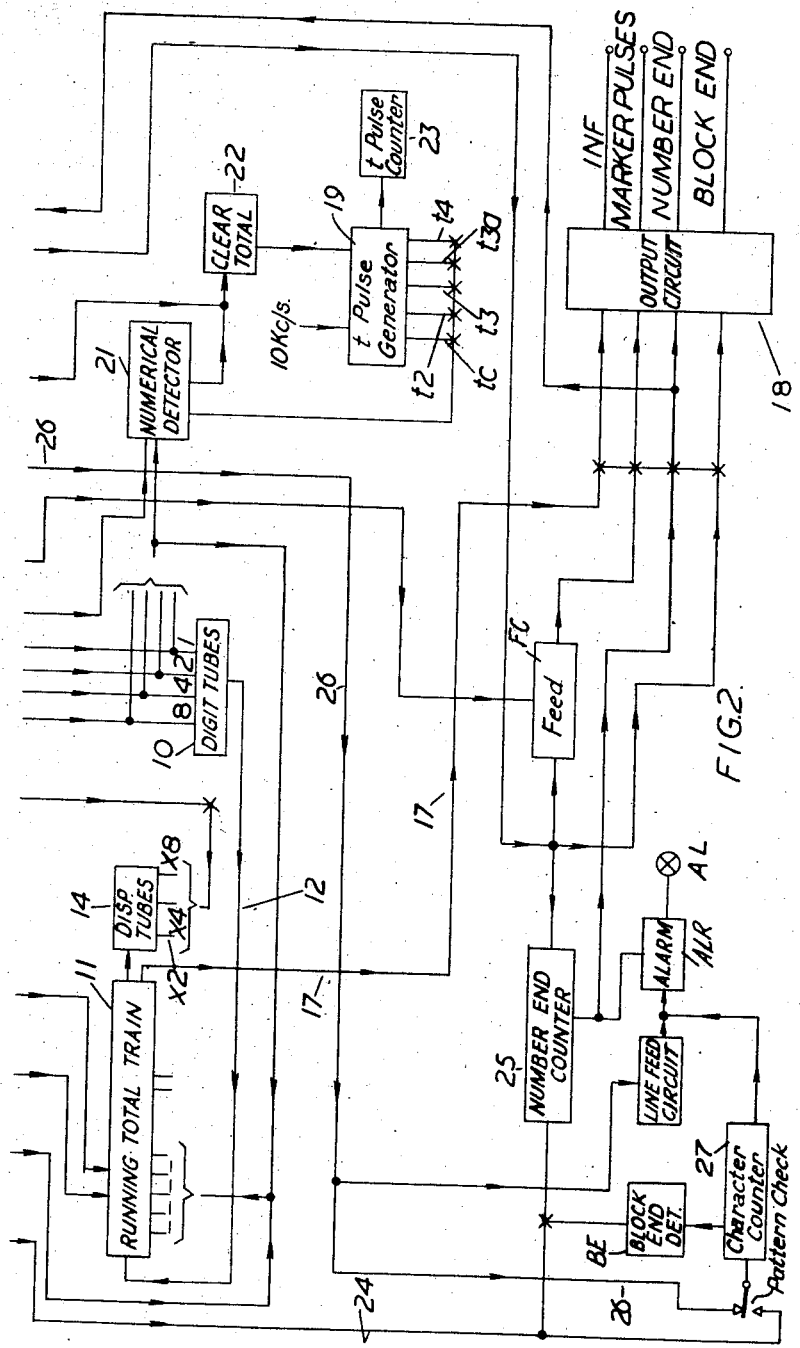

The conversion process i.e. the final generation of a binary number with certain additional information "suffixed" thereto in the running total train occurs under control of cycles of pulses known as $t$ pulses which are produced from the 10 kc./s. pulse source which was indicated at 19 in Fig. 2. These pulses are produced, controlled and counted by the $t$ pulse circuit which will be described next.

$t$ PULSE GENERATOR AND CONTROL CIRCUITS

Figure 9:
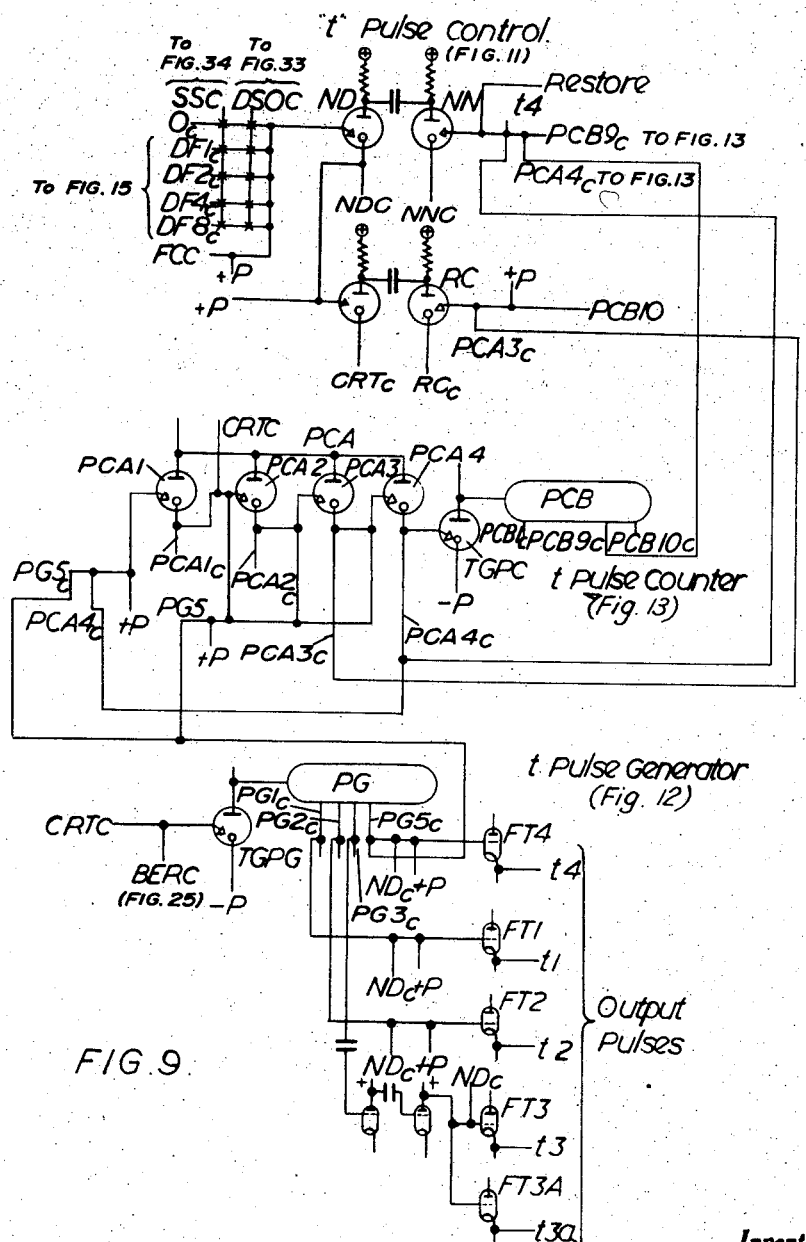
Fig. 9 is a schematic diagram of the $t$ pulse control circuits, $t$ pulses counter, at $t$ pulse generator, the uses of which will be described in due course.

The circuits in Fig. 9 which correspond to blocks 19–23 of Fig. 2, are shown schematically with most of the components omitted. Certain of the gates are shown as crosses on conductors, the crosses having an associated reference indicating when that gate opens, while other gates are indicated by a number of labelled leads having a common point.

These circuits are used in two circumstances:

(1) When a numerical digit has been received, in which case $t$ pulses are produced to control the conversion. As will be seen, 35 $t$ pulse cycles are used for converting one decimal (or sterling, etc.) digit of a number. Three extra $t$ pulse cycles are produced for a purpose which will be described later.

(2) When the information must be fed out to the feeder circuit.

The "$t$" pulse generator is required to provide the following pulses:

$t1$—10 microseconds wide, 40 v. Used to control multiplication by 2 and by 4.
$t2$—10 microseconds wide, 40 v. Used to control multiplication by 8.
$t3$—50 microseconds wide, 100 v. Step running total.
$t3a$—50 microseconds wide, 100 v. Step displacement tubes.
$t4$—10 microseconds wide, −40 v. Read output and transfer.

A fifth time position is provided but not used. The purpose of this is to have a 2 kc./s. pulse cycle (derived from a 10 kc. source), this being a convenient speed for the pattern movement chain which forms the running total train.

As will be seen, the information stored in the pattern movement chain is stepped once on each $t$ pulse cycle, and as it has 35 units, the 35 cycles give it a complete cycle.

The generator, which corresponds to block 19, Fig. 2, consists of PG and its associated circuits, must "deliver" 35 complete pulse cycles, and three additional $t3a$ pulses which are needed for a purpose which will be described later. $t3$ and $t3a$ pulses occur simultaneously.

Figure 10:
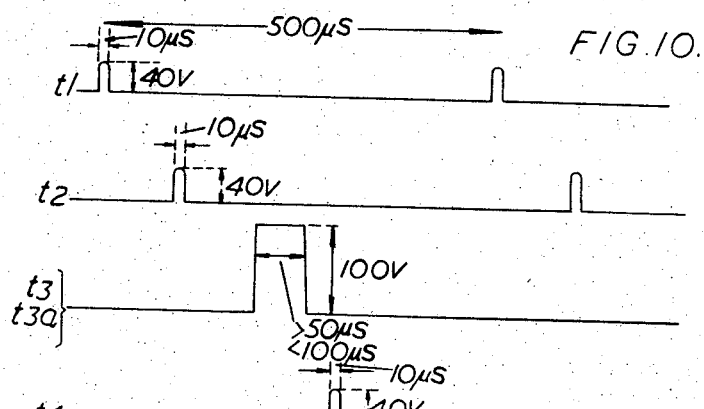
Fig. 10 is a chart of the $t$ pulse waveform.

The $t$ pulses are obtained from a multi-gap tube PG, having five cathode outputs. Means (not shown) in Fig. 9 are used to restore the discharge in PG to its first cathode (the rest position) under control of tube CRT. The outputs from cathodes 2 to 5 of tube PG are taken via cathode followers FT1–FT4 to give the output "t" pulses. The output from PG2 controls FT1 to give the t1 pulse, PG3 controls FT2 to give the t2 pulse, PG4 controls via amplifiers the cathode followers FT3 and FT3A which give the t3 and t3a pulses respectively and PG5 controls FT4 to give the t4 pulse. Tubes FT1, FT2, FT3 and FT4 have their control electrodes coupled to the cathode of tube ND via connection NDc and only give their outputs (on the occurrence of a master pulse) if tube ND is discharging (indicating that a numerical digit has been received). Fig. 10 shows the "t" pulse waveforms. Tube PG produces the t pulse controls by frequency division from the source of pulses, P—, which are 10 kc. pulses. This generator is shown in more detail in Fig. 12. These control tube PG via gating tube TGPG.

The flip-flop pairs ND, NN and CRT—RC which corresponds to blocks 21—22 of Fig. 2, enable the three additional t3a pulses to be obtained. ND is triggered if a numerical digit has been received. This occurs over either lead 0 (if the digit is zero) from the decoder in Fig. 1, or over one of the leads from the "digit follower" tubes, Fig. 15.

When a numerical digit other than 0 has been received, one or more of the digit follower tubes, DF1, DF2, DF4 or DF8 will deliver an output to energise the corresponding lead of those marked DF1c, DF2c, DF4c and DF8c. These tubes will be described later. The start S signal must also have been received, in which case lead SSc (Fig. 34) will be energised, but tube ND (Fig. 9) is not triggered if the numerical digit was preceded by a designation star. ND is also triggered if FC (Fig. 25) is discharging, indicating that the number must be sent to the feeder, and a P pulse occurs.

ND triggers CRT on the next P+ pulse, and this on the next negative master pulse after it triggers trigger tube TGPG. This causes PG to step. It will be seen that TGPG can only open to trigger PG when tube BER (Fig. 26) is discharging, i.e. when a block end condition is not being received (see Fig. 26) PG continues to step (under control of BER and CRT) on successive negative master P pulses, and, as usual, energises the controls which cause the pulses t1 to t4 to be produced.

After 35 t pulse cycles have been generated, tube NN (Fig. 9) is operated from tube PCB of the t pulse counter, and this extinguishes ND, which cuts off the t. pulse. However, three additional t3a pulses are generated. This is because, as has been pointed out, cathode followers FT1, FT2, FT3 and FT4 can only produce outputs while tube ND is discharging, whereas tube FT3A is not subject to any such control. The circuits ND—NN and CRT—RC will be described in detail later with reference to Fig. 11.

The "t" pulse counter corresponding to block 23 of Fig. 1 will now be described. When CRT triggered (from ND), it set the counter to its first state by triggering PCA2 at the first counter stage. When PG advances to PG5 (producing t4 pulses), the counter advances to PCA3. On the next t4, the counter steps from PCA3 to PCA4, and on the P— pulse thereafter PCB is stepped.

The operation then continues throughout the cycle of 35 t pulses, the PCA—PCB combination acting as a 35-way counter. The first stage PCA divides the PG conditions by 4 and the second stage PCB divides by 9. Since PCA starts from PCA2 and not from PCA1 the count to 35 is achieved when PCB is standing at PCB9, with PCA at PCA4 and a t4 pulse occurs.

When 35 t cycles have been counted, tube NN is fired (extinguishing ND), as can be seen from its controlling gates, which cuts off all the "t" outputs from PG except that controlling t3a. PG continues to cycle (to produce the t3a pulse or has been described) until PCA steps to PCA3. When this happens, RC triggers on the next P pulse because PCB is standing at PCB10 it having been stepped thereto by the P— pulse which occurred immediately after the 35th t4 pulse. This restores CRT, and cuts off further pulse supply to PG via TGPG, while also producing a restore condition for PG, PCA and PCB.

CONTROL FLIP-FLOPS

Figure 11:
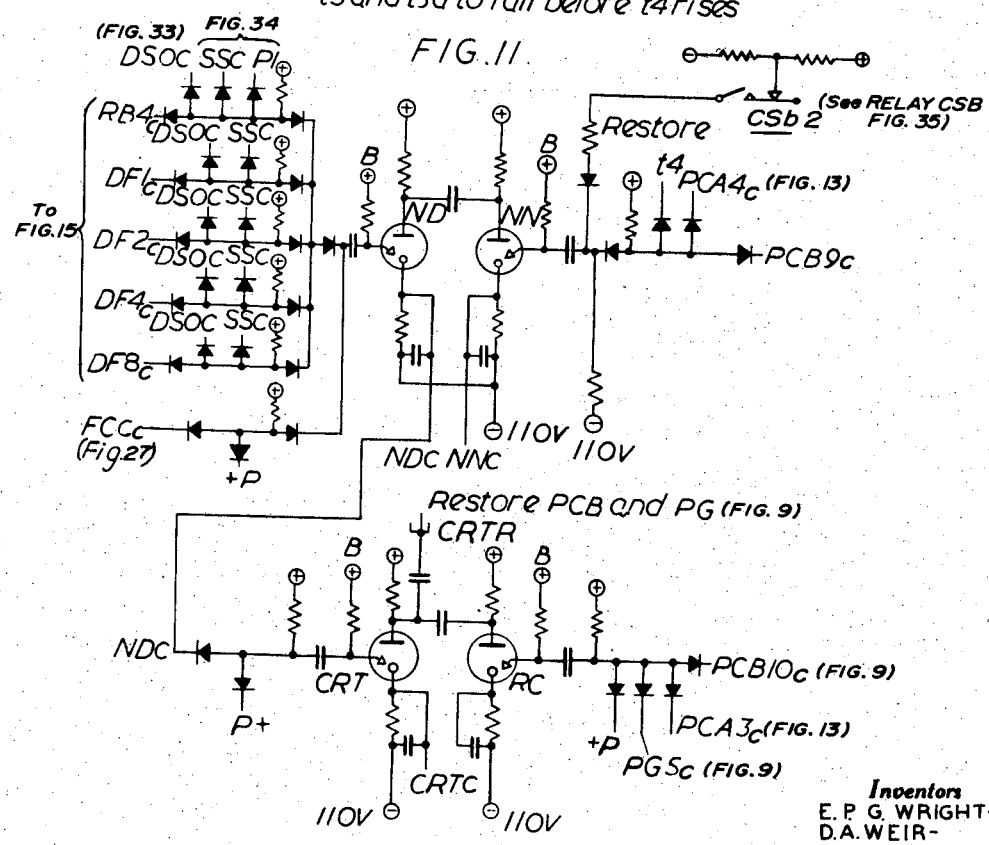
Fig. 11 is more detailed circuit of the $t$ pulse control circuit shown schematically in Fig. 9.

(Fig. 11)

These, as already indicated, correspond to blocks 21 and 22 of Fig. 2 and are used to switch the t pulses cycles on and off. These t pulses are used to control the process of conversion, as will be described later, and t3a pulses are used to drive a converted number out of the running total train into the feeder circuit.

When a numerical digit is received and decoded by the decoders, a combination (including one) of the four digit follower tubes, which will be described later, is set under the control of the decoder resolver tubes. This combination of DF tubes (Fig. 15) which have been set give outputs which energise at least one of the gate controls shown in Fig. 11 and marked DF1c, DF2c, DF4c and DF8c. These gates can only operate if tubes DS0 (Fig. 33) and SS (Fig. 34) are both discharging, DS0, which will be described later, is only discharging if no designation star has been received for the number being dealth with, while SS discharging indicates that start "S" has been received. If the numerical digit is zero, the digit followers are all quiescent, since there is no digit to be added into the running total train (as will be described later), but the usual multiplication of the contents of the running total train is necessary. Therefore an additional gate is provided which is directly controlled from the decoder output RB4, which is the one representing zero. This gate also is DS0 and SS controlled, and its controls also include P1. There is no P1 control in the DF gates since the digit followers are themselves P1 controlled as will be described later. This P1 pulse is obtained from the output of the cathode follower CFP1 (Fig. 14) which is controlled from the time scale circuit which has already been described. This cathode follower corresponds to the block 16 of Fig. 1.

It will be recalled that t pulses are needed when information is driven out of the running total train. When t pulses are needed, the control from FCc in Fig. 27 is energised which fires ND (Fig. 11) to start the production of t pulses.

The tube CRT fires on receipt of a P+ pulse which occurs immediately after ND fires, the tube controlling the t pulse generator. When PCA3 and PCB10 (Fig. 13) of the t pulse counter are discharging, and when PG5 (Fig. 9) is discharging indicating that the three extra t3a pulses have been produced, RC (Fig. 11) fires. This extinguishes CRT which stops the t pulse generator. ND, it will be remembered, was extinguished before the three extra t3a pulses were produced, so the circuit at Fig. 11 is back in its normal condition.

t PULSE GENERATOR

(Fig. 12)

This (corresponding to block 19, Fig. 2) consists of a multi-gap tube PG which is used as a divide-by-5 circuit together with output cathode followers. The circuit is restored to its first position (if not already there) when CRT (Fig. 11) fires. For convenience all ten cathodes of a 10 point tube are used, being strapped as shown in Figure 12. Since tube PG is "driven" by 10 kc./s. impulses so as to perform its cycles at 2 kc./s., the time constants of the RC circuits in the cathodes thereof must be so arranged that between two pulses the voltage on the last extinguished gap is such that this gap does not refire on the next pulse. Therefore the cathode capacitor connections go to a small positive potential. The four outputs PG2, PG3, PG4, PG5 (PG1 not used) are used to control cathode follower circuits.

PG2, PG3 and PG5 control cathode followers FT1, FT2 and FT4, which can only give outputs when ND (Fig. 11) is discharging and a P+ pulse occurs at the same time as the appropriate PG cathode has an output. Cathode followers FT3 and FT3A are controlled from PG4 via tubes PA, PIA and PA, PIB, respectively. If ND is discharging the positive potential on the suppressor grid of PA allows both of the cathode followers FT3 and FT3A to be driven via the amplifiers PIA and PIB. If, however, ND is not discharging, PG4 allows PA to pass current but it all passes to the screen output. This via PIB drives FT3A to give an output independently of FT3. This output for operating FT3A is, of course, obtained when ND is discharging.

"t" PULSE COUNTER CIRCUIT (See Fig. 13)

This comprises four tubes PCA1 to PCA4 forming a chain and interconnected in the same manner as the three tubes TA1, TA2, TA3 of Fig. 3 which are used as a "divide-by-4" circuit, and a multi-gap tube PCB counting up to 9. The operation of PCB will be described first. When CRT (Figs. 9 and 11) fires on initiation of a numerical digit, it fires PCB at gap PCB1 over the connection CRTR to reset PCB to its rest position if necessary.

PCB is controlled from the PCA part of the counter when the latter stands at PCA4. This biasses W28 positively and when W29 is biased positively from PG5 (Fig. 12) (the output controlling $t4$) tube TGPG fires on the next negative pulse. Tube TGPG firing steps PCB to its next gap. When the master pulse ends, TGPG extinguishes since its anode is "caught" by W30 at the bias potential, which is not sufficient alone to maintain the tube discharging.

The first portion of the counter circuit will now be fully described. As has been stated, the operation of CRT (Figs. 9 and 11) causes the chain to be reset to PCA2.

The positive potential from PG5 applies a positive bias to W31 and the P+ pulse biasses W32 positively so that PCA3 fires. On the next $t4$ pulse, W33 is biased positively from PG5 so PCA4 fires. As has been described, this causes PCB to step once. On the next $t4$ pulse with W34 biassed positively from PCA4 and W35 biassed positively from $t4$, PCA1 fire. On the next PG5 occurrence PCA2 fires (as before). This is the complete cycle and therefore when PCB has fired nine times, the PCA chain will have gone through nine cycles of four steps each, less one since it started at PCA2. Therefore the circuit has counted $(9 \times 4) - 1 = 35$ steps.

When PCB reaches PCB9 it causes tube NN (Figs. 9 and 11) to fire, as has already been described. The PCA chain now runs through another cycle at PCA1, PCA2, PCA3 to count the three $t3a$ pulses which are used for a purpose which will be described later. Tube PCB is standing at PCB10 to which it stepped on completion of the ninth cycle, and when the PCA chain reaches PCA3, indicating that the full three $t3a$ pulses have been generated, tube RC (Figs. 9 and 11) fires as has already been described to terminate the action of the circuits.

The P1 pulse is produced from the output of cathode follower CFP1, Fig. 14 (block 16 of Fig. 1) which cathode follower gives an output when BER (Fig. 26) is discharging, and when the time base circuit stands at TA3F (Fig. 3), TB10 and TC7 (Fig. 4). This is half way through the stop element of the character for which the time scale is running.

DIGIT FOLLOWERS (See Fig. 15)

These, which correspond to block 8 of Fig. 1 consist of four cathode followers DF1, DF2, DF4 and DF8. The numerical digits 1 to 11 are converted from the outputs of the decoder tubes RA to RD into potentials on the cathodes of these tubes. The outputs of the decoder tubes control gates in the inputs of the DF tubes appropriate to the digit being considered. These conditions are summarized in the following table. Obviously there is no digit marking for zero.

Table B

| Digit | Decoder Tube Output | Digit Follower Selected |
|---|---|---|
| 1 | RD4 | DF1 |
| 2 | RD5 | DF2 |
| 3 | RC9 | DF1, DF2 |
| 4 | RB7 | DF4 |
| 5 | RA5 | DF1, DF4 |
| 6 | RC4 | DF2, DF4 |
| 7 | RD8 | DF1, DF2, DF4 |
| 8 | RB8 | DF8 |
| 9 | RA3 | DF1, DF8 |
| 10 | RC2 | DF2, DF8 |
| 11 | RC6 | DF1, DF2, DF8 |

This table B summarizes the conditions in which the digit followers give outputs. The position of the discharge in the selected decoder tube RA, RB, Rc or RD (Fig. 8) selectors on or more digit follower tubes by biassing appropriate rectifiers positively. Thus if the digit is 11 $(1+2+8)$, the decoder stands at RC6, which biasses W43, W44 and W45 positively, and therefore on the next P1 pulse (from the output of CFP1, Fig. 14) tubes DF1, DF2 and DF8 give outputs during the duration of the P1 pulse.

The occasions on which the DF tubes are used are as in Table C.

Table C

| DF1 | DF2 | DF4 | DF8 |
|---|---|---|---|
| RD4 (1) | RD5 (2) | RB7 (4) | RB8 (8) |
| RC9 (3) | RC9 (3) | RA5 (5) | RA3 (9) |
| RA5 (5) | RC4 (6) | RC4 (6) | RC2 (10) |
| RD8 (7) | RD8 (7) | RD8 (7) | RC6 (11) |
| RA3 (9) | RC2 (10) | | |
| RC6 (11) | RC6 (11) | | |

The numerical value of the digit is given for convenience in brackets after each decoder tube designation.

THE CONVERSION PROCESS (See Fig. 16 and Fig. 17)

The conversion process used is to receive the first digit in printing telegraph code, decode it, translate it into binary code and add it to the running total, which will have been set to zero. On receipt of each digit, the value in the running total trains is multiplied by 10 if decimal conversion is in progress and the new digit added to the result. This process goes on until conversion of decimal digits is complete. When sterling is being fed in, other multipliers (2 and 12) are used as will be described.

The process of multiplying by 2 is very simply achieved by merely shifting the total the appropriate number of places or digits to the left (i.e. 1 to 2, 2 to 3, 3 to 4 and so on), and this is the basis of the method used. To multiply by 10 the running total is multiplied by 8, i.e. shifted three places, and then the result of multiplying by 2, i.e. shifting one place, is added to this result. At the same time the new digit is added without any shift. This will be described with reference to the schematic circuit shown in Fig. 16, which corresponds to blocks 10, 11 and 14 of Fig. 1. In the circuit of Fig. 16 the multiplier is 10, so that the D×2 and D×8 outputs are effective. These outputs, D×2 which is effective at $t1$ and D×8 which is effective at $t2$, cause the lead MCL to be energised. For multiplying by 2 only $D\times2$ is effective at $t1$ while for multiplying by 12, the $D\times4$ and $D\times8$ outputs are used, being effective at $t1$ and $t2$ respectively.

The running total train (block 11, Fig. 2) comprises 35 tubes S1 to S35 interconnected as a pattern movement register or shift register. As will be described later, pulses applied in common to all tubes cause information stored therein as a pattern of discharging and quiescent tubes to be moved bodily along the register, one tube step per pulse. The pulses are the $t3$ pulses which have already been described, the $t3$ pulses being applied via amplifiers to the cathodes of all the S tubes. They are applied thereto across a cathode load resistor common to all S tubes. These tubes feed the displacement tubes $D\times2$, $D\times4$ and $D\times8$ (block 14 of Fig. 2), which form three extra stages of the register. These three tubes are pulsed separately by $t3a$ pulses, which occur at the same time as $t3$ pulses, there being a separate common cathode load for these tubes. The reason for this will be given later.

The cathode circuits of S1, $D\times2$, $D\times4$ and $D\times8$ each include a resistor, in addition to the common cathode resistor for the S tubes and for the $D\times$ tubes, from which a positive output may be derived. The outputs from the $D\times$ tubes are gated by the multiplication control tubes (Fig. 17) to permit the use of the multiplier appropriate to the process being performed.

The digit marking obtained from the decoder (output of RA, RB, RC and RD, Fig. 5) via the digit followers is impressed on tubes 1D1, 1D2, 1D4 and 1D8 (Fig. 16) over the leads 1, 2, 4 and 8 respectively. The digit train (block 10, Fig. 2) consists of 4 flip-flops binary pair 1D1—0D1, 1D2—1D2, 1D4—0D4 and 1D8—0D8, which are so arranged as to do the following:

(a) Receive the digit marking as described via the leads 1, 2, 4 and 8. The normal or rest condition is with the 0D tubes discharging and the 1D tubes quiescent, and the inputs on the digit marking leads causes a selection of 1D tubes representing the digit being marked in to be fired, each extinguishing its associated 0D tube.

(b) Receive the output from the displacement tubes and add them to the value of the digit which has been marked in.

(c) Transfer the value resting in each stage of the digit train one stage towards the least significant digit stage at an appropriate point in each $t$ cycle, i.e. at $t4$. The effect of this is to shift the total in the digit train in the same manner as the running total train is shifted on each step pulse.

Thus the circuit extracts the running total from the displacement tubes after a certain displacement or displacements, whereby multiplication by a predetermined multiplier is effected, and at the same adds thereto a new digit. The result is then fed back to the running total train.

The operation of the circuit of Fig. 16 is controlled by the $t$ pulse generator and counter, Fig. 9, which have already been described.

The conversion operation will now be described with reference to a particular example. It will be assumed that the number to be converted is 157, the digits being received, as already mentioned, most significant digit first. Initially all of the S tubes and the $D\times$ tubes are quiescent, and tubes 0D1, 0D2, 0D4 and 0D8 are discharging. Reception of the first digit occurs; in this case 1. The digit followers (Fig. 15) operate under control of the decoder and energise the digit marking lead 1 in Fig. 16. This applies a positive potential to the trigger electrode of 1D1, which fires and extinguishes 0D1.

Already described, the $t$ pulse generator is started at the same time as this marking-in occurs, and when $t1$ occurs, the $t1$ pulse places the trigger circuits of 1D1—0D1 under the control of $D\times2$. As $D\times2$ is quiescent this has no effect. At $t2$, 1D1—0D1 are placed under control of $D\times8$, but this also has no effect as $D\times8$ is quiescent. It will be noted that decimal to binary conversion is being effected. However, at $t4$ the cathode circuit of 1D1 controls the trigger of S35, and since 1D1 is discharging this causes S35 to fire. Also at $t4$ the condition of each of the 1D—0D flip-flops controls the flip-flop immediately below it. As a result of this and of the $t4$ control for 0D8, all of the 0D tubes are left discharging.

Subsequent $t$ pulse cycles step the discharge in the S train until all the S train has been driven through one complete cycle of 35 steps. The $t$ pulse counter then produces the three extra $t3a$ pulses to clear the displacement tubes as already described. During the stepping of the train which has just been mentioned, each $t3$ pulse steps the pattern once, so that the 35th $t3$ pulse leaves the discharging condition in S1. Thus the first digit has been converted to binary notation and placed in the running total train.

When the next digit is received, the decoder gives an output at the mid-point of the stop element, and this sets the digit followers. This digit has been assumed to be 5, and this is marked in over leads 1 and 4, firing 1D1 and 1D4.

At this point it is desirable to mention the time taken for a single digital conversion. The $t$ pulse cycles occur once every half-millisecond, so 35 cycles plus the three extra $t3a$ pulses takes 19 milliseconds. Since the next digit to be received is 21 milliseconds long, and conversion starts half-way through the stop element of a digit being dealt with, there is plenty of time for the conversion of each character while the next is being received and decoded.

To return to the operation, 5 has been inserted in the digit train, so that 1D1, 0D2, 1D4 and 0D8 are discharging. On the next $t1$ pulse, the $D\times2$ output is allowed to control 1D1 and 0D1, and at $t2$ the $D\times8$ output is allowed to control 1D1 and 0D1, but without result. The $t3$ and $t3a$ pulses then occur, so that the pattern steps once, leaving $D\times2$ discharging. At $t4$, the output of 1D1 causes S35 to be fired. Also at $t4$, 0D8 receives a pulse, which has no effect as it is already discharging. Transfer occurs as already described, so that 0D1, 1D2 and 0D4 are fired.

When the next $t1$ pulse places 1D1—0D1 under the control of $D\times2$, $D\times2$ is found to be discharging and so a pulse is applied to the trigger of 1D1 and 0D1. Hence 1D1 is fired. At $t2$, the $D\times8$ condition is monitored, but as $D\times8$ is quiescent this has no effect. At $t3$, the S and $D\times$ patterns are stepped, leaving S34 and $D\times4$ discharging. At $t4$, 1D1 fires S35 and the transfer occurs as already described, so that 0D8, 0D4, 0D2 and 1D1 are discharging. S35, S34 and $D\times4$ are also discharging.

As $D\times2$ and $D\times8$ are both quiescent, the $t1$ and $t2$ pulses produce no effect; $t3$ (with $t3a$) steps the pattern, so that S34, S33 and $D\times8$ are discharging. Transfer occurs again at $t4$, and leaves all 0D tubes discharging. At the same time 1D1 fires S35, so that we now have S35, S34, S33 and $D\times8$ discharging.

The next $t1$ is ineffective, but as $D\times8$ is discharging, $t2$ causes it to fire 1D1. At $t3$, the stored pattern is stepped once, leaving S34, S33 and S32 discharging. The $t3a$ pulse steps the $D\times$ tube and extinguishes $D\times8$. At $t4$, 1D1 causes S35 to fire and transfer occurs. Hence we now have S35, S34, S33 and S32 discharging and all 0D tubes discharging.

Subsequent $t$ cycles drive the stored total representing a partial conversion to the end of the running total train so that S4, S3, S2 and S1 are discharging. This represents 15, i.e. $(1\times10)+5$. As before, the three extra $t$ cycles for clearing the $D\times$ tubes are produced.

The third digit conversion will now be described in somewhat more detail. In the example being described this digit is 7. It is received in the same manner as were the other two digits, and it causes the leads 1, 2 and 4, to become positive thereby firing 1D1, 1D2 and 1D4, so that the initial conditions will be as follows:

| Running Total Train Tubes Conducting | | | | | Disp. Tubes Conducting |
|---|---|---|---|---|---|
| | S4 | S3 | S2 | S1 | Nil |
| Binary Value | 1 | 1 | 1 | 1 | |

Digit Train Tubes Conducting

| | 0D8 | 1D4 | 1D2 | 1D1 |
|---|---|---|---|---|
| Binary Value | 0 | 1 | 1 | 1 |

The $t1$ pulse gate connects the cathode output of $D\times2$ to 1D1, but as $D\times2$ is not discharging it finds no output so that no change occurs in 1D1—0D1. Similarly the $t2$ pulse gate connects $D\times8$ cathode to 1D1—0D1, also with no result. On the $t3$ (and $t3a$) pulse the S chain and the $D\times$ tubes are stepped to move the pattern along one step. Therefore $D\times2$ is fired when the pattern moves, so that S3, S2, S1 and $D\times2$ are discharging. Thus $D\times2$ is ready to give an output on the next $t$ pulse cycle, this being necessary because the multiplication by 10 includes the sum of the multiplication of the number by 2, the result of this being given by the output from $D\times2$, and of the multiplication of the number by 8, the result of this being given by the output from $D\times8$. At $t4$ the cathode output circuit of 1D1 and the input of S35 are effectively connected. The tube 1D1 is discharging, so a positive output therefrom is applied to and fires tube S35.

At $t4$ also the transfer condition occurs in which the cathodes of all tubes of the digit train flip-flops are effectively connected to the inputs of the lower-numbered tubes so that 1D8—0D8 controls 1D4—0D4, 1D4—0D4 controls 1D2—0D2, and 1D2—0D2 controls 1D1—0D1. As will be clear from the foregoing description, this is because the first digit of the number held in the digital train has been supplied to the running total train. Hence the next digit in the digital train, if any, must be moved forward so that the second digit is in a position to control S35. Also at $t4$, 0D8 is fired since after transfer has occurred it should be impossible to have 1D8 discharging. The conditions of the tubes now are:

| Running Total Train Tubes Conducting | | | | | Disp. Tubes Conducting |
|---|---|---|---|---|---|
| | S35 . . . S3 | | S2 | S1 | D×2 |
| Binary Value | 1 | | 1 | 1 | 1 |

Digit Train Tubes Conducting

| | 0D8 | 0D4 | 1D2 | 1D1 |
|---|---|---|---|---|
| Binary Value | 0 | 0 | 1 | 1 |

Thus we have in effect added 1 to the running total train and prepared the circuit for multiplication by 2. When the next $t1$ pulse occurs it finds the cathode of $D\times2$ positive, and so a pulse is applied to 1D1—0D1. As the movement of the pattern one step multiplies by 2, the condition stored on $D\times2$ indicates that 1 is to be inserted in the second binary digital place. Since 1D1 is initially discharging, there are two ones in the second binary digital place; that due to multiplication of the number stored in the running total train by 2, and that due to the third digit. This causes 0D1 to fire since 1D1—0D1 is connected as a binary pair. Since this represents the addition $1+1=10$ in binary notation, carry-over is necessary.

The system of carry-over used is that all carries are effected simultaneously, this being effected by a gate per flip-flop whose controls include the "one" tube of all of the lower-numbered flip-flops and the control marked MCL. MCL is the lead which is energized at $t1$ if $D\times2$ is discharging and at $t2$ if $D\times8$ is discharging, i.e. it is energised if one has to be added as a result of the multiplications. Thus for 1D2—0D2 the carry gate has as its controls MCL and 1D1; for 1D4—0D4 the carry gate has its controls MCL, 1D1 and 1D2; and for 1D8—0D8 the carry gate has as its controls MCL, 1D1, 1D2 and 1D4. It will be seen when considering the detailed circuits later, that each tube of these flip-flops will have two carry gates, one for $t1+D\times2$ and one for $t2+D\times8$, but for convenience they appear in Fig. 16 as one gate for the flip-flops pair concerned.

To return to the operation being described, when $t1$ occurred, 1D2 and 1D1 were all "up," and so when a carry is needed as a result of adding one to 1D1—0D1, carry occurs in the flip-flops 1D2—0D2 and 1D4—0D4, fires 0D2 and 1D4. At $t2$ there is no result since $D\times8$ is quiescent. On $t3$ and $t3a$ the patterns are again stepped. At $t4$ the value of the second binary digit as represented by the state of 1D1—0D1 is examined, and found to be 0, as 0D1 is discharging. Hence S35 is not fired. Also at $t4$ the transfer occurs, in which 1D4 fires 1D2. 0D2 fires 0D1, 0D8 fires 0D4, and the usual $t4$ pulse ensures that 0D8 is discharging. Thus the 0 digit on 0D1 has been read into the running total train, and the digits on the digit train have been "moved up" one step. Conditions now are:

| Running Total Train Tubes Conducting | | | | | Disp. Tubes Conducting | |
|---|---|---|---|---|---|---|
| | (S35) | S34 . . . S2 | | S1 | DX2 | DX4 |
| Binary Value | 0 | 1 | | 1 | 1 | 1 |

Digit Train Tubes Conducting

| | 0D8 | 0D4 | 1D2 | 0D1 |
|---|---|---|---|---|
| Binary Value | 0 | 0 | 1 | 0 |

In the above table S35 is included in parentheses because its quiescent state represents a significant digit 0.

On the next cycle, $D\times2$ is again found conducting at $t1$, which indicates that the result of multiplying the old running total by 2 gives a binary value of 1 to be inserted in the third digital place. This triggers 1D1, since 0D1 is discharging because the digit train has nothing to add in this position. Since this digit has a value of 1 there is no carry on this cycle. As before, $t2$ finds $D\times8$ quiescent, so no change occurs thereat. On $t3$ and $t3a$ the pattern is stepped. The $t4$ condition finds 1D1 discharging which means that this, the third digit of the new running total must be 1, so S35 fires. The $t4$ pulse also causes transfer so that the conditions now are:

| Running Total Train Tubes Conducting | | | | Disp. Tubes Conducting | | |
|---|---|---|---|---|---|---|
| | S35 | (S34) | S33 . . . S1 | DX2 | DX4 | DX8 |
| Binary Value | 1 | 0 | 1 | 1 | 1 | 1 |

Digit Train Tubes Conducting

| | 0D8 | 0D4 | 0D2 | 1D1 |
|---|---|---|---|---|
| Binary Value | 0 | 0 | 0 | 1 |

On the fourth cycle, $D\times2$ is discharging at $t1$, and 1D1 is discharging which means that for the fourth binary digit there is 1 from the multiplication by 2 from the carry on the second cycle. Therefore we have 1+1=10. Since 1D1 is already discharging, there is a carry condition which fires 1D2 via the carry gate (1D1 and MCL). At $t2$, D×8 is found to be discharging. This is the old first digit of the old running total moved three places and so multiplied by 8. This is added to the 1D1—0D1 pair and refires 1D1. Thus for the fourth digit of the running total we have had 1+1+1=11. Carry was, of course, effected on $t1$. Again $t3$ steps the pattern. At $t4$ S35 fires as 1D1 is discharging since the fourth digit must be 1, and the 1 carried on $t1$ is transferred forward to 1D1. This gives the following conditions:

| Running Total Train Tubes Conducting | | | | Disp. Tubes Conducting | | |
|---|---|---|---|---|---|---|
| S35 | S34 | (S33) | S32 ... | D×2 | D×4 | D×8 |
| Binary Value 1 | 1 | 0 | 1 | 1 | 1 | 1 |

| Digit Train Tubes Conducting | | | |
|---|---|---|---|
| 0D8 | 0D4 | 0D2 | 1D1 |
| Binary Value 0 | 0 | 0 | 1 |

Thus we now have the first four digits of the new running total in the running total train. The three binary digits from the digit train, three binary digits derived from multiplying by 2 and one binary digit derived from multiplying by 8 have been added together to give 1101 in the running total train and 1 which was carried in the digit train.

On the fifth $t$ pulse cycle when $t1$ occurs it finds D×2 discharging and adds one to 1D1—0D1 to strike 0D1. At the same time a carry condition occurs which fires 1D2. At $t2$ D×8 is found to be discharging, so 1D1 is re-fired. Thus we have again had 1+1+1=11, combining the carried 1, 1 from multiplying by 2 and 1 from multiplying by 8 to give 1 in fifth digital position and 1 carried. On $t3$–$t3a$ the patterns are stepped. On $t4$, 1D1 fires S35 to record the 1 in the fifth digital position, and the 1 carried is transferred to 1D1 ready for the next cycle. Thus we now have

| Running Total Train Tubes Conducting | | | | | Disp. Tubes Conducting | |
|---|---|---|---|---|---|---|
| S35 | S34 | S33 | (S32) | S31 | D×4 | D×8 |
| Binary Value 1 | 1 | 1 | 0 | 1 | 1 | 1 |

| Digit Train Tubes Conducting | | | |
|---|---|---|---|
| 0D8 | 0D4 | 0D2 | 1D1 |
| Binary Value 0 | 0 | 0 | 1 |

Thus in addition to having added in the binary digits corresponding to 7 which were stored in the digit train, we have added the digits occurring as a result of the multiplication by 2. Two digits occurring as a result of multiplying by 8 have also been added, and 1 carried forward therefrom remains to be dealt with.

On the sixth cycle, when $t1$ occurs it finds D×2 quiescent, so $t1$ has no effect. When $t2$ occurs it finds D×8 discharging, and hence a positive pulse is applied to 1D1—0D1 which fires 0D1 and carry occurs to fire 1D2 (i.e. 1+1=10, 0 and carry 1). On $t3$ and $t3a$ the patterns are stepped. At $t4$ the cathode of 1D1 is examined and as 1D1 is not discharging the sixth digit is 0, so that S35 does not fire. Transfer at $t4$ passes the 1 carried on $t2$ to 1D1—0D1, where it fires 1D1 in readiness for the next cycle. Thus we now have:

| Running Total tubes Conducting | | | | | | Disp. Tubes Conducting |
|---|---|---|---|---|---|---|
| (S35) | S34 | S33 | S32 | (S31) | S30 | D×8 |
| Binary Value 0 | 1 | 1 | 1 | 0 | 1 | 1 |

| Digit Train Tubes Conducting | | | |
|---|---|---|---|
| 0D8 | 0D4 | 0D2 | 1D1 |
| Binary Value 0 | 0 | 0 | 1 |

On the seventh cycle when $t1$ occurs it finds D×2 is still quiescent, and so there is no change. At $t2$, D×8 is discharging and so 1 is added to 1D1—0D1, which fires 0D1, and carry occurs to fire 1D2 (1+1=10, 0 and carry 1). At $t3$–$t3a$ the pattern steps, leaving all D× tubes extinguished. This means that all digits derived from multiplication have been attended to. On $t4$, as 1D1 is quiescent (to indicate that the seventh binary digit is 0), S35 is still unfired and the 1 carried to 1D2 is transferred back to fire 1D1 again. We thus now have:

| Running Total Tubes Conducting | | | | | | Disp. Tubes Conducting |
|---|---|---|---|---|---|---|
| (S35) | (S34) | S33 | S32 | S31 | (S30) | S29 | Nil |
| Binary Value 0 | 0 | 1 | 1 | 1 | 0 | 1 | |

| Digit Train Tubes Conducting | | | |
|---|---|---|---|
| 0D8 | 0D4 | 0D2 | 1D1 |
| Binary Value 0 | 0 | 0 | 1 |

On the eighth cycle, at $t1$ and $t2$, D×2 and D×8 respectively are quiescent, so no change in the digit train is produced. Pulses $t3$ and $t3a$ step the pattern, and all that remains is for $t4$ to cause 1D1 to fire S35, whereby the last 1 carried is fed into the running total trains. This gives the following conditions:

| Running Total Train Tubes Conducting | | | | | | |
|---|---|---|---|---|---|---|
| S35 | (S34) | (S33) | S32 | S31 | S30 | (S29) | S28 |
| Binary Value 1 | 0 | 0 | 1 | 1 | 1 | 0 | 1 |

| Digit Train Tubes Conducting | | | |
|---|---|---|---|
| 0D8 | 0D4 | 0D2 | 0D1 |
| Binary Value 0 | 0 | 0 | 0 |

All the 1D tubes, all the D× tubes and S27 to S1 inclusive are now extinguished. The next twenty-seven pulse cycles step the pattern to the following position:

S8 (S7) (S6) S5 S4 S3 (S2) S1
1   0    0   1  1  1   0   1

Throughout, the S tubes whose condition indicated an 0 digit, have been indicated in the tables by having their designations bracketed.

This final result is the binary equivalent of $$(128+16+8+4+1=157)$$

so that the third decimal digit has been added in and the old running total of 15 multiplied by 10 to give the answer of 157.

Three additional step pulses are supplied from $t3a$ to make sure that the displacement tubes are cleared, and the digit train is reset if necessary by a reset condition from the time scale. Since carry can only occur at $t1$ and/or $t2$, no incorrect operation can occur on resetting.

To multiply by 2, as is needed when converting "binary pounds" to "binary tens of shillings" operation would be more simple than when multiplying by 10 since $D \times 8$ would not be concerned. To multiply by 12, the circuit is so set that $t1$ and $t2$ examine $D \times 4$ and $D \times 8$ respectively. If the need arises to multiply by an odd number the output from S1 could be used to give a "multiply-by-1" control. If the conversion includes weights and measures, multiplication by 16 for pounds to ounces may be needed. This would need an extra $D \times$ tube and an extra 1D—0D stage for marking in the "ounces digit."

The method of multiplication and addition briefly described above is more fully described and claimed in the copending application, Serial No. 197,207, filed by E. P. G. Wright and A. D. Odell on November 24, 1950, now Patent No. 2,761,621.

MULTIPLICATION CONTROL CIRCUIT
(See Fig. 17)

This circuit, which corresponds to block 13 of Fig. 1, consists of two flip-flops pairs $\times A$, $\times B$ and $\times C$, $\times D$ from the cathodes of which the control for selecting the multiplier used in the circuit of Fig. 16 is derived, in conjunction with three tubes Y, Z and ZZ. These tubes are so interconnected that only one can be stably discharging at once, if one fires it extinguishes the previously firing tube. Such a circuit can be called a tri-stable circuit.

When the converted is taken into use, $\times A$, $\times C$ and Y are operated by a reset condition so that the circuit rests with the leads $\times 8$ (connected to the cathode of $\times A$) and $\times 2$ (connected to the cathode of $\times C$) energised. The leads shown connected to the cathode of tubes in Fig. 17 are connected to time constant circuits and are energised if the corresponding tubes are discharging. Therefore the converter treats data as a decimal-binary conversion under normal conditions.

If a colon is received, indicating that a change of multiplier is necessary as sterling is involved, tube $\times B$ fires on the P1 pulse at 19.5 ms. from the start of the character, assisted by the cathode output of Y, and thereby disables the multiply by 8 function. It will be noted that unless Y is discharging, $\times B$ cannot be fired, so that only the first sterling colon can fire $\times B$. Therefore only the mutiply-by-2 is left. The production of the P1 pulse has already been described. The inputs marked (:) in the circuit of Fig. 17 are energised by the decoder when a colon is received. When the next numerical digit is received, the control output is $\times 0$ and $\times 2$, so that the running total is multiplied by 2 which converts it from "binary pounds" to "binary ten shillings." The numerical digit will be 1 or 0 and if it is 1 it is added in as has been described: if it is 0 the final effect of the operation is to multiply the running total by 2.

On the next P1 pulse (19.5 ms. after the start of the "ten-shilling" character), $\times A$ re-triggers from $\times B$, and tube Z is also fired, extinguishing Y. Therefore on the next numerical digit (the second "shillings" digit) the multiplier is 10, with outputs from $\times A$ and $\times C$ as originally, which reduces the stored number to "binary shillings." As has been described the digit is added in in addition to the multiplication of the running total.

Receipt of a second sterling colon now triggers $\times D$ (as $\times C$ and Z are both discharging) so that the tubes discharging are now $\times A$ and $\times D$ giving outputs on $\times 8$ and $\times 4$ leads. Thus the running total is multiplied by 8 and by 4 and the results added together, thereby converting it to "binary pence." The pence digit is of course added in to this total. If the number of pence is 10 or 11, the special single digits are used, in which 10 and 11 are sent as single characters. It will be remembered that if 10 or 11 occurred in the shillings position it would have been sent as a two character number.

Normally pence will be the lowest base used, but if it is necessary to calculate to tenths of pence the total may be further reduced to "binary tenths of pennies." This is effected by receipt of a third sterling colon which triggers $\times C$ ($\times D$ and Z conducting) and ZZ ($\times D$ conducting). Thus the circuit is restored to $\times A$, $\times C$, the multiply by 10 condition. Receipt of further sterling colons does not cause any change of condition as ZZ is conducting, which means that the gates associated with the colon cannot be opened.

At the end of the number, either "space" or "carriage return" will be received, and this restores the circuit to its normal condition $\times A$, $\times C$ and Y conducting.

The circuits of Figs. 16 and 17 show the cold cathode tubes forming the circuit but with nearly all circuit components omitted. Where a cross appears on a conductor line this indicates that there is a gate circuit there which opens at the time indicated. A lead ending in "space" with a designation thereon indicated that this connection goes to the point designated.

More detailed circuits of Figs. 16 and 17 are shown on Figs. 18–24.

RUNNING TOTAL TRAIN AND DISPLACEMENT TUBES (Figs. 18–20)

This circuit is a pattern movement register or shift register which is generally similar to that which is described and claimed in the U.S. Patent No. 2,649,502 to A. D. Odell, issued August 18, 1953. As stated at the outset hereof, Figs. 19A and 19B are to be placed to the right of Figs. 18A and 18B, and Figs. 20A and 20B are to be placed to the right of Figs. 19A and 19B.

The circuit includes 35 S tubes and the 3 $D \times$ tubes $D \times 2$, $D \times 4$ and $D \times 8$ (Fig. 20B) and between each tube and the next lower numbered tube (higher numbered in the case of the $D \times$ tubes) there is a coupling circuit which includes a capacitor. The cathodes of tubes S1–S35 are connected to a common resistor R21 and the $t3$ pulses are applied to the junctions of this resistor and the commoned cathodes of S1–S35 via an amplifier AMPS. The cathode of the $D \times$ tubes (Fig. 20B) are also connected together and to a common resistor R22. The $t3a$ pulses reach the $D \times$ cathodes via amplifier AMPD. As already mentioned, $t3$ and $t3a$ occur at the same time.

On the leading edge of a $t3$ pulse, which is positive-going, all discharging S tubes are extinguished. This causes the anodes of these tubes to go suddenly positive. This positive potential charges the "inter-tube" capacitor, such C21 in the output of S30 (Fig. 20A), this capacitor being connected between the −110 volts supply and the +220 volts supply applied to the anode of tube S30. This capacitor will be charged when the $t3$ pulse ends to a value at which it can fire a tube. At the end of the $t3$ pulse, the commoned cathode potential returns to its normal value.

Certain tubes, those which immediately succeed previously-discharging tubes, are trigger-primed from the capacitor such as C21, and these tubes are fired when the pulses ends. Thus the action is that a $t3$ pulse extinguishes all S tubes on its leading edge, and on its trailing edge each S tube immediately following a previously-discharging S tube is fired. If S1 is extinguished on $t3$, when the pulse ends $D \times 2$ is fired. Thus the information stored in the circuit represented by a pattern of discharging and qiescent tubes is stepped once on each pulse $t3$. The same action occurs in $D \times 2$, $D \times 4$, $D \times 8$ on each pulse $t3a$ at the same time. The reason for the "split drive" for S and $D \times$ tubes has already been given.

Apart from the coupling circuits for pattern movement, certain tubes have additional control circuits, for example the first tube S35 in Fig. 18A is controlled by either of two gates. One of these allows S35 to be fired under control of 1D1 (Fig. 16), when W44 is biased positively from the cathode of 1D1 and W45 is biased positively at t4.

The second gate circuit controlling S35 fires S35 if the incoming character is a minus sign. Thus S35 is discharging if a minus sign is received immediately after the number to which it applies. When a minus sign occurs in the decoder at position RD9 (Fig. 5) biasses W46 positively, so that S35 is fired at t4. If S35 is not discharging there is no minus sign.

The next gates to be considered are those used when a designation star and its accompanying numbers are to be inserted. If tube DS1 (Fig. 33) is discharging (which means that a single designation star has been received), it biasses W48-51 positively. The number immediately following the star is applied to the appropriate ones of the digit followers DF8, DF4, DF2, DF1 (Fig. 15) by the decoder, and these bias positively appropriate ones of rectifiers W52-W55. Thus the number following the designation star is marked into S31-S34. If a second designation star is received, DS2 and DS1 are discharging, and DS2 biasses W56 positively which causes S30 to fire. One designation star is followed by any one of 1 to 11, two designation stars by any one of 0 to 11. In the latter case 0 is possible since the second star fires S30 anyway.

DIGIT TRAIN CATHODE FOLLOWERS (Fig. 21)

Although the multiplication control is shown on Fig. 16 as being exercised on the first flip-flop of the digit trains directly from D×2 or D×9 at t1 or t2 respectively, it is convenient to do this indirectly via a cathode follower. The reason for this is that a pulse to be added to the circuits of the digit train might cause one or more carriers, and in the extreme case where it causes carry to 1D8—0D8 the pulse will have to be capable of operating four gates. Hence to obtain the necessary power for this purpose, three cathode followers are provided (Fig. 21), one for each multiplication, i.e. one cathode follower KA for multiply by 2, KB for multiply by 4 and KC for multiply by 8.

The input gate of KA is such that KA gives a positive output pulse from its cathode at t1 if D×2 is discharging and if multiply by 2 is needed. Similarly KB gives an output at t1 if D×4 is discharging and if multiply by 4 is needed. It will be seen that KA and KB can never both give an output during one cycle since in the system shown there is no multiply by 6 needed. KC gives an output at t2 if D×8 is discharging and if multiply by 8 is needed. The leads ×2, ×4, ×8 are of course the outputs at the multiplication control circuit (Figs. 17 and 24).

DIGIT TRAINS (Figs. 22 and 23)

The connections of these circuits have been schematically illustrated in Fig. 16, and are briefly described with reference thereto.

The circuit includes four gas tube flip-flop pairs of the bistable type 1D1—0D1, 1D2—0D2 (Fig. 22), 1D4—0D4, 1D8—0D8 (Fig. 23) and which are interconnected in series. Each pair includes two tubes, with separate triggering circuits and anode and cathode circuits. The anode circuits of the tubes of each flip-flop are interconnected by a capacitor. Hence if one tube is fired when the other is already discharging, the reduction in anode potential produced by the current flowing in the anode load of the newly-fired tube causes a negative pulse to be applied to the anode of the other tube via the capacitor. This extinguishes the other tube. The resistance-capacitor time constant circuit in the cathode circuit of each tube has the result that the cathode potential of a discharging tube is relatively positive due to the voltage drop across its cathode resistor. This voltage does not immediately vanish when the tube is extinguished because the capacitor has to discharge before this can happen. Hence no multiple firing can occur. The tubes are fired by positive pulse potentials applied to their trigger electrodes over one of the gate circuits connected thereto. Where a control point is shown in Fig. 16 as being connected to the trigger electrodes of both tubes of a pair, there are, as shown in the detailed circuits two separate gates, one for each tube of that pair.

The gates controlled from ×2 (from the cathode of ×C, Fig. 17), can control the conditions of the flip flop pair 1D1—0D1 at time position t1 via cathode follower KA. When KA gives an output it biasses rectifiers W60 and W61 positively. If the rectifier W62 and W63 are biassed positively from the cathode of tube C (Fig. 25) the condition of the flip flop will be altered if KA (Fig. 2) gives an output. A similar t1 controlled gate is provided for each 1D1—0D1 tube for use when a multiplication by 4 is required, this being controlled from the ×4 lead (from the cathode of ×D, Fig. 17 via KB (Fig. 21). The ×8 lead (from the cathode of ×A, Fig. 17) controls the flip flop pair at time t2 via KC. The use of this has been already described when multiplication by 10 is in progress. This, of course involved separate multiplications by 2 and by 8, and adding the products. To multiply by 12, of course it is necessary to multiply by 4 and by 8 and add the products. It will be noted that in each of the above gates the controls include the other tube of the same pair. Thus the multiply gates for 1D1 all include 0D1 among their controls and vice versa. This is also so for the carry gates to be described later.

The other gates for 1D1—0D1 are transfer gates (disabled if C, Fig. 25, is not discharging), the gate for marking in part of the last received decimal digit to 1D1 (controlled from DF1, Fig. 15) and the restore gate which "zeroises" the train, at the time defined by TC7, TB1 (Fig. 4), TA3F (Fig. 3) (18.3 milliseconds) in the case of 0D1. These references refer to various outputs from the time scale and each coincidence of three positions, one from each stage of the time scale represents a different time in that cycle.

The digit tubes 1D2—0D2 have gates for controlling the carry operation (already described) at t1, t2. Restore (at 18.6 milliseconds) marking and transfer are as before. 1D4—0D4 is, in general, the same in operation as 1D2—0D2 except that it restores at 18.9 milliseconds. 1D8—0D8 is also similar except that the only transfer connection is that which fires 0D8 at t4. Restoration occurs after an elapsed time of 18.9 milliseconds.

The "Carry" gates will now be briefly described. Each tube of each flip-flop other than the first, has three carry gates, one controlled by KA, one by KB, and one by KC (Fig. 21). That is, there are separate carry gates for each of these tubes for each of the three multipliers 2, 4 and 8 which are used. Each carry gate also includes among its controls the outputs from the 1D tubes of all preceding stages, and also the output for the opposite tube of the same stage.

As an example the carry gate for multiply by 2 for tube 1D4 (Fig. 23) will be described. This has among its controls 1D1 and 1D2 so that if both of these tubes are conducting, rectifiers W65 and W66 are biased positively. If 0D4 is discharging at the same time, W67 is biassed positively. Hence if KA gives an output on the next t1 pulse, a carry to 1D4—0D4 is called for. Since 0D4 is discharging and biasses W67 positively, when the pulse from KA occurs it biasses W68 positively, so that a positive pulse is then applied to the trigger electrode of 1D4 via the decoupling rectifier W69 and the capacitor C25. Hence 1D4 fires and extinguishes 0D4. At the *same time*, 0D1 fires and extinguishes 1D1, and 0D2 fires and extinguishes 1D2. Thus all alteration to the digit trains in response to a pulse to be added occur simultaneously.

It will be noted that the outputs from the cathodes of these tubes are taken via a delay circuit formed by an R-C circuit. Considering the cathode of 1D1 when 1D1 is quiescent, its cathode is at −110 volts, so the capacitor C26 is uncharged. However, when 1D1 discharges its cathode potential rises and biasses W70 positively. Hence C26 charges to this voltage through the resistor R50. The potential on the upper plate of C26 does not reach an effective gate-operating value until after the end of the pulse which fired 1D1. Hence its output is ready for the next operation. This arrangement prevents spurious multiple firings in response to incident pulses.

A further feature which will be noted is that the outputs from the capacitor C26 and the corresponding capacitor for 0D1 are obtained via cathode followers, indicated by CF since each of those outputs have to control several gates. The outputs from the other 1D—0D tubes might need such cathode followers as indeed might the outputs from many other tubes in the system. However, these are not shown to avoid complicating the circuits unnecessarily.

MULTIPLICATION CONTROL TUBES (Fig. 24)

The operation of this circuit has been described with reference to the schematic of Fig. 17: Fig. 24 shows the full circuit with all its gates.

"Restore" is controlled from contact csb2 of relay CSB (Fig. 35) which applies a momentary positive potential to the trigger electrodes of ×A, ×C and Y, which should be discharging in the rest condition. Restoration to this rest condition also occurs on a "space" signal (from cathode RA8 of tube RA of the translator, Fig. 6), and on a "carriage return" signal (from RA7, Fig. 6).

From the description given with reference to Fig. 17 it will be remembered that a colon sets the decorder to its RB6 energised condition. This, the "sterling colon" causes one of tubes ×B, ×D and ZZ to be fired. In the normal condition wherein ×A, ×C and Y are discharging, i.e. the sterling colon being the first sterling colon, a colon fires ×B when the P1 pulse occurs. ×D cannot be fired because Z is quiescent, so that W71 in its control gate is connected to −110 volts. Similarly ZZ cannot be fired because ×D is quiescent. When ×B fires, it extinguishes ×A so that the ×8 output is disabled. Hence ×2 is energised, so that the circuit is in the multiply-by-2 condition.

It will be recalled that when the next P1 pulse occurs which is towards the end of the stop element of the character forming the "tens of shillings" digit, the multiply-by-8 is restored. To do this, P1 plus ×Bc causes Z to be fired and also causes ×A to be fired, so that Y and ×A are both extinguished. Hence the circuit has been returned to a condition in which multiplication by 10 occurs.

After the conversion of the units shillings digit, a further colon is received and this fires ×D, because both ×C and Z are now discharging when P1 occurs, which extinguishes ×C. Hence the condition has been reached in which multiplication is by 12.

The third sterling colon is only used if decimal fractions of a penny have to be dealt with, and when conversion to "binary tenths (or even hundredths)" of pennies is needed. This colon has no effect on ×A—×B since Y is quiescent, but it returns ×C—×D to ×C discharging because Z is discharging. This is done by the lowermost control gate of ×C.

Restoration when conversion has been completed is by the P1 pulse with "space" or "carriage return," either of which will reset the circuit to ×A, ×C, Y discharging.

It will be seen from Fig. 24 that Y—Z—ZZ form a three-tube version of a flip-flop, which could be called a tri-stable register. It will also be seen that the output leads from tubes ×A, ×B, ×C, ×D are sometimes designated with their functions for multiplication control and sometimes with the tube identity.

NUMBER END, BLOCK END, INFORMATION AND CLUTCH CONTROL (Fig. 25)

Fig. 25 is a schematic diagram of circuits for number end, block end, information and clutch control, these circuits corresponding to the blocks marked "Number End Counter," "Block End Detector," "Output Control," "Character Counter," "Alarm," and "Line Feed Store," all in Fig. 2. It shows these circuits with components omitted. The requirements which this group of circuits must fulfil have been set out while describing the conversion with reference to the block schematic of Figs. 1 and 2, and need not be repeated here. The schematic of Fig. 25 will now be described in parts.

NUMBER END AND BLOCK END

As its name implies "number end" means the signal which tells the converter that a number has been completely received, and "block end" that the end of a particular block of information has been reached. It will be assumed for convenience of explanation that all blocks of information are insufficient to fill an annex tube, i.e. that they have less then sixteen numbers.

The main circuits involved are the number end counter (block 25, Fig. 2) formed by NEA-NEB working as a binary pair and NEC as a divide-by-eight, which gives a sixteen-way counter, and the character counter formed by the scale-of-three-circuit CCA, CCB, CCC.

The indication that a number has been dealt with is given by carriage return (C.R. output RA7c of the decoder), and each time this is received NEA-NEB is pulsed. Every time BER operates the gate tube TGEC is prepared so that the next negative master −P pulse steps the multi-gap tube NEC. Thus the number end counter records the number of numbers dealt with.

The number end counter circuits are shown in detail in Fig. 26. This figure shows that gates (shown in Fig. 25 by crosses on the conductors) are controlled at the appropriate times (in milliseconds) from the TA—TB-TC time scale of Figs. 3 and 4.

Restoration is controlled by contact cbs3 associated with relay CSB, Fig. 35.

When the end of a block of numbers occurs this is signalled by three "Line Feed" characters each of which sets the translator (Fig. 5) to RD2. The first "Line Feed" with P1 steps the character counter to CCA (Fig. 25), the second, also with P1, to CCB and the third to CCC (see detailed circuit of Fig. 29). From the point of view of the present circuit the end of a block of items is indicated by two line feeds, the third being used to allow arrest of the tape. From CCB the gate controlling a trigger tube BE (detailed circuit in Fig. 26) is prepared.

It is necessary now to describe the pattern check tubes LFA–LFB (these tubes, with AL, correspond to the blocks marked "Line Feed Circuit," and "Alarm," in Fig. 2). LFB is triggered by a pulse from the time scale at 18.9 ms. (i.e. .9 millisecond after the stop element of the teleprinter code character commences), but if the character received is "line feed," tube LFA is re-triggered at 19.5 ms. (the normal time at which the decoder gives an output). If both LFA and CCB are conducting, indicating that the "line feed" is the second one, then BE fires (see also Fig. 26). This is the block end control. When it fires, BE extends a start condition to the TA-TB-TC time scale to keep it running. This is the gate consisting of W75, controlled from BE, and W76, controlled from +P, for tube ST in Fig. 3. The output from BE also prepares gates to NEA-NEB (of the number end counter circuit), so that these tubes can be pulsed by time scale outputs at 2.4, 5.4, 8.4 ms., etc. until the required total of sixteen has been completed on the counter. This will be described in more detail later. Thus the circuits "mark time" if the block contains less than 16 numbers. The fact that 16 has been counted is indicated by NEA conducting with NEC9 discharging, in which case BER triggers and restores BE to its non-discharging condition. This stops the time scale and cuts off further pulses to the number end counter.

On each number-end, the number-end cathode follower NEF also delivered a pulse output. When the sixteenth number-end pulse is being sent, the block-end cathode follower BEF is energised from NEC9 of the number-end counter, so a block-end pulse is delivered. At the same time NEC is stepped to NEC10 from which it homes to NEC1.

To check that the "end of item" signal was received from the tape is the main purpose of the tubes LFA–LFB and AL and the pattern check key PCK. As has been stated, LFB always fires from the time scale at 18.9 ms. from the commencement of the character, but if the character is a line feed, the tube LFA refires at 19.5 ms., which restores LFB.

The final check is necessary after the last (i.e. the sixteenth) number as this is the last occasion on which a block-end signal may be received. Thus from NEC10 at gate is prepared to examine the cathode of LFB at 20.1 ms. This time is chosen since it is just too late to be used when NEC first reaches NEC10, and it therefore allows examination of the next and subsequent characters. Obviously the last step of the number-end counter will have been caused by a carriage return signal, and if a block-end is signalled the subsequent three characters must be "line feed."

The character counter steps from CCC to CCA on the counter after the carriage return (C.R.), and if it is a line feed, remains there until the next character, when the counter steps to CCB (if a line feed), remains there and finally steps to CCC on the next (i.e. third) character. Thus it has been proved that the end of an item has been received since three line feeds have been received. Each time a character is received, LFB cathode is examined and, if its potential is positive it indicates that a line feed has *not* been received. In such a case, AL is triggered and gives the alarm by actuating the alarm relay ALR in its anode circuit. Simultaneously a gate opens to trigger CCC to restore the character counter and with CCC triggered, NEC homes.

The operation of the converter is not held up even if the pattern does not check.

The alarm circuit is brought in only on pattern check so that the alarm may be restored by temporarily opening the cathode circuit of tube AL upon actuation of the pattern check by PCK.

INFORMATION FEED OUT TO FEEDER

When information is to be sent to the feeder, this is signalled by space or by carriage return, either of which operates the "feed out" tube FC, which prepares the gate circuits of all the output tubes to the feeder control circuits. These outputs will be described under the appropriate sub-headings. These portions of the apparatus are included in block 18, Fig. 2.

(*a*) *Marker pulses.*—It has already been explained that the information digits are accompanied by step or marker pulses, the latter being supplied to the feeder circuit over a separate lead and digits must occur alternately. It is therefore necessary to produce 36 marker pulses, a number comprising up to 35 digits and the additional pulse, that preceding the first information digit, is derived by the sequential operation of ND and CRT (Fig. 9). When FC triggers, it causes ND to trigger (see Fig. 9) on the next master (+P) pulse, and ND, as usual, causes CRT to trigger on the next succeeding master pulse. There is thus a condition of ND and RC discharging which persists for one master pulse period (100 microseconds), and this allows one master pulse to energise cathode follower MPF in Fig. 25. A second gate controlled by FC (which remains conducting all the time that the feeder circuits are to be fed) and the *t*4 pulse allows the subsequent 35 pulses from the "*t*" pulse generator to similarly control MPF. It will be remembered that the chain S1–S35 (Fig. 16) in which number conversion is effected is stepped in *t*3, so that the marker pulses produced by MPF at *t*4 each occur immediately after a digit. Therefore MPF issues a total of 36 marker pulses.

(*b*) *Information pulses.*—These are the pulses conveying to the feeder the data to be sent to an annex. They must have such an origin and duration that the front edge of the pulse coincides with or leads that of the second and subsequent step pulses. This is achieved by the introduction of a flip-flop pair 01—00 (Fig. 25). 01 triggers from the pulse generator cathode PG5 (that which controls *t*4) if the last tube S1 of the running total train is discharging and FC is discharging and if ND (Fig. 9) is also discharging. The cathode of 01 controls the cathode follower INF, which therefore initiates a pulse immediately after the marker pulse controlled by *t*4. This pulse persists until 00 is triggered on the positive master pulse (P+) when the pulse generator is in the act of stepping from PG1. Thus the front edge of this pulse slightly leads its accompanying marker pulse, and the pulse persists for at least 100 microseconds after the marker pulse ceases.

The pulse so produced is the information pulse.

Had the binary digit been 0, S1 would not have been discharging and 01 would not have fired, so that INF would give no output.

(*c*) *Number end pulses* are emitted by the cathode follower NEF, which is controlled by either of two gate circuits. For normal number-ends, *t*4 in conjunction with gate 60 controlled by the last position of the "*t*" pulse counter causes the cathode follower NEF to generate the pulse. For tube-filling pulses (when the block of information consists of less than 16 long numbers or equivalent short numbers) NEF is controlled by BE (the tube which is discharging if a block-end pulse has been received) and by TB8 of the time scale (Fig. 4) as well as by a P+ master pulse, so that number-end pulses occur at intervals of 3 ms. until a number equivalent to those which would fill a storage tube have been produced. These also reach the control circuits over a separate lead.

(*d*) *Block-end pulses.*—The block-end pulse occurs only in the condition that the last number-end pulse is being transmitted. The two are coincident, the time 20.4 milliseconds from the beginning of the character being used to control the cathode follower BEF. This timed control is indicated in Fig. 25 by the cross marked with 20.4 on the grid lead of BEF. The timed output for this is obtained from the time scale.

Marker, number end and block end pulses must persist for about 30 microseconds. The master (P) pulse has a duration of about 10 microseconds, so it will be necessary to "stretch" the pulse delivered by the cathode followers; means for stretching pulses in this manner are well known, so no description thereof is considered necessary. The pulse amplitude should preferably be of the order of 25 volts.

DETAILED CIRCUITS (Figs. 26–31)

Fig. 26 includes the number-end counter, and the block-end flip-flop.

Since the block end flip flop is the simpler part of Fig. 26 it will be described first. It comprises two gas tubes BE and BER, which are interconnected as a bistable flip-flop, and their associated gates. The normal condition is with BER discharging resetting being controlled by inputs derived from contact csb4 of relay CSB (Fig. 35), cathodes NEC9c or NEC10c (Fig. 26), under control of the time scale. The two last named inputs include the usual form of time scale control, i.e. three rectifiers all of which are biased positively only at the desired time, in this case 19.8 ms. from the start of a received character.

It will be remembered from the general description of Fig. 25 that LFA would be fired 19.5 ms. if the character being received is a line feed, and tube CCB will also be fired if there is a second line feed. Since this is a block-end, it fires BE (Fig. 26) which extinguishes BER, and cuts off the t pulse supply. BER is refired by NEC9c, so that t pulses can again be produced, and the NEC10c control ensures that BER is operated ready for the next block of information.

The number end counter, which consists of a binary pair NEA–NEB, and a divide-by-eight circuit using a multi-cathode tube NEC, will now be described.

It will be remembered that the indication to the converter that a number-end is to be produced is the reception from the tape of Carriage Return, which sets the decoder (Fig. 5) to RA7. The normal state of the counter is with NEA (Fig. 26) discharging, reset being derived from contact csb3 of relay CSB (Fig. 35). Each tube has its controlling gates controlled by RA7 of the decoder, the opposite tube of the pair, and the P1 pulse. Thus NEA—NEB changes its state each time RA7 is discharging, i.e. on each carriage return, and hence acts as a divide-by-two circuit for "carriage return."

Each of these tubes also has a second gate controlled by the time scale, by BE, and by the opposite tube of the pair. The tube BE, it will be remembered, is discharging if a block-end has been received from the tape. The time scale control is taken from the outputs of the respective units in such a way that the flip flop NEA—NEB changes over once every 3 ms. These change over under control of TA3Fc, TB7c, i.e., at 2.4, 5.4, 7.4 . . . ms. This permits counting of the so-called "filling" pulses which are generated when a block of information comprises less than 16 numbers. These "filling" pulses serve a purpose in the annex control circuits which will be referred to later.

The second position of the number-end counter is the tube NEC, with its gate tube TGEC. The latter is so controlled that with NEB discharging, the gate tube is "opened" to pass a —P pulse on each coincidence of NEB discharging), carriage return received (RA7 discharging) and the P1 pulse occurring. This gate controls the normal number end counting. The second gate controlling TGEC is used for the counting during the production of the "filling" number end pulses mentioned above. This opens every time that NB is discharging, with BE discharging and the time scale at TD1, TA3F, i.e. at 2.4 ms., 5.4 ms. . . . This permits the "filling" pulses to be counted. It will be noted that when these filling pulses are produced they occur at a much more rapid rate than do the "genuine" number end signals.

The third and fourth gates controlling TGEC are used for resetting the discharge in tube NEC from NEC9 to NEC10 under control of the time scale, and in case of NEC10 under control of CCC. NEC also has a reset lead for resetting it to NEC1, the reset being controlled by relay contact csb5 associated with relay CSB (Fig. 35).

Fig. 27 shows the annex feed flip flop C—FC. C is normally discharging, but when information is to be sent to the annex, FC is caused to strike. FC strikes from either carriage return or space on the master pulse. As has been described, this circuit controls the feeding of information to the annex. Tube C is restored at the t4 pulse by the gate circuit whose controls include BERc, t4, PCB9c and PCA4c.

Fig. 28 is the clutch control circuit. The tape machine must start feeding information when the converter start key CSK, Fig. 35, is operated, and should continue to do so until, (a) The block end condition is detected, when the tape must be arrested to allow time for the "make-up" or "filling" number-ends pulses to be generated.

(b) The 16th carriage return from the tape indicates that the last number has been dealt with, and that a block-end signal must be generated.

(c) A "tube full" condition is received from the annex.

In all cases the tape machine must restart if a "tube empty" condition in the annex exists.

The clutch control is by flip-flop pair EDC–DRC. Over lead 61 and rectifiers W100 and W101 tube EDC monitors the "tube empty" lead from the annex. If it detects a tube empty condition when the number end counter is at NEC10 (Fig. 26) or at its usual position of NEA and NEC1, tube EDC (Fig. 28) fires. Therefore tube EDC will be seen that it is normally conducting with relay CIR in its anode circuit operated. The contacts cir1 of relay CIR control the tape machine clutch via the machine switching circuit (Fig. 35) where the converter start control is also located. Thus the tape machine clutch engages and the information flows into the converter.

Under condition (a) above the operation of BE (Fig. 26), the block-end detector, triggers RDC (Fig. 27) via rectifier W53, which extinguishes EDC and releases relay CIR. This causes the tape to be arrested in the third line feed (BE fired after the second line feed).

Under condition (b) the number end counter will have reached the 15th position and will be about to step to the 16th position on the carriage return signal. This via NEBc and NEC8c is caused to trigger RDC, deionising EDC and releasing relay CIR as before. Hence the tape comes to rest in the expected line feed signal which follows.

Under condition (c) the test of the "tube full" lead 61 is made when the number end counter has reached 16, when W102 biasses positively from NEC10c. This covers the case of artificially-generated number-end signals i.e. the filling pulses described above in which case no carriage return would have been received at the 15th position of the number-end counter.

"Tube full" or "tube empty" are indicated by the presence of 50 volts positive on the "tube full" or "tube empty" leads respectively.

Fig. 32 shows the waveforms between converter and computer.

Fig. 29 is the character counter circuit, which counts the number of line feeds received. It is a scale-of-three counting chain of a type fully described in our co-pending application Serial No. 249,848, filed October 5, 1951, in which consecutive pairs of tubes and the pulse source are interconnected by rectifier gates. This chain normally stands with CCC discharging and is caused to step on the P1 pulse. This occurs at 19.5 ms. (TA3Fc, TB5c, TC7c) from the start of the character being dealt with by its converter when BER (Fig. 26) is conducting (i.e. when no block end signal has been received). However, if the received character is not a line feed, the chain remains at, or is restored to, CCC (Fig. 29) firing over the gate circuit controlled from the cathode of LFB (Fig. 25) (fired at 18.9 milliseconds and still firing if the character is not a line feed) over rectifier W55 at TA3Fc, TB9c, TC7c (rectifiers W103, W104 and W105 biassed positively. If the character is a line feed, however, LFA fires at 19.5 milliseconds and disables the W103–W106 gate, so that the chain steps on the P1 pulse.

Fig. 30 shows the flip-flop pair 01—00 and the cathode follower INF which control the supply of information to the annex, and the cathode followers NEF for number end pulses, BEF for block end pulses and MPF for marker pulses.

Fig. 31 shows LFA—LFB, the line feed flip-flop and AL, the alarm tube with the associated pattern check key PCK.

DESIGNATION STAR CIRCUIT (See Fig. 33)

As has been explained, certain numbers are suffixed by one or two designation stars (*) followed by a number. With one star, the numbers 1 to 11 (single character numbers) are used, and with two stars the numbers 0–11 may be used. There are thus 23 possible variants. The circuit of Fig. 33 corresponds to the block 20 of Fig. 1.

With one star, DS1 (Fig. 33) fires on the P1 pulse from RC8 (Fig. 5) of the decoder and extinguishes DS0, which is normally discharging. This prepares gates shown in Figs. 18 and 19 for marking the digit following the "star" into the running total chain in positions 31 to 34. If a second star is received, DS2 fires on the P1 pulse, but does not extinguish DS1. Thus for a second star we have both DS1 and DS2 discharging, and the suffix number is marked in as if it was only a single star (except that 0 is possible) and DS2 discharging marks 1 into S30.

Restoration to DS0, which extinguishes DS1 or DS1 and DS2 is via contact csb5 associated with relay CSB (Fig. 35), by carriage return or by "space."

START S-END CROSS DETECTION CIRCUIT

Fig. 34 (corresponding to block 4 of Fig. 1) shows the "Start S"—"End Cross" detection circuit. Tube SS fires on reception of a start S signal, as detected by the decoder circuit. This it is which fires ND (Figs. 9 and 11) to control the "t" pulse production. Tube PS fires on the end cross ("+") signal which indicated that the information to be supplied has ended. This signal also is detected by the decoder circuit.

MACHINE SWITCHING CIRCUIT (See Fig. 35)

The converter is fed with its information by two tape machines of the type which has already been briefly described, and are also described in British patent specifications Nos. 685,032 and 685,067 alternately, and the converter must control switching between tape machines and must cause the appropriate lamp signals. These tape machines thus constitute a plurality of record positions from any one of which the converter may be supplied.

The general characteristics of the tape machines and boxes have already been indicated briefly. Each box, it will be remembered includes an endless tape which leaves and re-enters the box at two places. When a box is attached to a machine, a recording head is in operative relation with the first place at which the tape leaves and re-enters the box and a reading head at the other place. The tape can be driven independently past the two heads. When the tape is being recorded on, it forms a bight between the heads. There is a risk that the bight between the heads will be pulled taut on reading since the tape is not then passing the other head. Hence when the length of tape between the heads has fallen to a certain amount, the tape taut connection for that box is earthed, operating relay TTA or TTB (see below).

The drive system for moving the tape past the read head is clutched to the tape for driving and declutched therefrom in well-known manner to stop the tape. This uses the appropriate Clutch lead of Fig. 35. The Box Earth leads each extend to a contact closed, in known manner, when a tape box is attached to the machine. The Space and Mark leads, of course come from amplifier fed from the output of the read head.

Control of switching of the input is by a binary flipflop pair TMA—TMB and the relay SWR in the anode circuit of tube TMB.

When the converter start key CSK (Fig. 35) is operated with tape boxes attached to the two tape machines, relay CSA operates and at csa6 operates relay CSB. It is relay CSB which produces the restore conditions which will have been observed in numerous of the circuits already described. This restore condition also fires TMA, which extinguishes TMB if it is discharging. Relay CSA at csa1 (Fig. 34) also applies the positive potential to all the tubes except the pattern chains. Of these it completes the cathode circuits so that they restore to normal.

Relay TRA (Fig. 35) operates from the box earth i.e. lead which is at earth potential when a tape machine has a tape box mounted on it, over csa2 front, swr1 back, tta3 back and winding I of relay TRA, and locks over its winding II via contacts tta4 back, tra4 front, to csa3. At tra3 front the amber light A of tape machine A is caused to light from the box earth. On machine B the green lamp is maintained alight over csa4 front, trb4 back and ttb4 back. Relay TRA at tra1 front extends the clutch control over csa5 to cir1 (Fig. 28).

Therefore tape machine A starts and feeds intelligence to the converter. When it reaches start S, tube SS (Fig. 34) is triggered, which restores tube PS (previously discharging as a result of relay operation of CSB). Feeding of information to the converter continues until end cross is received, when PS re-triggers (as has been described with reference to Fig. 34, which restores SS and triggers TMB when PS biasses W110 positively W111 is already biassed positively from TMA). Relay SWR in the anode circuit of tube TMB is therefore operated by the anode current of TMB and at its contact swr1 (Fig. 35) interrupts the operating circuit of relay TRA. However, relay TRA continues to hold via the locking circuit extending over its winding II. At swr2 box earth from machine B is extended over csa4 front, swr2 front, ttb3 back to winding I of relay TRB which therefore operates. At trb4 the box earth is transferred from the red to the amber light. At trb1, the clutch circuit for machine B is connected to contact cir1 associated with relay CIR (Fig. 28), so the clutch is engaged and machine B drives. Thus both machines drive. When the inner loop of tape on machine A becomes taut, the taut tape alarm springs TTTA operate to apply earth to relay TTA over tra2 front, so that this relay operated and locks to this earth at tta1. At tta3 and tta4 it releases TRA, which at tra1 breaks the clutch circuit for machine A. Over tta2 back, tra3 back and csa2 front the red light on machine A is lit.

When the used box is removed, TTA releases but no lamps light since there is no box earth from A. When a new box is fitted it lights the green light on machine A over csa2 front, tra3 back and tta2 back.

Meanwhile the second tape machine B has been feeding the converter, and when it reaches the end of the recording it also sends "end cross," which triggers PS (Fig. 34) (SS having been fired as usual from its start S signal), which triggers TMA, deionising TMB and releasing relay SWR. Relay TRA again operates when swr1 closes, switches the machine A lamps to amber and engages its clutch while TRB continues to permit tape machine B to drive until it too reaches the tape taut condition and its taut tape springs TTTB close and apply earth to relay TTB. Relay TTB operates and releases TRB. This gives the "red lamp" condition on machine B. Removal of the box releases TTB and all lamps are cut off on machine B. Fitting of the next box restores the green lamp condition.

The tape machine lamp condition may therefore be briefly summarised as follows:

| | |
|---|---|
| Box A loaded on machine A | Green lamp on machine A. |
| Box B loaded on machine B | Machines A and B green. |
| Start key CSK operated | A amber, B green. |
| Converter complete box A and switches to box B | A amber, B amber. |
| Tape taut alarm operates on machine A | A red, B amber. |
| Box A removed and replaced by box C | A green, B amber. |
| Converter completes box B and switches to box C | A amber, B amber. |
| Tape taut alarm operates on machine B | A amber, B red. |

This operation continues until the converter is restrained from switching by the absence of a new box.

HIGH SPEED STORAGE SECTION

It will be recalled that the information which has been converted is to be transmitted over an outgoing signal channel at a very high pulse repetition rate. For this purpose the information is assembled in the high speed storage section which will now be described, being assembled in blocks of 16. This is because the high speed storage devices are mercury delay lines whose capacity is each equal to 16 numbers. For convenience in switching, where a block of related numbers consists of less than 16 numbers it is treated as if it were a full block by the production of filling number-end signals.

Since mercury delay lines are themselves well known, no fully detailed description of their action is necessary, and for such a description reference may be had to a paper entitled "Designs of Mercury Delay Lines" by Sharpless in "Electronics," vol. 20, No. 11 (November 1947) at pages 134–138, and to an article entitled "An Ultrasonic Memory Unit for the EDSAC," by Wilkes and Renwick in "Electronic Engineering," for July 1948, at pages 208–213.

In the equipment to be described next, operations are controlled by trains of identical pulses; any individual pulse is identified only by the number of preceding pulses which have occurred since a certain datum point in time. Thus the first pulse after the datum point may be identified as "1," the second "2," and so on. Thus the clock pulse generator CPG (Fig. 36) drives a multi-stage counter D of well known type. The various units of D each via a cathode follower, supply one of 36 timed pulse outputs D1 to D36, whose use will be described later. The output from D36, via a divide-by-16 circuit, which can be a ring counter of well known type with 16 units, applies a pulse to a pulse former PF which supplies a further timed output pulse MD whose function will also be described later.

It is convenient to divide up the pulses into groups corresponding to the number of positions required for a single number. This it will be remembered, is 35. Since a storage device holding such a single number has a definite cycle time hereinafter designated (a minor cycle) the pulse positions may be identified by reference to the order of their occurrence in the minor cycle. Minor cycles may be identified according to the number thereof which have occurred since the datum point.

The cycle time of one of the high speed storage devices is a major cycle. The number of minor cycles in a major cycle is therefore equal to the number of single numbers that can be held in a single high-speed storage device. Any pulse position in the storage tube can therefore be identified by reference to the pulse occurring at the instant when that pulse position is passing through the input and output circuits of that device, that is by indicating its minor cycle and its position within it.

It will be remembered that in the embodiment of the invention which is herein described, these high speed storage devices are mercury delay lines.

In order to indicate the succession of pulse positions and minor cycles, trains of master pulses are produced which are fed to the appropriate parts of the equipment and as necessary to the high speed storage device and the feeder. These master pulses comprise first of all a series of trains of pulses occurring in the different positions of every minor cycle, these being the outputs from respective units of the counter D, e.g. one train will consist of pulses which all occur in position 1 of successive minor cycles. Such trains are denoted D1, D2, etc. to D36. Since the D36 pulse of each minor cycle indicates the end of that minor cycle it is termed the minor cycle pulse, so that the train of D36 pulses provides what is called a minor cycle pulse. Likewise the last minor cycle pulse of a major cycle is used to provide a major cycle pulse and a train of master pulses is produced which occurs on the last position of each major cycle. It will be seen that the pulse former PF has a control which is energised when D36 is energised; this ensures that the pulse is actually produced at D36 of the 16th minor cycle. PF is preferably a multi-grid valve having one grid controlled by IT and one by D36. This train of major cycle pulses is denoted MDP.

Since each digit is identified by the instant in time within a major or minor cycle when it is in form of an electrical pulse in the circuits of the storage tubes, it is necessary in inserting digits of data into the feeder to cause the digits to be entered only in the appropriate positions in time.

Figures 36 and 37 of which Fig. 37 should be placed to the right of Fig. 36, show the general arrangement of the annex equipment, this apparatus accepting binary digit pulses appearing at terminals 110 of the converter, at what may be varying intervals, and ultimately to apply corresponding pulses, to the output terminals 111. The digit pulses appear in order with the least significant first.

As a first step, however, the pulses are inserted into a feeder with a cyclic time of one minor cycle, before being transferred to the appropriate high speed storage device with a cyclic time of one major cycle. For the purposes of this initial insertion, the input binary digit pulses are applied one at a time to input terminals 112 of a digit insertion and shifting control unit 113. The unit 113 also receives over inputs 114 and 115 timing pulses D35 and D36 from the respective outputs of the counter D by which it is made aware of the incidence in time of the 35th and 36th pulse in each minor cycle, that is the train of pulses D35 and D36 are fed to the unit.

It will be remembered from the preceding description that each digit pulse appearing at terminals 110 from the converter is accompanied by a marking pulse at its terminals 118. Such marking pulses are fed to input terminals 119 of the unit 113. There are in fact 35 digit pulse positions, in each of which there may or may not be a digit pulse present, with accompanying marking pulses for each digit position which are present, and in addition there is an initial marking pulse preceding the first digit pulse, making 36 marking pulses in all.

The digit insertion and shifting control unit 113 is associated in its operation with the feeder unit 120 into which digit pulses are first inserted as described above. The unit 120 consists essentially of a storage device, which in the present case is of the mercury delay tube type, and means for controlling, reshaping and recirculating the pulses in the mercury, and is similar to a conventional storage unit, such as those to which reference has been described in its circuit elements and its construction. However, the length of the column of mercury corresponds only to the length of a minor cycle less one pulse and secondly, the circuits external to the mercury include a delay circuit of a period equal to one pulse unit so that the unit has a total capacity of 36 digits, corresponding to a minor cycle. The last position corresponding to the minor cycle pulse is, however, always blank and serves to separate successive numbers.

In its terminal connections the unit 120 is similar to the other storage units and has input terminals 121, and input gate terminals 122; a control voltage applied to terminals 122 determines whether or not pulses applied to terminals 121 will be inserted in the feeder. Similarly, output terminals 123 are provided with corresponding output gate terminals 124. The electrical path of the pulses is interrupted at the A1 and A2 terminals of 120, and the pulses in the circuit can be cleared by a control voltage applied to the clear gate terminals 127. In passing, it may be noted that while the circulating pulses can be made available at terminals 123 under the control of a voltage at output gate terminals 124, the pulses are continuously available at the A1 and A2 terminals. It will be appreciated that A1 and A2 must be bridged if the pulses are to continue circulating.

With the unit 120, as described above, a one-unit delay can be included as necessary in the circulating path for the pulses, and this is effected by including the delay circuit in the connection between the A1 and A2 terminals. The delay circuit is included in the digit insertion and shifting control unit 113 and the A1 and A2 terminals are accordingly connected respectively to terminals 128 and 129 on that unit, and can be included, or not, between these terminals under the control of the unit 113.

The digit pulses which appear at the terminals 112 of the unit 113 occur in the correct sequence of the binary denominations which they represent, but they are not synchronised with the cycles of operation of the feeder and the high speed storage devices. Therefore the digit insertion unit must accept the first digit pulse and insert a corresponding pulse in the feeder at the appropriate instant of the minor cycle. Then when the second digit is received, it must be inserted in the next position of the minor cycle, and so on.

This is effected in the following way. Each pulse digit is inserted into the feeder at a fixed and predetermined position in the minor cycle; this position can be identified by a timing pulse corresponding to that position. When the digit pulse has been inserted in this position, it is shifted one pulse position, the shifting being accomplished by omitting, for the period of one complete minor cycle, the delay unit of one pulse period which is included in the feeder circuit. The predetermined position in the feeder is now empty, so that when the succeeding digit pulse is received it can be inserted in the same way, and the shifting process repeated, but now both inserted pulses are shifted. This process is repeated for each digit pulse as it is received, all the inserted digits being shifted one position after each insertion. It will be understood that in referring to these digit pulses, if the binary is 0, then the "pulse" will not in fact be present. It is convenient, however, to refer generally either to the pulse, or to a significant absence of a pulse, as a pulse.

The final position of the first digit pulse of any number arriving from the converter is required to be position 1 of the tube, it is initially inserted in such a position that after all succeeding shifts it will appear in the first position of the feeder. The marking pulse accompanying the first digit pulse, and also all those that follow, cause it to shift; so that the first digit pulse is shifted 35 times. The first digit pulse is therefore initially inserted in position 36 of the tube, so that this becomes the fixed predetermined position referred to above. Similarly, the 2nd, 3rd, . . . 35th digit pulses are shifted 34.33 . . . 1 times. It is therefore clear that if all the digits are put in by means of a D36 pulse, they will first of all appear in the 36th position and be shifted respectively to the 35th 34th, 33rd, . . . 1st positions.

The shifting process is started at the same moment as the insertion takes place, that is immediately after D35, while the D36 pulse is in the delay unit, and continue for exactly one minor cycle. This means that when the first digit is inserted a shifting process is carried out, but since the feeder is then empty this does not matter. As will appear later, this makes for rather simpler circuit arrangements.

In describing the manner in which the insertion of a digit pulse is carried out it will be assumed that the feeder is initially empty. When the first digit pulse arrives with its marking pulse, shifting commences at the moment D36; position 1 of the feeder is empty which would make position 36 empty but for the digit pulse which is inserted in this position. Shifting continues until the 36th position has completed its circulation and the digit in it is then shifted forward to the 35th position. The shifting process then ceases and the circulation time is 36 pulse periods thereafter until the next digit appears.

When the second digit pulse with its marking pulse appears, a pulse is inserted in the 36th position; also the digits in the 36th and 35th positions are moved forward to the 35th and 34th positions respectively.

The digit insertion and shifting is repeated for each succeeding digit and its marking pulse until when the 35th digit accompanied by the 36th marking pulse arrives. The digit is inserted in the 36th position and the pulses, including this last, lying in the 2nd, 3rd, . . . 36th positions are shifted to the 1st, 2nd, . . . 35th positions.

It is necessary to indicate in some way when a complete number has been inserted in the feeder tube and in this arrangement a number-end pulse is received from the converter over terminals 130. When a complete number has been received, the number now circulating in the tube of the feeder unit 120 is transferred to one of two high speed storage devices 140 or 150 and the number-end pulse is used to initiate this transfer. The number-end pulse is also used to effect certain further changes which are necessary to prepare the apparatus for its next stage of operation, as will appear hereinafter.

Amongst other things it is necessary to provide means to ensure that when the number-end pulse is received the pulses in the feeder tube are transferred to a high-speed store tube only at the appropriate moment. It will be understood that the pulses in the feeder tube are now correctly positioned for identification in minor cycle, but that the number end pulse may occur at any point within a major cycle.

It is necessary to arrange also that digit pulses are not fed to the feeder until the last pulse has been transferred to the high speed store tube. These two objects are attained by means of a supervisory transfer control unit 131, to terminal 132 of which the number-end pulses are applied from terminal 130.

The units 140 and 150, which have a cyclic time of one major cycle, are identical and have the same general arrangement as unit 120; thus the units have respectively input terminals 141, 151; output terminals 142, 152; A1 and A2 terminals; input gate terminals 145, 155; output gate terminals 146, 156 and clear gate terminals 147, 157.

The A2 terminals of the feeder unit 120 are connected directly to the input terminals of both storage devices 140 and 150 and the output terminals of those units are fed through a junction unit 160, to the input terminal 121 of the feeder unit.

Junction unit 160 is one of several such units employed in the apparatus, which are devices by which positive voltages from two (or more) sources can be fed to a common output without interaction of one source on the other. They can also be referred to as mixing gates. Rectifiers or thermionic tubes can be used for this purpose.

The transfer of pulses from the feeder to the high speed storage devices is determined by the control voltages which are applied to the various gate terminals, and these control voltages are in part determined by the transfer control unit 131. For this purpose a positive-going control voltage is generated by the unit 131, and is fed from terminals 133 of the unit to the input gate terminals 122 of the feeder unit 120, and through a phase inverting device 134 to the clear gate terminals 127. This transfer control voltage is identified as WT+.

The control of the gates 145, 146 and 147 and 155, 156 and 157 of the two units 140 and 150 is conditioned on the availability of the mercury delay lines 00, and the control voltage is therefore applied to two gate units 161, 162 before it is passed respectively to the input gate terminals 145 and 155 and output gate terminals 146 and 156. These same control voltages are applied respectively through junction units 163, 164 and phase inverting devices 165 and 166 to the clear gate terminals 147 and 157.

The transfer control unit 131 must receive a timing pulse input, that from D36, and the major cycle pulses MDP are applied to terminals 135 of the unit. To ensure that the transfer control unit 131 does not operate until the digit insertion unit 113 has dealt with the last digit pulse, a suppression control voltage WS— is transmitted from terminal 136 of unit 113 to terminal 137 of unit 131.

On receipt of a number-end pulse at terminal 130 signifying that a complete number has been sent from the converter, the transfer control unit is arranged to:

(i) Wait until the last shifting operation by the unit 113 is completed in the feeder unit 120.

(ii) Emit the positive control voltage WT+ to the input gate terminals 145 or 155 of the appropriate storage unit 140 or 150 to admit the pulses from the A2 terminals of the feeder unit.

(iii) Emit a positive control voltage WT+ to the input gate terminals 22 of the feeder unit to admit the contents of the feeder during transfer.

(iv) Emit a negative control voltage WT— to the appropriate clear gate terminals 147 or 157 of storage devices 140, 150 to close the clear gate and prevent internal circulation of the pulses.

(v) Emit a negative control voltage WT— to the clear gate terminals 127 to close the clear gate of the feeder for the same reason.

All these control voltages must last exactly one major cycle and are started and stopped by major cycle pulses MDP which are applied to terminals 135 of unit 131.

In this way, when 36 marking pulses have been transmitted to terminals 118, the converter sends the number-end pulse which is received by the transfer control unit at terminals 132. At the appropriate moment in the major cycle the feeder and one of the two high speed storage devices are connected in series for 16 minor cycles, after which they are disconnected and the pulses circulate independently again.

Whilst the feeder and a high speed storage device are connected in series, the circulation time in the combined circuit is 17 minor cycles.

The tube in the high speed storage device may be regarded as having 16 compartments each of which is capable of storing the contents of the feeder tube and each of which corresponds in time to a minor cycle. When the two tubes are connected in series for 16 minor cycles, it follows that all the pulses will advance through the length of 16 compartments in the circulation path. Hence the contents of the feeder tube are transferred to the 16th compartment and the feeder tube will contain any pulses which at the beginning of the period of the series connection were in the first compartment of the high speed storage device. As this compartment was initially empty, when the series connection is broken the feeder tube will be empty, so that it is not necessary to provide any specific means for emptying the feeder tube.

When the feeder is again filled it is again connected in series with the same high speed storage tube at the instant of time MDP; at that instant the one set of pulses which have been inserted will occupy the 16th compartment of the high speed storage tube. The circulation time is again increased to 17 minor cycles so that 16 minor cycles later the pulses which were in the 16th compartment will now occupy the 15th compartment. As before the contents of the feeder will occupy at that instant the 16th compartment and the feeder will be empty. In this way, at each operation the contents of the compartments are advanced one position until after 16 insertions the high speed storage device is completely filled.

Mention has been made of two conditions which must exist when pulses are transferred from the feeder to the high speed storage device unit, but there are also certain other requirements which must be met if the system is to function correctly, as follows:

(i) Means must be provided to determine whether there is an empty high speed storage tube available, and if both are full, to indicate that fact to the converter. This is the "Tube Full" Control.

(ii) If there is an empty high speed storage tube available the necessary gate circuits must be prepared to connect it to the feeder.

(iii) If a block end pulse is transmitted from the converter to indicate that 16 numbers have been emitted, that fact must be recorded until the last number has been cleared into the high speed storage tube.

(iv) When the information has been transmitted from a high speed storage device to the output channel, the pulse trains representing this information still continue in the high speed storage device, and must be erased before further information is inserted from the feeder.

These various functions are carried out by a unit 170 which may be approximately described as a change-over control unit. This unit receives major cycle MD pulses and addition block end pulses which appear at terminals 72 from the converter after every 16 number-end pulses. The changeover control unit also receives an "availability test" signal which appears at terminals 174 of the output circuit and is applied to terminals 175 of the control unit. The availability test signal is one which is generated in the output circuit, as will be described later.

If the response to the test signal indicates that the channel including the circuitry of Figs. 36 and 37 is unready to pass information, there appears at terminals 176 of the changeover control unit an unreadiness pulse $D_q$ which is transmitted to the terminals 177.

When the high speed storage device tube is full, which is apparent to the change-over control unit by the reception of the block end pulse over terminals 172, a readiness signal in response to the test signal appears at terminals 178 and is transmitted to terminals 179 of the output circuit. When the channel is available for use an appropriate signal is sent to terminals 180 and therefrom to terminal 181 of the unit 170; this initiates the transfer of the contents of the storage tube. This signal can be identified as $C_h$.

Transfer of the contents of the two high speed storage devices is controlled by two gates 184 and 185, the inputs of which are connected to the A1 and A2 circuits of the respective units 140 and 150, so that the tube contents are continuously present at the input of the gates. The gate outputs after passing through a junction unit 186, are fed to the terminals 111 of the transfer unit of the output circuit. The particular voltage $Ch$ referred to above is a positive-going waveform appearing at terminal 180 and applied to the two gates 184 and 185 which are, however, under the control also of the changeover control unit 170. Two controlling voltages WC+ and WC— appear respectively at terminals 189 and 188 of the changeover control unit 170 and are fed respectively to the gates 184 and 185. Voltages WC+ and WC— exist continuously, but differentially operated in the sense that when one is positive the other is negative and vice versa, so that the appropriate filled high speed storage tube can be discharged, but not the unfilled tube.

The change-over control unit also ensures the content of the appropriate high-speed storage device tube when its contents have been sent to the output circuit. For this purpose an erasing control voltage WE1 or WE2 is caused to appear at terminals 191 or 192, depending on the particular one of the units 140 or 150 of which the contents have been transferred and the voltage is applied through one or the other of junction units 163 or 164 to the clear gate of the relevant high speed storage device.

The changeover control unit 170 must also effect the necessary changeover of the connection between the feeder and each of the high speed storage devices 140 and 150 when a block end pulse is received, the block end pulse giving the indication that the changeover is to be made from one high speed storage device to the other.

The changeover is effected by means of control voltages WC+ and WC— which are produced at terminals 193 and 194 (in addition to terminal 189 and 188) of the changeover control unit and are applied respectively to the gates 162 and 161 to operate these differentially.

Although the changeover does not occur until the high speed storage device connected via 111 to the output circuit has been completely emptied, it must not actually take place unless and until a block end pulse is received from the converter. Assuming that the tube has been emptied, the changeover does not occur immediately the block end pulse is received, but up to two major cycles later, for the block end pulse coincides with the last of the 16 number-end pulses and a major cycle is required to clear the last number from the feeder tube into one of the high speed storage devices. It is immediately after the end of this major cycle that the block end pulse becomes effective, in conjunction with the tube empty signal, to cause the changeover.

As mentioned above, one of the functions of the changeover control unit is to indicate to the converter whether or not there will be a high speed storage device available for the converter to fill, when the tube being filled is full. For this purpose there is caused to appear at in terminals 196, 195 of the changeover control unit voltages indicating respectively a "tube empty" or "tube full" condition, these voltages being applied respectively to the terminals 198 and 197 of the converter. The effect of these signals on the converter has already been covered in the description of the converter.

The foregoing is intended to give a broad indication of the general arrangement of the high speed storage device and there will now be described in somewhat more detail the arrangement of the component units.

Firstly, Figure 38 shows the block schematic diagram of a delay storage unit, such as unit 120. Such a unit comprises a mercury delay tube 220, with piezo-electric elements 221 and 222, one at each end. The output pulses from the element 221 are passed in succession through amplifier 223, pulse shaper 224, gating circuit 225 to which clock pulses are applied, and finally in parallel to both the output gate 226 and the A1 terminal. If the A1—A2 link is made, the pulses pass from the A2 terminal through the clear gate 227 and modulator 228, which controls the output of the oscillator 229. Pulses from the input gate 230 are also applied to the modulator 228. In Figure 38 the references to terminals are the corresponding references of the terminals of the unit 120 of Figure 1. Storage units 120, 140 and 150 are identical except that unit 120 is associated with a shorter delay tube than 140 and 150.

Figures 40–45 shows in rather more detail than Figures 36–37 the arrangement of the digit inserting and shifting control unit 113, the transfer control unit 131 and the changeover control unit 170, and some of the associated gate circuits. Corresponding elements of Figures 36–37 and 40–45 bear the same reference numbers. Figs. 40 ... 45 should be arranged as indicated at the bottom of Fig. 40.

Before proceeding to describe the circuit of Figures 40–45 in more detail it is convenient first to refer to certain circuit devices or elements which are repeatedly employed. One such device is a gate circuit or, for brevity, a gate similar to the gates 161, 162, 184 and 185 of Figure 1. Several varieties of gates have already been described, in an article in the "Electronic Engineering" article quoted above, at page 211. Briefly a gate is a device having a series of inputs and a single output, an output is produced only when all the inputs are made simultaneously positive. Accordingly there will be a positive output from a gate only for the duration of that input which has the shortest duration. In the drawing the convention is adopted that the signal path for the input (or inputs) of shortest duration is denoted by horizontal lines to the block representing the gate, while the remaining inputs are drawn vertically.

A second device used in the arrangement described is a symmetrical bistable multivibrator circuit. Such a circuit has two stable current conditions, and can be caused to change from one to the other of the two conditions by the application of a positive triggering pulse to one of two control inputs. A circuit which has been found suitable is shown in Figure 39. This comprises two valves V1, V2, cross-coupled by capacitative couplings DC1, DC2. The valves have cathode resistors R50, R51 and can be triggered by positive-going control pulses at terminals T1, T2 applied through cathode-follower stages CFV1, CFV2 to the cathodes of the two valves; the outputs from the valves are also derived from the cathodes through cathode-follower stages CFO1, CFO2 and are fed to terminals marked output 2 and output 1 respectively. The circuit operates on now well known principles, to the effect that when a positive-going pulse is applied to the terminal T1 a positive voltage appears at output terminal 1 and a very low or zero voltages at 2. When a positive-going pulse is applied to terminal T2 the potentials at the output terminals are reversed.

A bistable multivibrator is sometimes referred to as a flip-flop and in this specification this name will be used for the units such as are shown in Figure 39.

The principal use of the flip-flop circuit in the arrangement of Figures 40–45 is as a means to provide an indication, which can be sustained indefinitely, of a voltage change of very brief duration, such as a pulse. The indication can nevertheless, be cancelled substantially instantaneously when it has served its purpose. The gas tube flip-flop in the circuits already described serve the same purpose.

Turning now to Figures 40–45, the operation of inserting a digit in the feeder tube in unit 120 is initiated by a marking pulse applied to terminals 119 from the converter, and the marking pulse has to cause a pulse (using "pulse" in the general sense referred to above), in accordance with a digit pulse at terminals 112, to occur at an instant D36 in the minor cycle of the feeder tube. The marking pulse is relatively long in duration, being about 30 microseconds, and it may start at any instant of time. The marking pulse, after passing through a gate G1 is therefore applied to one input of a flip-flop stage FF1. In Figures 40–45 the various flip-flops employed and hereinafter referred to are shown as having four terminals S, R, + and —. Terminals S and R correspond to input terminals T1 and T2 respectively of Figure 39 and terminals + and — correspond respectively to output terminals 1 and 11, so that a positive input to the S terminal brings the flip-flop to the "set" condition with the + terminal positive.

All the flip-flops of Figures 40–45 except where specifically stated to the contrary, are assumed to be initially in a "re-set" condition in which this output polarity is reversed, brought about by a positive pulse having been applied to the "re-set" terminal R.

The marking pulse thus makes positive the + terminal of flip-flop FF1 and this positive potential is applied to an input of a gate 162 (Fig. 41) which also receives from terminals 114 D35 pulses in each minor cycle. As a result, when the next D35 pulse appears, it will pass through the now open gate G2. The emergent pulse is used to reset the flip-flop FF1, and is therefore applied to the R terminal of that flip-flop, but in order that the flip-flop shall not be reset during the existence of the D35 pulse, which would cause that pulse to be mutilated, the pulse is passed through a delay circuit DS1, producing one pulse length's delay, included in the path to the R terminal of the flip-flop.

It is possible that the marking pulse might occur just at the beginning of the D35 pulse, and might thereby set the flip-flop FF1 and open the gate G2 during the D35 pulse, which would again result in a mutilated pulse.

To avoid this, operation of the flip-flop FF1 during the D34 or D35 pulse periods is prevented by applying these pulses to the gate G1. These are used to provide what is known as an inhibitory input for this gate, that is, the gate G1 is open when neither D34 nor D35 is present and closed if either is present. If the marking pulse starts during pulses D34 or D35, the flip-flop will *not* be triggered at the beginning of the marking pulse but some time after D35; it will then be the succeeding D35 pulse which will be transmitted through the gate G2.

The D35 pulse emerging from gate G2 is caused to set a second flip-flop FF2. There will be a positive-going potential change at terminal + of this flip-flop, occurring at instant D35 of a minor cycle, and this is passed through a delay circuit DS2 (Fig. 42) of one pulse length's delay so that the potential change is delayed to an instant approximately half way between D35 and D36 pulses. This delay positive-going potential is fed back to a gate G3 (Fig. 41) to which are applied also the D35 pulses from terminal 14. The positive potential of the + terminal of the flip-flop FF2 persists; hence the delay positive potential continues to be applied to gate G3 to keep it open, so that the next D35 pulse passes through that gate. The D35 pulse which thus passes through the gate is applied to the R terminal of the flip-flop FF2, to reset it and to make the + terminal fall negatively in potential.

This negative-going change is also delayed by the delay unit DS2; it will be seen therefore that the flip-flop FF2 is set for exactly one minor cycle, beginning and ending in approximately the D35 pulses and the resultant voltage change is delayed by the delay unit DS2 by one pulse length to half way between D35 and D36. At the terminal − of the flip-flop FF2 there will similarly appear a negative-going pulse, one minor cycle long, and beginning at instant D35. This pulse is used as the suppression voltage and is fed to the suppression terminal 136 of the digit insertion unit 120 to be fed to terminal 137 of the transfer control unit.

The pulse, one minor cycle long, thus produced at the output of the delay unit DS2 in response to the occurrence of the marking pulse, is used as a control voltage firstly to shorten the circulation time of the feeder by one pulse period, as described above, and secondly to permit the insertion on the feeder of a D36 pulse of a digit pulse, signifying the binary digit 1, appears at terminals 112.

The positive-going voltage is therefore applied to a gate G3 and through a polarity-inverting device P11 to a gate G4; gates G3 and G4 are thus differentially operated. The two gates are both connected to terminals 128 of the digit insertion unit, which is connected to the A1 terminals of the feeder, and thus offer alternative path for any pulses which are in the feeder tube. It will be assumed however that the tube is in its initial condition and contains no pulses.

In this initial condition, before the positive-going voltage is applied to gate G3, gate G3 is closed, but gate G4 is open, due to the positive control voltage applied to it from the polarity-inverting device P11. Consequently, in the absence of a marking pulse at terminals 119, the circulation path of the feeder is through gate G4, through a delay unit DS3 producing a delay of one pulse period (i.e. about 2 microseconds), a further gate G5 and a junction unit JU1 to terminals 129 and thence to the A2 terminals of the feeder.

The delay circuit DS3 is the delay unit described above which is normally included in the circulation path of the feeder and makes up the normal cycle time of the feeder to the period of a minor cycle.

The gate circuit G5 receives clock pulses at every pulse instant and is thereby opened at each pulse interval to check the timing of the pulses.

The positive-going voltage applied to gate G3 in the presence of a marking pulse opens that gate, and simultaneously the gate G4 closes, the circulation path of the feeder being then completed through the junction unit JU1 to terminals 129 and thence to the A2 terminals of the feeder as before. The circulation path does not now include the delay unit DS3, so that for one minor cycle the circulation time of the contents of the feeder tube is 35 pulse periods.

If the binary digit which is to be inserted in the high speed storage device is 1 and not 0, a digit pulse of relatively long duration, about 120 microseconds, appears at terminals 112 and this pulse will be in existence at that instant D36 at which the positive-going voltage pulse appears at the output of the delay unit DS2. In order to select this one D36 pulse for insertion in the feeder, the digit pulse at terminals 112 is accordingly applied to a gate G6, to which is applied also the positive-going voltage pulse from delay unit DS2; D36 pulses are fed to the gate and the one pulse will be transmitted whilst the two control voltages are co-existent, as desired. If there is no digit pulse it will be seen that the gate G6 will not open and no D36 pulse will be transmitted. The D36 pulse, if present, is thus transmitted to the junction unit JU1 and is inserted in the feeder tube in the 36th position of the feeder. Since the circulation time of the feeder is only 35 pulse periods during the minor cycle ensuing from the moment of insertion at the end of this minor cycle, the inserted pulse short circuits the one pulse delay DS3 and so moves forward to the 35th position.

When the next digit pulse with its accompanying marking pulse is received, the operation repeats precisely as described above.

Assuming that there is now one pulse, representing a digit circulating in the feeder, this will occupy position 35 and if then a further pulse is inserted, due to a next succeeding digit 1, this will be inserted in position 36. When the delay circuit is removed, the pulses in both positions 35 and 36 will be advanced in time and will become 34 and 35 pulses. In this way, on each insertion of a digit, the preceding digits (or blank spaces), and the one inserted, are all advanced one pulse position, so that on the insertion of the 35 digits of the number the first inserted is finally shifted to the 1st position; 35 and not 36 digits are used for electrical reasons.

When the 36th marking pulse is applied to terminals 119, a number-end pulse is produced by the converter and is applied to terminals 130 of the transfer control unit, and this number-end pulse is employed to initiate the transfer of the contents of the feeder tube to one of the two high speed storage devices.

The units used for this are somewhat similar to the units used in the first part of the digit insertion unit, so the circuit can be described more briefly. The number-end pulse passes through a gate G7 which is closed by a suppression pulse, lasting from D35 to D1 approximately and applied to terminals 181, and the number-end pulse is store on a flip-flop FF3. The positive output voltage of the flip-flop + terminal is applied to gate G8 (Fig. 41) and thereby allows the next major cycle pulse MDP applied to terminal 135 to pass. Gate G8 is, however, prevented from opening during the insertion of a digit in the feeder tube which might result in the loss or mutilation of a digit by being controlled also by the negative output of flip-flop FF2, applied to terminal 137.

The MDP pulse passing gate G8 sets flip-flop FF4 and resets flip-flop FF3 through delay unit DS4. When the flip-flop FF4 is set, its positive waveform is applied through delay unit DS4, of one pulse length's delay, to gate G9 and the output therefrom permits the next MDP pulse to reset flip-flop FF4. The output of the flip-flop FF4 will therefore be a pulse having a length of one major cycle; this is the control voltage WT+ of Figs. 36–37. As described with reference to Figs. 36–37, the voltage WT+ is applied to the two gates 161 and 162 of which one only will be open, under the control of the changeover control unit. As described with reference to Figures 36–37, the WC+ voltage opens the appropriate loader input and the pulses are transferred from terminals 129 to the high speed storage devices.

It is now necessary to consider the operation by which the changeover of the two high speed storage devices is effected by the changeover control unit and the manner in which the contents of the filled high speed storage tube are transferred to the output circuit. It is also necessary to point out the means whereby the feeding of digit pulses from the converter is prevented until high speed storage devices has been emptied of digit pulses introduced previously.

The changeover control circuit makes use of a number of flip-flops which bear references FF5, FF6, FF7, FF8 and FF9. Flip-flop FF5 is used to give a sustained indication of a block end pulse, in the same way that flip-flop FF1 is a sustained indication of a marking pulse; flip-flop FF6 is used for producing the changeover voltage which is applied to the gates 161, 162 and 184, 185 in the input and outputs of the two high speed storage devices. Flip-flop FF7 is used as a sustained indication of the availability of one or the other of the two high speed storage devices. Flip-flop FF8 is used as a sustained indication of an affirmative answer given to a test signal from the converter, and Flip-flop FF9 is used to generate the control voltages which are necessary for clearing a high speed storage device once the information therein has been emitted.

It may not be readily apparent how the flip-flop FF7 having but two states of stability, can be used to indicate all the possible conditions which can arise with two high speed storage devices. There are, of course, four possible conditions which can arise namely (i) Both tubes empty
(ii) One tube being filled, one empty
(iii) One tube full, one tube being filled
(iv) Both tubes filled Both the converter and the output circuit require to "know" the condition of the two tubes. The converter must be given a prior warning of the fact that at the end of the series of numbers being inserted in the tube it will have to stop transmitting further numbers as there will be no place in the high speed storage devices in which to store them. It follows that conditions (i) and (ii) above are the only ones during which the converter can be permitted to continue operating, and that when condition (iii) is reached the converter must be stopped at the end of the next series or "block" of numbers.

The output circuit requires to know only that there is one high speed storage device which has been completely filled and is available for its contents to be transferred thereto. Conditions (iii) and (iv) are the two in which this is so, and thus it follows that the desired indication of the availability or readiness of the high speed storage device, so far as it concerns the output circuit and the converter, can be given by a flip-flop of which one state indicates conditions (i) and (ii) above, and the other state indicates either conditions (iii) or (iv). The fact that one indication is used for both one tube full and two full tubes full does not result in any loss of the identity of the information, since it can be arranged that the first tube to be filled must be the first tube to have its contents transferred to the output circuit as will appear hereinafter. It is convenient to indicate the two conditions of flip-flop FF7 as the conditions "Tube empty" (i) and (ii) and "Tube full" (iii) and (iv).

It will be assumed initially that all flip-flops are reset except FF7, which indicates that there is one tube full and whose contents are ready to be emitted, and the necessary changes made to prepare for the connection of the feeder tube to the other high speed storage device.

Dealing first with the transfer of the contents of the full high speed storage device to the output circuit, this is conditional upon the latter being ready to accept the data, i.e. upon the output channel being vacant.

When this is the case, the output circuit emits a voltage which can be identified as voltage $C_t$, beginning at a time D35 in a minor cycle and persisting until it is answered by an "end pulse" signal.

The voltage $C_t$ appears at terminals 175 and is applied to two gates G10 and G11 via a pulse length delay circuit DS5, these two gates are also connected respectively to the + and − terminals of the flip-flop FF7 and both receive D36 pulses. If there is a full high speed storage device available (as is assumed to be the case since flip-flop FF7 is set) pulses at intervals D36 will pass through gate F10 and will be applied from readiness terminals 178 of the high speed storage device to terminals 179 of the output circuit. If, on the other hand there were no high speed storage device available, gate G10 would be closed and gate G11 open, and the D36 pulse would be transmitted as the $D_q$ signal from terminals 176 of the device to terminals 177 of the output circuit. At the output circuit the $D_q$ signal causes the test signal $C_t$ to terminate; to prevent the end of the $C_t$ signal being so rapid as to multilate the $D_q$ signal. The delay circuit DS5 is included in the path for the $C_t$ control voltage.

The fact that a test signal has been received from the output circuit and an affirmative answer given is continuously indicated by a change of the flip-flop FF8 to the set condition, this being effected by the D36 pulses from the gate F10 being applied to the S terminal of the flip-flop.

Flip-flop FF8 has two major functions in that the positive voltage appearing at its + terminal is applied to the two gates 184 and 185, so that the opening of either of these two gates, and hence the transfer of the contents of one of the high speed storage devices to the output circuit is made conditional on the fact that the storage device has been subject to a successful availability test and secondly the same positive output (from FF8) is applied via delay DS6 to a gate G12 to control the setting of the clearing flip-flop FF9.

The circuit is now ready for the transfer and since the availability signal has been emitted via terminal 178, the output circuit will emit the signal to effect the transfer. This is the $C_h$ control voltage of Figures 36–37 appearing at terminal 180, and which is applied to terminals 181 of the changeover control unit. The $C_h$ voltage is applied to the two gates 184 and 185 via lead 200 and the contents of the tube 150 for instance are transferred via terminal 144 to the output circuit.

At the end of the transfer it is necessary to reset the flip-flop FF8 which is still recording the affirmative answer to the test signal and to clear from the high speed storage device 150 the information which has been sent therefrom. The information is still circulating in this tube for the reason that the output is obtained from the A1, A2 terminals. The clearing voltage WE is obtained from the flip-flop FF9 and the setting of the flip-flop and the cancellation of the affirmative answer is controlled by four input voltages to the gate G12; these voltages are respectively the output of the flip-flop FF8, as described above, MD pulses from terminal 172 and the $C_h$ voltage from terminal 181.

The gate G12 will, therefore, emit a pulse at time MDP during the $C_h$ waveform and this is applied to the reset terminal of flip-flop FF8 which is thereby reset. The + terminal of the flip-flop falls negatively in potential and the gates 184 and 185 controlled by this potential close. The same potential is applied through delay circuit DS6 (to prevent the MDP pulse being mutilated) to the gate G12, which is therefore closed.

The flip-flop FF9 is also set by the MDP pulse during the $C_h$ voltage; the flip-flop is reset one major cycle later by its own output voltages, which is applied via a delay circuit DS7 on one pulse length's delay and gate circuit G13, to its own R terminal, MDP pulses being applied also to the gate G13.

The output voltage of the flip-flop FF9 is applied to two gates G14 and G15 which are differentially operated from the changeover flip-flop FF6. The output voltage from flip-flop FF9 will emerge from one or other of these gates in accordance with the control voltage WE1 or WD2 referred to in connection with Figs. 36–37. With flip-flop FF6 reset as described G15 is opened, and accordingly a clearing voltage is applied to the clear gate of tube 150, as described with reference to Figs. 36–37.

The MDP pulse which is used to reset flip-flop FF9 is also transmitted to terminal ED, to be fed to the output circuit, as an end pulse, indicating that the transmission has been carried out. This same MDP pulse resets flip-flop FF9 is also used to reset flip-flop FF7 the tube-empty tube-full flip-flop. The flip-flop FF7 was assumed initially to be set, representing the condition that one tube was full. When this MDP pulse occurs, however, the contents of the full tube will have been omitted and the tube will have been cleared, and the flip-flop is therefore reset to the condition indicating "tube empty."

The converter must be given a continuous indication of the availability of the storage tube, in order that it will cease to emit digit and marking pulses when the digit insertion unit is unable to accept them further, and the + and − terminals of the flip-flop FF7 provide such an indication. These terminals are, therefore, connected to terminals 195, 196 for this purpose as described with reference to Figs. 36–37.

So far, the operation has been described whereby the feeder tube is filled and the information transferred in turn to the high speed storage device and to the output circuit. In general, however, as soon as the information has been transferred from the feeder to the first high speed storage device the feeder tube can be refilled and its contents transferred to the second high speed storage device, if that tube is empty, irrespective of what is happening to the information in the first tube. So long as digits continue to be emitted by the converter the operation will continue until both tubes are full and are waiting for their contents to be dealt with. The next stage in the operation to be considered will, therefore, be the changeover by which the second tube is made ready to receive the contents of the feeder tube.

The changeover is effected by the output voltage of the flip-flop FF6 and the changeover is initiated by a block end pulse applied to terminals 172, the changeover being conditional upon the flip-flop FF7 being in the reset condition to indicate the "tube empty" condition.

When a block end pulse appears at terminals 173, it is stored by means of the flip-flop FF5, the pulse being passed through a gate G16 which is closed by the same suppression pulse, occurring about the end of each minor cycle, as closed gate G7 (Fig. 45), to avoid possible mutilation of the pulses. The block end pulse is applied to the S terminal of the flip-flop FF5 and thereby sets it. The block end must be stored in this way for the reason that the block end pulse is emitted simultaneously with the last of 16 number-end pulses, but the changeover must be delayed for up to two major cycles to ensure the last transfer from the feeder to the high speed storage tube has been completed.

The positive output voltages at the + terminal of flip-flop FF5 is therefore applied to a gate G17 which receives in addition, the output from the − terminal of the flip-flop FF4 in the transfer control unit, MDP pulses and a voltage from the − terminal of the flip-flop FF7. The MDP pulses are however delayed by delay unit DS9 of one pulse lengths delay, and the voltage from flip-flop FF7 is delayed by delay unit DS10 of one pulse period delay.

The gate G17 will open only when these various voltages are simultaneously positive. When the block end pulse and the last number-end pulse arrive flip-flops FF3 and FF5 are set at the same time; as explained above this cannot be coincident with an MDP pulse on account of the suppression at gates G16 and G7. The next following major cycle pulse will pass gate F8, setting flip-flop FF4 whose terminal is connected to gate G17, which therefore closes. Owing to delay unit DS9 this MDP pulse thus arrives at gate G17 too late to pass through. Since the next succeeding MDP pulse resets the flip-flop FF4 through gate F9, the terminal becomes positive and gate G17 is opened provided FF7 is in the reset condition, i.e. indicating "tube empty."

When gate G17 opens, an MDP pulse (delayed by a pulse length period) passes through the gate and this pulse is applied through a delay circuit DS11 to the R terminal of flip-flop FF5 to reset it, and the pulse is also applied to two gates G18 and G19 differentially operated. The gates G18 and G19 control, and are controlled by, the setting and resetting of flip-flop FF6, whereby on the application of successive pulses from gate G17, the flip flop is alternately set and reset. To this end, gate G18 is included in the connection to the S terminal of the flip-flop, and gate G19 is included in the connection to the R terminal; gate G18 is controlled through delay circuit DS12, from the − terminal of the flip-flop and gate G19 is controlled through delay circuit DS13 from the + terminal. It was assumed that flip-flop FF6 was initially reset so that gate F18 is open. The MDP pulse passing through gate G17 therefore passes gate G18 and sets the flip-flop FF6.

The flip-flop FF6 controls the three pairs of gates which effect the changeover of the two high speed storage devices, these pairs are gates 161 and 162, which determine to which storage tube the transfer voltage WT+ is applied from the transfer control unit, gates 184 and 185, which determine from which tube the information is transferred, and gates G14 and G15 which determine to which tube the clearing voltage is applied. These pairs of gates are differentially operated, gates 161, 185 and G15 being connected to the − terminal of the flip-flop FF6 and the three other gates 162, 184 and G14 being connected to the + terminal of the flip-flop.

It is to be noted that while the unit 160 is being filled from the feeder tube 120, the tube 150 cannot then be connected also to take input from the feeder tube, but the contents of the tube 150 can be transferred to the output circuit whilst the other tube is filled.

The operation of the inlet arrangement will continue as described above, information being taken from a full high speed storage device into the output circuit as the latter requires it, and the converter continuing to insert information as it becomes available, and so long as it receives the indication that there is one tube empty and ready to receive the information.

There is, however, one condition which may be specially referred to; this is the condition where the converter has been stopped by a persistent "tube full" indication, and when the converter input is restarted after the output circuit has taken the contents of one tube and the tube has been cleared.

In the tube full condition flip-flop FF7 is set; the block end pulse will have been received and stored on flip-flop FF5 which is accordingly set and will so remain until the changeover of the tubes is effected; but changeover is inhibited by the absence of WF− voltage at gate G17 from flip-flop FF7 via the delay DS10. When the output circuit accepts the input of one tube, and the contents of that tube have been cleared, there is a major cycle pulse MDP transmitted through gate G13 which resets flip-flop FF7. As a result the WF− voltage which appears at the − terminal of flip-flop FF7 and will at this instant be positive-going, is applied to the gate G17. Ignoring for the moment the delay circuit DS10 this would mean that the same MDP pulse which rests flip-flop FF7 would, after being delayed by about 1 microsecond due to delay DS9, pass through gate F17 and, after a further delay of 1 microsecond due to delay DS11, set flip-flop FF7 again, flip-flop FF7 would, therefore, be reset and again set within a period of approximately 2 microseconds. The output of flip-flop FF7 is, however, the means by which the tube empty signal is produced for controlling the operation of the converter, and the converter may not satisfactorily respond to such a short signal. By including delay circuit DS10, however, the one MDP pulse passes the gates G17 and G13 as before, but the positive-going voltage at the − terminal of flip-flop FF7 is delayed at gate G17 until the originating MDP pulse has ceased. Flip-flop FF7, is therefore reset for a full major cycle, which is a sufficiently long indication to the converter to allow it to start up.

There is one further point which may be mentioned. In the description of the operation of the circuit with reference to Figure 39 of the drawings it was assumed that the flip-flop FF7 was initially set to indicate that a high speed storage device was full. In switching on the apparatus, however, this flip-flop must be made to assume the tube full condition until the output circuit is ready, which can be done by any known reset means. Several such arrangements are shown in the earlier circuits. This ensures that the flip-flop FF7 then changes to the "tube empty" condition so that digit pulses may be received from the converter.

OUTPUT CIRCUIT
(Fig. 46)

It will be assumed that in the system being described the equipment so far described is one of three parallelled equipments which share a common output channel OC, Fig. 46. The terminals 111 of the circuit just described, the so-called "annex circuit," for each equipment is connected to the channel OC via a junction unit JU2. Fig. 46 shows only the terminal 111 for one equipment. JU2 preferably includes an amplifier.

To enable the equipment to use the channel OC,, the latter is successively "offered" to all equipments. For this purpose a counter CC is provided. This can conveniently be a high speed scale of three counter-of-well-known type, for instance, a set of interconnected bistable flip-flops, are per equipment, which are so controlled that only one at a time can be changed to its set state. The reset lead shown ensures that upon being switched on the counter is set to CC1, the position for the first equipment.

For each channel there is provided a set of equipment such as gates G20, and G21, and flip-flops FF10 and FF11 while junction unit JU3 is common. The latter has six inputs, two from each equipment.

The operation will now be described for the first equipment. When CC reaches position No. 1 which is the position for the first equipment, the positive output of CC1 is energised. On the next MDP with D36, the gate G20 delivers an output which is applied to the set terminal of FF10, which thereupon assumes its positive state. The output from G20 is also applied to terminal 175, forming the $C_t 1$ waveform which has already been mentioned. This, it will be recalled, is the availability test signal.

If the annex circuit is unready, the D2 signal is received therefrom via terminal 176, and via JU3 applies a pulse to the counter CC, which thereupon steps to CC2. At the same time $D_q$ resets FF10 via a junction unit JU4. The apparatus in Fig. 46 now tests the second equipment.

If the annex circuit was ready when tested, it returned a readiness signal over terminal 178. This, with the + output from FF10 causes gate G21 to deliver an output, which is applied to the S terminal of a flip-flop FF11. This latter thereupon assumes its set state in which the positive terminal is energised. The output from this terminal supplies the $C_h$ waveform, which is returned to the annex via terminal 181. This, as already described, causes the information in one of the high speed storage devices to be transmitted to the output channel OC via terminal 111, and JU2. When this is finished, it will be recalled, a signal is generated on lead EP. This steps CC2 via JU3, this being necessary for dealing with the rest of the equipment, rests FF11, and via JU4 resets FF10.

Clearly if OC is only fed by one equipment such as has been described, the equipment of Fig. 46 would be unnecessary, and the annex circuits of Figs. 40–45 could be simplified.

It will be understood that where, as in the present system, the code form in which information is transmitted over the output circuit OC, is binary digital code the first digit or the first group of digits of a block of information may be "no pulse." To ensure that the receiving equipment to which OC extends, which in itself forms no part of the present invention, can recognise the commencement of a block of information, the production of some prefix signal for a block is necessary. For this a negative pulse is produced which occurs just ahead of the block. For this an output from G12 (Fig. 43) which initiates sending is applied via terminal X through gate G22 (Fig. 46). The other control of G22 is D36, delayed by a delay circuit DS15 1 microsecond, so that G22 gives an output one microsecond before D1 of the cycle in which the information commences. This is converted by phase inverter 300 so that it appears on OC as a negative pulse. This negative pulse therefore identifies a block of incident information.

Clearly if the code used for outgoing intelligence is a code of the printing telegraph type wherein the first code element of a message always has a certain characteristic the provision of equipment to produce a prefix signal would be unnecessary. It will further be apparent that forms of prefix other than negative pulses are feasible where prefixes are needed.

While we have described above the principle of our invention in connection with specific apparatus, it is to be clearly understood that this description is made only by way of example and not as a limitation to the scope of our invention as set forth in the objects thereof and in the accompanying claims.

What is claimed is:

1. In information handling equipment, input equipment over which electrical signals representing information from a plurality of sources are received, an output circuit over which electrical signals representing information from said sources may be transmitted, a converter for converting said signals from one form of presentation to another having a plurality of sequentially arranged signal bits, means for transmitting said information signals from said input equipment to said converter at a first rate of transmission, said transmitting means comprising a plurality of information record positions, switching means for connecting said record positions to said converter in turn, means for transferring to said converter at said first rate of speed said information signals from a record position to which said converter is connected under control of said switching means, said converter comprising means for producing signals representing said bits, one at a time, at spaced intervals of time, and means for transmitting said information from said converter to said output circuit after conversion at a second rate of transmission greater than said first rate, said means comprising a stepping register, means controlled by said converter for causing said register to step in successive cycles, one cycle for each of said signal bits, means controlled by said converter for transferring to and inserting into said register, during each cycle, information signals in said other form representing the value of the total number of signal bits thus far transferred to said register, said signals being transferred to said storage means at said other speed, and means including means for stepping said register through one cycle for transferring electrical information signals representing the total number of signal bits stored in said register from said register to said output circuit during one cycle of said register.

2. In information handling equipment, an information record apparatus, a converter for converting electrical information signals received in a first form into a second form having a plurality of sequentially arranged signal bits, means for transferring electrical information signals from said information record apparatus to said converter at a first speed, said converter comprising means responsive to signals received from said information record apparatus for producing signals representing said bits, one at a time, at spaced intervals of time, storage means comprising a stepping register, means controlled by said converter for causing said register to step in successive cycles, one cycle for each of said signal bits, means controlled by said converter for transferring to, and inserting into said register, during each cycle, information signals in said second form representing the value of the total number of signal bits thus far transferred to said register, said signals being transferred to said storage means at a second speed greater than said first speed, an output circuit, and means including means for stepping said register through one cycle for transferring electrical information signals representing the total number of said signal bits stored in said storage means from said storage means to said output circuit during said one cycle, whereby said information signals are transferred to said output circuit at a third speed greater than said second speed.

3. In information handling equipment, an information record apparatus, a converter for converting electrical signals representing items of information received in a first form into a second form having a plurality of sequentially arranged signal bits, means for transferring electrical signals representing items of information from said information record apparatus to said converter at a first speed, said converter comprising means responsive to signals received from said information record apparatus for producing signals representing said bits, one at a time, at spaced intervals of time, a plurality of storage devices each comprising a stepping register, first switching means for connecting said converter to said storage devices in turn, means for transferring said signal bits from said converter, to any one of said storage devices at a second speed greater than said first speed, means responsive to the operation of said converter for causing the stepping register connected to said converter to step in successive cycles, one cycle for each of said signal bits, means for inserting into said connected stepping register, during each cycle, information signals in said second form representing the value of the total number of signal bits thus far transferred to said stepping register, an output circuit, second switching means for connecting said storage devices in turn to said output circuit, and means including means for stepping a stepping register, so connected, through one cycle for transferring electrical information signals representing the total number of signal bits stored in said connected register from said register to said output circuit during said one cycle, whereby said information signals are transferred to said output circuit at a third speed greater than said second speed.

4. In information handling equipment, a plurality of information record apparatuses, a converter for converting electrical signals representing items of information received in a first form into a second form having a plurality of sequentially arranged signal bits, switching means for connecting said converter to said information record apparatuses in turn, means for transferring electrical signals representing items of information from a connected one of said information record apparatuses to said converter at a first speed, said converter comprising means responsive to signals received from a connected information record apparatus for producing signals representing said bits, one at a time, at spaced intervals of time, storage means comprising a stepping register, means responsive to the operation of said converter for transferring said signal bits from said converter to said stepping register at a second speed greater than said first speed, means responsive to the operation of said converter for causing said stepping register to step in successive cycles, one cycle for each of said signal bits, means for inserting into said stepping register during each cycle, information signals in said second form representing the value of the total number of signal bits thus far transferred to said stepping register, an output circuit, and means including means for stepping said stepping register through one cycle for transferring electrical information signals representing the total number of signal bits stored in said register from said stepping register to said output circuit during said one cycle, whereby said information signals are transferred to said output circuit at a third speed greater than said second speed.

5. In information handling equipment, a plurality of information record apparatuses, a converter for converting electrical signals representing items of information received in a first form into a second form having a plurality of sequentially arranged signal bits, first switching means for connecting said converter to said information record apparatuses in turn, means for transferring electrical signals representing items of information from a connected one of said information record apparatuses to said converter at a first speed, said converter comprising means responsive to signals received from a connected information record apparatus for producing signals representing said bits, one at a time, at spaced intervals of time, a plurality of storage devices, each comprising a stepping register, second switching means for connecting said converter to said storage devices in turn, means responsive to the operation of said converter for transferring said signal bits from said converter to a connected one of said storage devices at a second speed greater than said first speed, means responsive to the operation of said converter for causing the stepping register of a connected storage device to step in successive cycles, one cycle for each of said signal bits, means for inserting into said stepping register, during each cycle, information signals in said second form representing the value of the total number of signal bits thus far transferred to said stepping register, an output circuit and means including means for stepping the stepping register of a connected storage device through one cycle for transferring electrical information signals representing the total number of signal bits stored in said stepping register to said output circuit during said one cycle, whereby said information signals are transferred to said output circuit at a third speed greater than said second speed.

References Cited in the file of this patent

UNITED STATES PATENTS

| | | |
|---|---|---|
| 2,401,621 | Desch et al. | June 4, 1946 |
| 2,587,532 | Schmidt | Feb. 26, 1952 |
| 2,604,262 | Phelps | July 22, 1952 |
| 2,639,859 | Serrell | May 26, 1953 |
| 2,672,283 | Havens | Mar. 16, 1954 |
| 2,679,638 | Bensky | May 25, 1954 |
| 2,700,755 | Burkhart | Jan. 25, 1955 |
| 2,702,380 | Brustman | Feb. 15, 1955 |
| 2,713,456 | Reynolds | July 19, 1955 |

OTHER REFERENCES

Electronic Engineering (British), October 1953, "Computing Machines," by Bird, pages 407 to 409.

"A Functional Description of the EDVAC," Moore School of Engrg., Univ. of Pennsylvania, May 3, 1951; vol. I, pages 1-1 to 1-6, 6-3, 6-4; vol. 11, Fig. 104-10LD-6.